US007927066B2

(12) United States Patent
Moriya et al.

(10) Patent No.: US 7,927,066 B2
(45) Date of Patent: Apr. 19, 2011

(54) REFLECTING DEVICE, COMMUNICATING PIPE, EXHAUSTING PUMP, EXHAUST SYSTEM, METHOD FOR CLEANING THE SYSTEM, STORAGE MEDIUM STORING PROGRAM FOR IMPLEMENTING THE METHOD, SUBSTRATE PROCESSING APPARATUS, AND PARTICLE CAPTURING COMPONENT

(75) Inventors: Tsuyoshi Moriya, Nirasaki (JP); Takahiro Murakami, Miyagi-gun (JP); Yoshiyuki Kobayashi, Nirasaki (JP); Tetsuji Sato, Nirasaki (JP); Eiichi Sugawara, Nirasaki (JP); Shosuke Endoh, Nirasaki (JP); Masaki Fujimori, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 687 days.

(21) Appl. No.: 11/365,682

(22) Filed: Mar. 2, 2006

(65) Prior Publication Data

US 2006/0257243 A1 Nov. 16, 2006

Related U.S. Application Data

(60) Provisional application No. 60/740,279, filed on Nov. 29, 2005, provisional application No. 60/663,187, filed on Mar. 21, 2005.

(30) Foreign Application Priority Data

| | | |
|---|---|---|
| Mar. 2, 2005 | (JP) | 2005-058108 |
| Oct. 25, 2005 | (JP) | 2005-310545 |
| Nov. 29, 2005 | (JP) | 2005-344663 |
| Jan. 12, 2006 | (JP) | 2006-005344 |

(51) Int. Cl.

| | |
|---|---|
| ***F01D 1/36*** | (2006.01) |
| ***F01D 5/12*** | (2006.01) |
| ***F01D 25/00*** | (2006.01) |
| ***F03B 5/00*** | (2006.01) |
| ***F03B 3/12*** | (2006.01) |
| ***F03B 11/00*** | (2006.01) |
| ***F03D 11/00*** | (2006.01) |

(52) U.S. Cl. ........................................ 415/90; 415/121.1

(58) Field of Classification Search ........................ None
See application file for complete search history.

(56) References Cited

U.S. PATENT DOCUMENTS

| | | | | |
|---|---|---|---|---|
| 4,622,819 | A * | 11/1986 | Draper et al. | 60/657 |
| 6,193,461 | B1 * | 2/2001 | Hablanian | 415/90 |
| 6,331,351 | B1 * | 12/2001 | Waters et al. | 428/317.7 |
| 2002/0126269 | A1 * | 9/2002 | Sato | 355/77 |
| 2003/0147075 | A1 * | 8/2003 | Otsuki et al. | 356/338 |
| 2003/0198741 | A1 * | 10/2003 | Uchida et al. | 427/248.1 |

OTHER PUBLICATIONS

Shintaro Sato, et al., "Visualization of Backflow Particles from Turbo Molecular Pump", Clean Technology, May 31, 2003, pp. 20-23 (with English translation).

* cited by examiner

*Primary Examiner* — Stephone B Allen
*Assistant Examiner* — Jade R Chwasz
(74) *Attorney, Agent, or Firm* — Oblon, Spivak. McClelland, Maier & Neustadt, L.L.P.

(57) ABSTRACT

A reflecting device that enables to prevent infiltration of particles into a processing chamber. The reflecting device is disposed in a communicating pipe. The communicating pipe allows the processing chamber of a substrate processing apparatus and an exhaust pump to communicate with each other. The exhaust pump has at least one rotary blade. The reflecting device comprises at least one reflecting surface. The at least one reflecting surface is oriented to the exhausting pump.

12 Claims, 27 Drawing Sheets

REFLECTING DEVICE, COMMUNICATING PIPE, EXHAUSTING PUMP, EXHAUST SYSTEM, METHOD FOR CLEANING THE SYSTEM, STORAGE MEDIUM STORING PROGRAM FOR IMPLEMENTING THE METHOD, SUBSTRATE PROCESSING APPARATUS, AND PARTICLE CAPTURING COMPONENT

BACKGROUND OF THE INVENTION

1. Field of the Invention

The present invention relates to a reflecting device, a communicating pipe, an exhausting pump, an exhaust system, a method for cleaning the system, a storage medium storing a program for implementing the method, a substrate processing apparatus, and a particle capturing component, and in particular relates to a reflecting device, a communicating pipe, an exhausting pump, an exhaust system and a method for cleaning the system and a storage medium that prevent infiltration of particles into a processing chamber of the substrate processing apparatus.

2. Description of the Related Art

Generally, a substrate processing apparatus that carries out predetermined processing on substrates such as semiconductor device wafers has a processing chamber (hereinafter referred to as "chamber") in which a substrate is housed and subjected to the predetermined processing. In such a chamber, particles resulting from adherents to a chamber inner wall and reaction products generated by the predetermined processing are suspended. When these suspended particles adhere to the substrate surface, in a produce manufactured from the substrate, for example, in a semiconductor device, short-circuit in wiring occurs, and yield of the semiconductor device reduces. Therefore, in order to remove the particles in the chamber, the substrate processing apparatus exhausts a gas in the chamber by an exhaust system.

The exhaust system of the substrate processing apparatus has a turbo molecular pump (Turbo Molecular Pump) (hereinafter, referred to as "TMP") that is an exhausting pump capable of achieving high vacuum, and a communicating pipe that allows the TMP and an inside of the chamber to communicate with each other. The TMP has a rotary shaft disposed along an exhaust stream, and a plurality of blade-shaped rotary blades which are orthogonally projected from the rotary shaft, and the rotary blades rotate at a high speed around the rotary shaft at a center, whereby the TMP exhausts a gas upstream of the rotary blades towards downstream of the rotary blades at a high speed. The exhaust system discharges the particles, in the chamber as well as the gas in the chamber by operating the TMP.

However, in recent years, it has been found out that particles flow back into the chamber from the exhaust systems. Specifically, it has been found out that the adherents which adhere to the rotary blades of the TMP peel off and flow back into the chamber, or the particles discharged from the chamber collide against the rotary blades of the TMP and rebound, and directly flow back into the chamber.

It is considered that the adherents which peel off from the rotary blades, and the particles which rebound by the rotary blades are both given large kinetic energy from the rotary blades which rotate at a high speed, and therefore, they repeat elastic collisions with the inner wall of the communicating pipe, and infiltrate the chamber in spite of the presence of the exhaust stream in the communicating pipe.

Concerning the above described backflow of the particles, the adherents which peel off from the rotary blades are prevented from generating by increasing the replacement frequency of the TMP (for example, refer to, "Visualization of Backflow Particles from Turbo Molecular Pump", Sato et al., Japan Industrial Publishing Co., LTD, Clean Technology, 2003.6, pages 20 to 23).

However, collision between the particles and the rotary blades occurs accidentally, and therefore, particles rebounded by the rotary blades cannot be prevented from occurring even if replacement frequency of the TMP is increased. The rebounded particles repeat elastic collisions with the inner wall of the communicating pipe and infiltrate the chamber as described above, and adhere to substrate surfaces, which reduces yields of the products manufactured from the substrates.

The adherents to the chamber inner wall and adherents to the components in the chamber peel off due to vibration of the chamber, a viscous force of the gas flowing in the chamber, electromagnetic stress caused by an electric field in the chamber, or the like, and therefore, the timing at which these adherents peel off to be particles is unpredictable. On the other hand, exhaust in the chamber by the exhaust system is performed at a predetermined timing, and therefore, if the timing at which the adherent peel off and the timing at which exhaust in the chamber is are carried out are different, the particles are not removed from the chamber.

There is known a method for capturing some particles in the chamber which are negatively charged by plasma by electrodes disposed in the camber, but in this method, the particles which are not charged cannot be captured. In order to dispose the electrodes in the chamber, the construction of the chamber needs to be changed significantly, and therefore, it is difficult to dispose the electrodes in the chamber.

SUMMARY OF THE INVENTION

It is a first object of the present invention to provide a reflecting device, a communicating pipe, an exhausting pump, an exhaust system, a method for cleaning the system and a storage medium capable of preventing infiltration of particles into a processing chamber.

It is a second object of the present invention to provide a particle capturing component and a substrate processing apparatus capable of efficiently capturing particles in a processing chamber without significantly changing a construction of the processing chamber.

To attain the above described first object, in a first aspect of the present invention, there is provided a reflecting device disposed inside a communicating pipe which allows a processing chamber of a substrate processing apparatus and an exhausting pump having at least one rotary blade to communicate with each other, comprising at least one reflecting surface which is oriented to the exhausting pump.

According to the construction of the first aspect as described above, the reflecting device disposed inside the communicating pipe is provided with at least one reflecting surface which is oriented to the exhausting pump, and therefore, it can reflect the particles which are rebounded by the rotary blade toward the exhausting pump, whereby the infiltration of the rebounded particles into the processing chamber can be prevented.

Preferably, the reflecting surface is formed by a spherical surface.

According to the construction of the first aspect as described above, the reflecting surface is formed by a spherical surface, and therefore, it can efficiently reflect the rebounded particles toward the exhausting pump, whereby the infiltration of the rebounded particles into the processing chamber can be prevented without fail.

Preferably, the reflecting surface is formed by a plane.

According to the construction of the first aspect as described above, the reflecting surface is formed by a plane. Therefore, the reflecting direction of the rebounded particles can be easily controlled, and the reflecting device can be easily produced, whereby the manufacturing cost of the reflecting device can be reduced.

Preferably, the plane has an acute angle with a rotation surface of the rotary blades in the exhausting pump.

According to the construction of the first aspect as described above, the plane has an acute angle with a rotation surface of the rotary blade in the exhausting pump, and therefore, it can reliably reflect the rebounded particles toward the exhausting pump.

To attain the above described first object, in a second aspect of the present invention, there is provided a reflecting device disposed inside a communicating pipe which allows a processing chamber of a substrate processing apparatus and an exhausting pump having at least one rotary blade to communicate with each other, comprising a kinetic energy reducing mechanism that reduces kinetic energy of rebounding particles.

According to the construction of the second aspect as described above, the reflecting device disposed inside the communicating pipe is provided with the kinetic energy reducing mechanism that reduces kinetic energy of rebounding particles, and therefore, it can reduce the kinetic energy of the rebounded particles by the rotary blade, whereby the infiltration of he rebounded particles into the processing chamber can be prevented.

Preferably, the kinetic energy reducing mechanism is comprised of a plurality of projected members or recessed members.

According to the construction of the second aspect as described above, the kinetic energy reducing mechanism is comprised of a plurality of projected members or recessed members, and therefore, it can reliably reduce the kinetic energy of the particles by causing the particles which infiltrate a space between the adjacent two projected members or the recessed shape of the recessed member to collide against the projected members or the recessed members a plurality of times, whereby the infiltration of the rebounded particles into the processing chamber can be prevented without fail.

Preferably, a projected shape of the projected member or a recessed shape of the recessed member is formed by any one of a cone, a pyramid, a column, a prism and a hemisphere.

According to the construction of the second aspect as described above, the projected shape of the projected member or the recessed shape of the recessed member is formed by any one of a cone, a pyramid, a column, a prism and a hemisphere, and therefore, the projected member or the recessed member can be easily molded, whereby the manufacturing cost of the reflecting device can be reduced.

Preferably, the kinetic energy reducing mechanism is made of an impact absorbing material.

According to the construction of the second aspect as described above, the kinetic energy reducing mechanism is made of an impact absorbing material, and therefore, it can absorb the kinetic energy of the rebounded particles by the rotary blade, whereby the infiltration of the rebounded particles into the processing chamber can be prevented without fail.

Preferably, the kinetic energy reducing mechanism is comprised of a plurality of small rooms having openings.

According to the construction of the second aspect as described above, the kinetic energy reducing mechanism is comprised of a plurality of small rooms having openings, and therefore, it can reliably reduce the kinetic energy of the particles by causing the particles infiltrating each small room to collide against the wall of the small room a plurality of times, whereby the infiltration of the rebounded particles into the processing chamber can be prevented without fail.

To attain the above described first object, in a third aspect of the present invention, there is provided a reflecting device disposed inside a communicating pipe which allows a processing chamber of a substrate processing apparatus and an exhausting pump having at least one rotary blade to communicate with each other, comprising a particle capturing mechanism that captures rebounding particles.

According to the construction of the third aspect as described above, the reflecting device disposed inside the communicating pipe which allows the processing chamber of the substrate processing apparatus and the exhausting pump having the rotary blade to communicate with each other is provided with the particle capturing mechanism that captures rebounding particles, and therefore, it can capture the particles rebounded by the rotary blade, whereby the infiltration of the rebounded particles into the processing chamber can be prevented.

Preferably, the particle capturing mechanism is comprised of a flocculent body or a porous body.

According to the construction of the third aspect as described above, the particle capturing mechanism is comprised of a flocculent body or a porous body, and therefore, the particle capturing mechanism can reliably capture the particles, whereby the infiltration of the rebounded particles into the processing chamber can be prevented without fail.

More preferably, the flocculent body is made of stainless felt or a fluororesin felt.

Preferably, the particle capturing mechanism is made of an adhesive material.

According to the construction of the third aspect as described above, the particle capturing mechanism is made of an adhesive material, and therefore, the particle capturing mechanism can reliably capture the particles, whereby the infiltration of the rebounded particles into the processing chamber can be prevented without fail.

To attain the above described first object, in a fourth aspect of the present invention, there is provided a communicating pipe which allows a processing chamber of a substrate processing apparatus and an exhausting pump having at least one rotary blade to communicate with each other, wherein at least a part of an inner wall of the communicating pipe is oriented to the exhausting pump.

According to the construction of the fourth aspect as described above, at least a part of the inner wall of the communicating pipe which allows the processing chamber of the substrate processing apparatus and the exhausting pump having the rotary blade to communicate with each other is oriented to the exhausting pump, and therefore, it can reflect the particles rebounded by the rotary blade toward the exhausting pump, whereby the infiltration of the particles into the processing chamber can be prevented.

To attain the above described first object, in a fifth aspect of the present invention, there is provided a communicating pipe which allows a processing chamber of a substrate processing apparatus and an exhausting pump having at least one rotary blade to communicate with each other, comprising a kinetic energy reducing mechanism that reduces kinetic energy of rebounding particles.

According to the construction of the fifth aspect as described above, the communicating pipe which allows the processing chamber of the substrate processing apparatus and the exhausting pump having the rotary blade to communicate with each other is provided with a kinetic energy reducing mechanism that reduces kinetic energy of the rebounding particles, and therefore, it can reduce the kinetic energy of the particles rebounded by the rotary blade, whereby the infiltration of the rebounded particles into the processing chamber can be prevented.

Preferably, the kinetic energy reducing mechanism is comprised of a plurality of projected members or recessed members disposed on an inner wall of the communicating pipe.

According to the construction of the fifth aspect as described above, the kinetic energy reducing mechanism is comprised of a plurality of projected members or recessed members disposed on the inner wall of the communicating pipe, and therefore, it can reliably reduce the kinetic energy of the particles by causing the particles infiltrating a space between the adjacent two projected members or the recessed shape of the recessed member to collide against the projected members or the recessed members a plurality of times, whereby the infiltration of the rebounded particles into the processing chamber can be prevented without fail.

More preferably, a projected shape of the projected member or a recessed shape of the recessed member is formed by any one of a cone, a pyramid, a column, a prism and a hemisphere.

According to the construction of the fifth aspect as described above, the projected shape of the projected member or the recessed shape of the recessed member is formed by any one of a cone, a pyramid, a column, a prism and a hemisphere, and therefore, the projected member or the recessed member can be easily molded, whereby the manufacturing cost of the communicating pipe can be reduced.

Preferably, the kinetic energy reducing mechanism is comprised of a plurality of fins which are projected from an inner wall of the communicating pipe.

According to the construction of the fifth aspect as described above, the kinetic energy reducing mechanism is comprised of a plurality of fins which are projected from the inner wall of the communicating pipe, and therefore, it can reliably reduce the kinetic energy of the particles by causing the particles infiltrating a space between the adjacent two fins to collided against the fins a plurality of times, whereby the infiltration of the rebounded particles into the processing chamber can be prevented without fail.

Preferably, the kinetic energy reducing mechanism is made of an impact absorbing material disposed on an inner wall of the communicating pipe.

According to the construction of the fifth aspect as described above, the kinetic energy reducing mechanism is made of the impact absorbing material disposed on the inner wall of the communicating pipe, and therefore, it can absorb the kinetic energy of the particles rebounded by the rotary blade, whereby the infiltration of the rebounded particles into the processing chamber can be prevented without fail.

Preferably, the kinetic energy reducing mechanism is comprised of a plurality of small rooms which are disposed on an inner wall of the communicating pipe and have openings.

According to the construction of the fifth aspect as described above, the kinetic energy reducing mechanism is comprised of a plurality of small rooms which are disposed on the inner wall of the communicating pipe and have the openings, and therefore, it can reliably reduce the kinetic energy of the particles by causing the particles infiltrating each small room to collide against the wall of the small room a plurality of times, whereby the infiltration of the rebounded particles into the processing chamber can be prevented without fail.

To attain the above described first object, in a sixth aspect of the present invention, there is provided a communicating pipe which allows a processing chamber of a substrate processing apparatus and an exhausting pump having at least one rotary blade to communicate with each other, comprising a particle capturing mechanism which captures rebounding particles.

According to the construction of the sixth aspect as described above, the communicating pipe which allows the processing chamber of the substrate processing apparatus and the exhausting pump having the rotary blade to communicate with each other is provided with the particle capturing mechanism which captures rebounding particles, and therefore, it can capture the particles rebounded by the rotary blade, whereby the infiltration of the rebounded particles into the processing chamber can be prevented.

Preferably, the particle capturing mechanism is comprised of a flocculent body or a porous body which is disposed on an inner wall of the communicating pipe.

According to the construction of the sixth aspect as described above, the particle capturing mechanism is comprised of a flocculent body or a porous body disposed on the inner wall of the communicating pipe, and therefore, the particle capturing mechanism can reliably capture the particles, whereby the infiltration of the rebounded particles into the processing chamber can be prevented without fail.

More preferably, the flocculent body is made of stainless felt or fluororesin felt.

Preferably, the particle capturing mechanism is made of an adhesive material disposed on an inner wall of the communicating pipe.

According to the construction of the sixth aspect as described above, the particle capturing mechanism is made of an adhesive material disposed on the inner wall of the communicating pipe, and therefore, the particle capturing mechanism can reliably capture the particles, whereby the infiltration of the rebounded particles into the processing chamber can be prevented without fail.

To attain the above described first object, in a seventh aspect of the present invention, there is provided an exhausting pump connected to a processing chamber of a substrate processing apparatus, and provided with at least one rotary blade and a cylindrical intake part disposed at the processing chamber side from the rotary blade, comprising a reflecting device disposed inside the intake part and having at least one reflecting surface oriented to the rotary blade.

According to the construction of the seventh aspect as described above, the reflecting device disposed inside the intake part which is disposed at the processing chamber side from the rotary blade and having at least one reflecting surface oriented to the rotary blade is included, and therefore, it can reflect the particle rebounded by the rotary blade toward the exhausting pump, whereby the infiltration of the rebounded particles into the processing chamber can be prevented without fail.

Preferably, the reflecting device is an annular member.

According to the construction of the seventh aspect as described above, the reflecting device is an annular member, and therefore, it does not reduce conductance of exhaust, whereby reduction in the discharge efficiency of particles can be prevented.

Preferably, the exhausting pump further comprises a stator blade disposed at the processing chamber side from the rotary blade.

According to the construction of the seventh aspect as described above, the stator blade disposed at the processing chamber side from the rotary blade is further included, and therefore, the particles rebounded by the rotary blade can be reflected toward the rotary blade by the stator blade, whereby the infiltration of the rebounded particles into the processing chamber can be prevented more reliably.

To attain the above described first object, in an eighth aspect of the present invention, there is provided an exhausting pump connected to a processing chamber of a substrate processing apparatus, and provided with at least one rotary blade and a cylindrical intake part disposed at the processing chamber side from the rotary blade, comprising a kinetic energy reducing mechanism that reduces kinetic energy of rebounding particles.

According to the construction of the eighth aspect as described above, the exhausting pump connected to the processing chamber of the substrate processing apparatus is provided with the kinetic energy reducing mechanism that reduces kinetic energy of rebounding particles, and therefore, it can reduce the kinetic energy of the particles rebounded by the rotary blade, whereby the infiltration of the rebounded particles into the processing chamber can be prevented.

Preferably, the kinetic energy reducing mechanism is comprised of a plurality of projected members or recessed members disposed on an inner wall of the intake part.

According to the construction of the eighth aspect as described above, the kinetic energy reducing mechanism is comprised of a plurality of projected members or recessed members disposed on the inner wall of the intake part, and therefore, it can reliably reduce the kinetic energy of the particles by causing the particles infiltrating the space between the adjacent two projected members or the recessed shape of the recessed member to collide against the projected member or the recessed member a plurality of times, whereby the infiltration of the rebounded particles into the processing chamber can be prevented without fail.

Preferably, a projected shape of the projected member or a recessed shape of the recessed member is formed by any one of a cone, a pyramid, a column, a prism and a hemisphere.

According to the construction of the eighth aspect as described above, the projected shape of the projected member or the recessed shape of the recessed member is formed by any one of a cone, a pyramid, a column, a prism and a hemisphere, and therefore, the projected member or the recessed member can be easily molded, whereby the manufacturing cost of the exhausting pump can be reduced.

Preferably, the kinetic energy reducing mechanism is made of an impact absorbing material disposed on an inner wall of the intake part.

According to the construction of the eighth aspect as described above, the kinetic energy reducing mechanism is made of the impact absorbing material disposed on the inner wall of the intake part, and therefore, it can absorb the kinetic energy of the particles rebounded by the rotary blade, whereby the infiltration of the rebounded particles into the processing chamber can be prevented without fail.

Preferably, the kinetic energy reducing mechanism is comprised of a plurality of small rooms having openings.

According to the construction of the eighth aspect as described above, the kinetic energy reducing mechanism is comprised of a plurality of small rooms having the openings, and therefore, it can reliably reduce the kinetic energy of the particles by causing the particles infiltrating each small room to collide against the wall of the small room a plurality of times, whereby the infiltration of the rebounded particles into the processing chamber can be prevented without fail.

To attain the above described first object, in a ninth aspect of the present invention, there is provided an exhausting pump connected to a processing chamber of a substrate processing apparatus, and provided with at least one rotary blade and a cylindrical intake part disposed at the processing chamber side from the rotary blade, comprising a particle capturing mechanism that captures rebounding particles.

According to the construction of the ninth aspect as described above, the exhausting pump connected to the processing chamber of the substrate processing apparatus, and provided with the rotary blade and the cylindrical intake part disposed at the processing chamber side from the rotary blade is provided with the particle capturing mechanism that captures rebounding particles, and therefore, it can capture the particles rebounded by the rotary blade, whereby the infiltration of the rebounded particles into the processing chamber can be prevented without fail.

Preferably, the particle capturing mechanism is comprised of a flocculent body or a porous body disposed on an inner wall of the intake part.

According to the construction of the ninth aspect as described above, the particle capturing mechanism is comprised of a flocculent body or a porous body disposed on the inner wall of the intake part, and therefore, the particle capturing mechanism can reliably capture particles, whereby the infiltration of the rebounded particles into the processing chamber can be prevented without fail.

Preferably, the flocculent body is made of stainless felt or fluororesin felt.

More preferably, the particle capturing mechanism is made of an adhesive material disposed on an inner wall of the intake part.

According to the construction of the ninth aspect as described above, the particle capturing mechanism is made of an adhesive material disposed on the inner wall of the intake part, and therefore, the particle capturing mechanism can reliably capture particles, whereby the infiltration of the rebounded particles into the processing chamber can be prevented without fail.

Preferably, the exhaust pump further comprises a stator blade disposed at the processing chamber side from the rotary blade.

According to the construction of the ninth aspect as described above, the stator blade disposed at the processing chamber side from the rotary blade is included, and therefore, the particles rebounded by the rotary blade can be reflected toward the rotary blade by the stator blade, whereby the infiltration of the rebounded particles into the processing chamber can be prevented more reliably.

To attain the above described first object, in a tenth aspect of the present invention, there is provided an exhaust system provided with the exhausting pump and the communicating pipe that allows the exhausting pump and the processing chamber of the substrate processing apparatus to communicate with each other, which is provided with at least any one of the above described reflecting device, the above described communicating pipe, and the above described exhausting pump.

According to the construction of the tenth aspect as described above, the exhaust system is provided with at least any one of the above described reflecting device, the above described communicating pipe, and the above described exhausting pump, and therefore, any one of the above described effects can be provided.

Preferably, the exhaust system further comprises a baffle plate disposed between the processing chamber and the communicating pipe, wherein the baffle plate has a vent hole of which sectional area reduces toward the communicating pipe side from the processing chamber side.

According to the construction of the tenth aspect as described above, the baffle plate disposed between the processing chamber and the communicating pipe has the vent hole of which sectional area reduces from the processing chamber side to the communicating pipe side, and therefore, the backflow of particles to the processing chamber can be prevented without reducing the conductance of the exhaust from the processing chamber.

Preferably, the exhaust system further comprises a baffle plate disposed between the processing chamber and the communicating pipe, wherein the baffle plate has a vent hole which opens diagonally with respect to a direction of an exhaust stream in a vicinity of the baffle plate.

According to the construction of the tenth aspect as described above, the baffle plate disposed between the processing chamber and the communicating pipe has the vent hole which opens diagonally with respect to the direction of the exhaust stream in the vicinity of the baffle plate, and therefore, the backflow of particles to the processing chamber can be prevented.

To attain the above described first object, in an eleventh aspect of the present invention, there is provided a method for cleaning an exhaust system provided with an exhaust passage which allows a processing chamber of a substrate processing apparatus and an exhausting pump having at least one rotary blade to communicate with each other, and an on-off valve capable of shutting off communication of the processing chamber and the exhausting pump, comprising a shutoff step of shutting off the communication of the processing chamber and the exhausting pump by causing the on-off valve to close the exhaust passage, a rough evacuating step of roughly evacuating the exhaust passage, and a valve opening and closing step of causing the on-off valve which closes the exhaust passage to repeat opening and closing after stopping rotation of the rotary blade of the exhausting pump.

According to the construction of the eleventh aspect as described above, the on-off valve closes the exhaust passage to shut off the communication of the processing chamber and the exhausting pump, the exhaust passage is roughly evacuated, and the on-off valve which closes the exhaust passage repeats opening and closing after rotation of the rotary blade of the exhausting pump stops. The particles flowing to the exhausting pump from the processing chamber are deposited on or adhere to the on-off valve which closes the exhaust passage. The particles depositing/adhering onto the on-off valve are separated from the on-off valve by the on-off valve repeating opening and closing, and are removed by the exhaust stream of the rough evacuation. Thereby, the particles which flow into the exhausting pump from the on-off valve when the exhausting pump starts high-speed rotation can be eliminated. The on-off valve repeats opening and closing after the rotation of the rotary blade of the exhausting pump stops, and therefore, the particles separated from the on-off valve do not rebound even when they collide against the rotary blade. As a result, the occurrence of the rebounding particles is prevented, and the infiltration of the rebounded particles into the processing chamber can be prevented without fail.

To attain the above described first object, in a twelfth aspect of the present invention, there is provided a method for cleaning an exhaust system provided with an exhaust passage which allows a processing chamber of a substrate processing apparatus and an exhausting pump having at least one rotary blade to communicate with each other, and an on-off valve capable of shutting off communication of the processing chamber and the exhausting pump, comprising a shutoff step of shutting off the communication of the processing chamber and the exhausting pump by causing the on-off valve to close the exhaust passage, a rough evacuating step of roughly evacuating the exhaust passage, and a viscous flow generating step of generating a viscous flow in a vicinity of the on-off valve which closes the exhaust passage.

According to the construction of the twelfth aspect as described above, the on-off valve closes the exhaust passage to shut off the communication of the processing chamber and the exhausting pump, the exhaust passage is roughly evacuated, and a viscous flow is generated in the vicinity of the on-off valve which closes the exhaust passage. The particles flowing to the exhausting pump from the processing chamber are deposited on or adhere to the on-off valve which closes the exhaust passage. The particles which are deposited on or adhere to the on-off valve are separated from the on-off valve by the viscous flow, and are removed by the exhaust stream of the rough evacuation. Thereby, the particles which flow into the exhausting pump from the on-off valve when the exhausting pump starts high-speed rotation can be eliminated. Therefore, the occurrence of the rebounding particles is prevented, and the infiltration of the rebounded particles into the processing chamber can be prevented.

To attain the above describe first object, in a thirteenth aspect of the present invention, there is provided a method for cleaning an exhaust system provided with an exhaust passage which allows a processing chamber of a substrate processing apparatus and an exhausting pump having at least one rotary blade to communicate with each other, and an on-off valve capable of shutting off communication of the processing chamber and the exhausting pump, comprising a shutoff step of shutting off the communication of the processing chamber and the exhausting pump by causing the on-off valve to close the exhaust passage, a particle holding step of causing the on-off valve which closes the exhaust passage to capture and hold particles which flow in the exhaust passage, and a step of causing the on-off valve which holds the particles to retreat from the exhaust passage.

According to the construction of the thirteenth aspect as described above, the on-off valve closes the exhaust passage to shut off the communication of the processing chamber and the exhausting pump, the on-off valve which closes the exhaust passage captures and holds particles which flow in the exhaust passage, and the on-off valve which holds the particles retreats from the exhaust passage. Thereby, the particles flowing into the exhausting pump from the on-off valve when the exhausting pump starts high-speed rotation can be eliminated. Therefore, the occurrence of the rebounding particles is prevented and the infiltration of the particles into the processing chamber can be prevented.

To attain the above described first object, in a fourteenth aspect of the present invention, there is provided a method for cleaning an exhaust system provided with an exhaust passage which allows a processing chamber of a substrate processing apparatus and an exhausting pump having at least one rotary blade to communicate with each other, and at least two on-off valves capable of shutting off communication of the processing chamber and the exhausting pump, comprising a first shutoff step of shutting off the communication of the processing chamber and the exhausting pump by causing an on-off valve, which is disposed at the processing chamber side, of at least the two on-off valves to close the exhaust passage, a rough evacuating step of roughly evacuating the exhaust passage, and a valve opening and closing step of causing the on-off valve disposed at the processing chamber side which closes the exhaust passage to repeat opening and closing.

According to the construction of the fourteenth aspect as described above, the on-off valve which is disposed at the processing chamber side closes the exhaust passage to shut off the communication of the processing chamber and the exhausting pump, the exhaust passage is roughly evacuated, and the on-off valve disposed at the processing chamber side which closes the exhaust passage repeats opening and closing. The particles flowing to the exhausting pump from the processing chamber are deposited on or adhere to the on-off valve disposed at the processing chamber side. The particles which are deposited on or adhere to the on-off valve are separated from the on-off valve by the on-off valve repeating opening and closing, and are removed by the exhaust stream of the rough evacuation. Thereby, the particles which flow into the exhausting pump from the on-off valve when the exhausting pump starts high-speed rotation can be eliminated. Therefore, the occurrence of the rebounding particles is prevented, and the infiltration of the particles into the processing chamber can be prevented.

Preferably, the method for cleaning an exhaust system further comprises a second shutoff step of shutting off the communication of the processing chamber and the exhausting pump by causing an on-off valve of at least the two on-off valves which is disposed at the exhausting pump side to close the exhaust passage.

According to the construction of the fourteenth aspect as described above, the on-off valve which is disposed at the exhausting pump side closes the exhaust passage to shut off the communication of the processing chamber and the exhausting pump. The particles which separate from the on-off valve disposed at the processing chamber side flow toward the exhausting pump, but the on-off valve disposed at the exhausting pump side inhibits the separated particles from flowing into the exhausting pump. Thereby, the inflow of the particles into the exhausting pump is prevented without fail, and the infiltration of the particles into the processing chamber can be prevented.

To attain the above described first object, in a fifteenth aspect of the present invention, there is provided a method for cleaning an exhaust system provided with an exhaust passage which allows a processing chamber of a substrate processing apparatus and an exhausting pump having at least one rotary blade to communicate with each other, and at least two on-off valves capable of shutting off communication of the processing chamber and the exhausting pump, comprising a first shutoff step of shutting off the communication of the processing chamber and the exhausting pump by causing an on-off valve of at least the two on-off valves which is disposed at the processing chamber side to close the exhaust passage, a second shutoff step of shutting off the communication of the processing chamber and the exhausting pump by causing an on-off valve of at least the two on-off valves which is disposed at the exhausting pump side to close the exhaust passage, a rough evacuating step of roughly evacuating the exhaust passage, a communication restoring step of causing the on-off valve disposed at the processing chamber side which closes the exhaust passage to restore the communication of the processing chamber and the exhausting pump, and a viscous flow generating step of generating a viscous flow in a vicinity of the on-off valve which closes the exhaust passage and is disposed at the exhausting pump side.

According to the construction of the fifteenth aspect as described above, the on-off valve which is disposed at the processing chamber side closes the exhaust passage to shut off the communication of the processing chamber and the exhausting pump, the on-off valve which is disposed at the exhausting pump side closes the exhaust passage to shut off the communication of the processing chamber and the exhausting pump, the exhaust passage is roughly evacuated, the on-off valve which is disposed at the processing chamber side restores the communication of the processing chamber and the exhausting pump, and a viscous flow is generated in the vicinity of the on-off valve which is disposed at the exhausting pump side. The particles which flow toward the exhausting pump from the processing chamber temporarily are deposited on or adhere to the on-off valve which is disposed at the processing chamber side, and when the on-off valve which is disposed at the processing chamber side operates to restore the communication of the processing chamber and the exhausting pump, the particles separate from the on-off valve disposed at the processing chamber side, then flow toward the on-off valve disposed at the exhausting pump side, and deposit on the on-off valve disposed at the exhausting pump side. The particles which deposit on the on-off valve are raised from the on-off valve disposed at the exhausting pump side by the viscous flow, and are removed by the exhaust stream of the rough evacuation. Thereby, the particles which flow into the exhausting pump from the on-off valve when the exhausting pump starts high-speed rotation can be eliminated. Therefore, the occurrence of the rebounding particles is prevented, and the infiltration of the particles into the processing chamber can be prevented.

To attain the above described first object, in a sixteenth aspect of the present invention, there is provided a method for cleaning an exhaust system provided with an exhaust passage which allows a processing chamber of a substrate processing apparatus and an exhausting pump having at least one rotary blade to communicate with each other, and at least two on-off valves capable of shutting off communication of the processing chamber and the exhausting pump, comprising a shutoff step of shutting off the communication of the processing chamber and the exhausting pump by causing an on-off valve of at least the two on-off valves which is disposed at the processing chamber side to close the exhaust passage, a particle holding step of causing the on-off valve disposed at the processing chamber side which closes the exhaust passage to capture and hold particles flowing in the exhaust passage, and a step of causing the on-off valve holding the particles to retreat from the exhaust passage.

According to the construction of the sixteenth aspect as described above, the on-off valve which is disposed at the processing chamber side closes the exhaust passage to shut off the communication of the processing chamber and the exhausting pump, the on-off valve closing the exhaust passage captures and holds particles flowing in the exhaust passage, and the on-off valve holding the particles retreats from the exhaust passage. Thereby, the particles which flow into the exhausting pump from the on-off valve when the exhausting pump starts high-speed rotation can be eliminated. Therefore, the occurrence of the rebounding particles is prevented, and the infiltration of the particles into the processing chamber can be prevented.

To attain the above described first object, in a seventeenth aspect of the present invention, there is provided a computer-readable storage medium storing a program for causing a computer to implement a method for cleaning an exhaust system provided with an exhaust passage which allows a processing chamber of a substrate processing apparatus and an exhausting pump having at least one rotary blade to communicate with each other, and an on-off valve capable of shutting off communication of the processing chamber and the exhausting pump, the program comprising a shutoff module for shutting off the communication of the processing chamber and the exhausting pump by causing the on-off valve to close the exhaust passage, a rough evacuating module for roughly evacuating the exhaust passage, and a valve opening and closing module for causing the on-off valve which closes the exhaust passage to repeat opening and closing after stopping rotation of the rotary blade of the exhausting pump.

To attain the above described first object, in an eighteenth aspect of the present invention, there is provided a computer-readable storage medium storing a program for causing a computer to implement a method for cleaning an exhaust system provided with an exhaust passage which allows a processing chamber of a substrate processing apparatus and an exhausting pump having at least one rotary blade to communicate with each other, and an on-off valve capable of shutting off communication of the processing chamber and the exhausting pump, the program comprising a shutoff module for shutting off the communication of the processing chamber and the exhausting pump by causing the on-off valve to close the exhaust passage, a rough evacuating module for roughly evacuating the exhaust passage, and a viscous flow generating module for generating a viscous flow in a vicinity of the on-off valve which closes the exhaust passage.

To attain the above described first object, in a nineteenth aspect of the present invention, there is provided a computer-readable storage medium storing a program for causing a computer to implement a method for cleaning an exhaust system provided with an exhaust passage which allows a processing chamber of a substrate processing apparatus and an exhausting pump having at least one rotary blade to communicate with each other, and an on-off valve capable of shutting off communication of the processing chamber and the exhausting pump, the program comprising a shutoff module for shutting off the communication of the processing chamber and the exhausting pump by causing the on-off valve to close the exhaust passage, a particle holding module for causing the on-off valve which closes the exhaust passage to capture and hold particles flowing in the exhaust passage, and a module for causing the on-off valve holding the particles to retreat from the exhaust passage.

To attain the above described first object, in a twentieth aspect of the present invention, there is provided a computer-readable storage medium storing a program for causing a computer to implement a method for cleaning an exhaust system provided with an exhaust passage which allows a processing chamber of a substrate processing apparatus and an exhausting pump having at least one rotary blade to communicate with each other, and at least two on-off valves capable of shutting off communication of the processing chamber and the exhausting pump, the program comprising a first shutoff module for shutting off the communication of the processing chamber and the exhausting pump by causing an on-off valve of at least the two on-off valves, which is disposed at the processing chamber side to close the exhaust passage, a rough evacuating module for roughly evacuating the exhaust passage, and a valve opening and closing module for causing the on-off valve disposed at the processing chamber side which closes the exhaust passage to repeat opening and closing.

To attain the above described first object, in a twenty-first aspect of the present invention, there is provided a computer-readable storage medium storing a program for causing a computer to implement a method for cleaning an exhaust system provided with an exhaust passage which allows a processing chamber of a substrate processing apparatus and an exhausting pump having at least one rotary blade to communicate with each other, and at least two on-off valves capable of shutting off communication of the processing chamber and the exhausting pump, the program comprising a first shutoff module for shutting off the communication of the processing chamber and the exhausting pump by causing an on-off valve of at least the two on-off valves which is disposed at the processing chamber side to close the exhaust passage, a second shutoff module for shutting off the communication of the processing chamber and the exhausting pump by causing an on-off valve of at least the two on-off valves which is disposed at the exhausting pump side to close the exhaust passage, a rough evacuating module for roughly evacuating the exhaust passage, a communication restoring module for causing the on-off valve disposed at the processing chamber side which closes the exhaust passage to restore the communication of the processing chamber and the exhausting pump, and a viscous flow generating module for generating a viscous flow in a vicinity of the on-off valve which closes the exhaust passage and is disposed at the exhausting pump side.

To attain the above described first object, in a twenty-second aspect of the present invention, there is provided a computer-readable storage medium storing a program for causing a computer to implement a method for cleaning an exhaust system provided with an exhaust passage which allows a processing chamber of a substrate processing apparatus and an exhausting pump having at least one rotary blade to communicate with each other, and at least two on-off valves capable of shutting off communication of the processing chamber and the exhausting pump, the program comprising a shutoff module for shutting off the communication of the processing chamber and the exhausting pump by causing an on-off valve, which is disposed at the processing chamber side, of at least the two on-off valves to close the exhaust passage, a particle holding module for causing the on-off valve disposed at the processing chamber side which closes the exhaust passage to capture and hold particles flowing in the exhaust passage, and a module for causing the on-off valve holding the particles to retreat from the exhaust passage.

To attain the above described second object, in a twenty-third aspect of the present invention, there is provided a substrate processing apparatus provided with a processing chamber in which a substrate is subjected to processing, and an exhaust path which exhausts a gas inside the processing chamber, comprising a particle capturing component which is disposed on a scattering route of particles which scatter from a particle generation source which is present in at least one of the processing chamber and the exhaust path.

According to the construction of the twenty-third aspect as described above, the particle capturing component is disposed on a scattering route of the particles which scatter from the particle generating source which is present in at least one of the processing chamber and the exhaust path, and therefore, not only the electrically charged particles but also the particles which are not electrically charged can be captured. Therefore, the particles in the processing chamber can be efficiently captured without significantly changing the construction of the processing chamber.

Preferably, the particle capturing component is comprised of a flocculent body or a porous body.

According to the construction of the twenty-third aspect as described above, the particle capturing component is comprised of a flocculent body or a porous body, and therefore, the particle capturing component can reliably capture the particles, whereby the particles inside the processing chamber can be captured more efficiently.

Preferably, the particle capturing component is made of an impact absorbing material.

According to the construction of the twenty-third aspect as described above, the particle capturing component is made of an impact absorbing material, and therefore, it can absorb the kinetic energy of the scattered particles, whereby the particles in the processing chamber can be captured more efficiently.

Preferably, the particle capturing component is made of an adhesive material.

According to the construction of the twenty-third aspect as described above, the particle capturing component is made of an adhesive material, and the particle capturing component can reliably capture particles, whereby the particles inside the processing chamber can be captured more efficiently.

Preferably, the particle generation source is a movable component which is disposed in at least one of the processing chamber and the exhaust path.

Preferably, the particle generation source is a recess which is present in at least one of the processing chamber and the exhaust path.

To attain the above described second object, in a twenty-fourth aspect of the present invention, there is provided a particle capturing component included by a substrate processing apparatus having a processing chamber in which a substrate is subjected to processing, and an exhaust path which exhausts a gas inside the processing chamber, wherein the particle capturing component is disposed on a scattering route of particles which scatter from a particle generation source which is present in at least one of the processing chamber and the exhaust path.

To attain the above described first object, in a twenty-fifth aspect of the present invention, there is provided a method for cleaning an exhaust system provided with an exhaust passage which allows a processing chamber of a substrate processing apparatus and an exhausting pump having at least one rotary blade to communicate with each other, and an on-off valve capable of shutting off communication of the processing chamber and the exhausting pump, comprising a shutoff step of shutting off the communication of the processing chamber and the exhausting pump by causing the on-off valve to close the exhaust passage, a valve opening and closing step of causing the on-off valve which closes the exhaust passage to repeat opening and closing, while rotating the rotary blade of the exhausting pump, a cleaning step of cleaning an inside of the processing chamber of the substrate processing apparatus after the repetition of opening and closing of the on-off valve, and a carrying-in step of carrying a substrate into the processing chamber.

According to the construction of the twenty-fifth aspect as described above, the on-off valve closes the exhaust passage to shut off the communication of the processing chamber and the exhausting pump, the on-off valve which closes the exhaust passage repeats opening and closing, while the rotary blade of the exhausting pump is rotated, and thereafter, the inside of the processing chamber is cleaned and a substrate is carried into the processing chamber. The particles which flow toward the exhausting pump from the processing chamber are deposited on or adhere to the on-off valve which closes the exhaust passage. The particles which are deposited on or adhere to the on-off valve are separated from the on-off valve by the on-off valve repeating opening and closing. The separated particles infiltrate the exhausting pump, and the infiltrating particles collide against the rotating rotary blade and rebound to the processing chamber, but the particles rebounded to the processing chamber are removed by cleaning of the inside of the processing chamber, before the substrate is carried into the processing chamber. Thereby, the particles which are deposited on or adhere to the on-off valve and the particles inside the processing chamber can be removed before a substrate is carried into the processing chamber. As a result, the occurrence of the rebounding particles after carrying of a substrate into the processing chamber can be prevented, and the infiltration of the particles into the processing chamber can be prevented.

To attain the above described first object, in a twenty-sixth aspect of the present invention, there is provided a computer-readable storage medium storing a program for causing a computer to implement a method for cleaning an exhaust system provided with an exhaust passage which allows a processing chamber of a substrate processing apparatus and an exhausting pump having at least one rotary blade to communicate with each other, and an on-off valve capable of shutting off communication of the processing chamber and the exhausting pump, the program comprising a shutoff module for shutting off the communication of the processing chamber and the exhausting pump by causing the on-off valve to close the exhaust passage, a valve opening and closing module for causing the on-off valve which closes the exhaust passage to repeat opening and closing, while rotating the rotary blade of the exhausting pump, a cleaning module for cleaning an inside of the processing chamber of the substrate processing apparatus after the repetition of opening and closing of the on-off valve, and a carrying-in module for carrying a substrate into the processing chamber.

To attain the above described first object, in a twenty-seventh aspect of the present invention, there is provided an exhausting pump that exhausts a gas inside a processing chamber of a substrate processing apparatus, the exhausting pump comprising a cylindrical body, a rotary shaft disposed along a center axis of the body, and a plurality of rotary blades rotating with the rotary shaft as a center, the body housing the rotary shaft and the plurality of rotary blades, wherein in a rotary blade of the plurality of rotary blades which is the nearest to the processing chamber, a front end with respect to a direction of the rotation is oriented to an inner wall of the body.

According to the construction of the twenty-seventh aspect as described above, the front end with respect to the direction of the rotation of at least the nearest rotary blade of a plurality of rotary blades to the processing chamber is oriented to the inner wall of the body. The particles which infiltrate the body of the exhausting pump from the processing chamber and the like collide against the front end with respect to the direction of the rotation of the nearest rotary blade to the processing chamber, but the front end is oriented to the inner wall of the body, and therefore, the particles colliding against the front end rebound to only the inner wall of the body. As a result, the infiltration of the particles into the processing chamber can be prevented.

Preferably, the exhausting pump further comprises a particle capturing mechanism disposed at the inner wall of the body, which is opposed to the front end of the rotary blade.

According to the construction of the twenty-seventh aspect as described above, the particle capturing mechanism is disposed at the inner wall of the body which is opposed to the front end of the rotary blade, and therefore, the particles collided against the above described front end are captured by the particle capturing mechanism. As a result, the infiltration of particles into the processing chamber can be prevented without fail.

The above and other objects, features, and advantages of the invention will become more apparent from the following detailed description taken in conjunction with the accompanying drawings.

BRIEF DESCRIPTION OF THE DRAWINGS

FIG. 2A is a sectional view showing the positional relationships of the reflecting device, and an exhaust manifold, an APC valve and a TMP in FIG. 1, and FIG. 2B is a sectional view showing a variant of the reflecting device in FIG. 2A;

FIG. 3A is a sectional view showing the positional relationships of the reflecting device, and the exhaust manifold, the APC valve and the TMP in FIG. 1, and FIG. 3B is an enlarged sectional view of a part III in FIG. 3A;

FIG. 9A is a sectional view showing the exhausting pump, and FIG. 9B is a plane view of a reflector plate in the arrow direction in FIG. 9A;

FIG. 12A is a sectional view showing a first variant of the vent hole, FIG. 12B is a sectional view showing a second variant of the vent hole, FIG. 12C is a sectional view showing a third variant of the vent hole, FIG. 12D is a sectional view showing a fourth variant of the vent hole, FIG. 12E is a sectional view showing a fifth variant of the vent hole, FIG. 12F is a sectional view showing a sixth variant of the vent hole, FIG. 12G is a sectional view showing a seventh variant of the vent hole, and FIG. 12H is a sectional view showing an eighth variant of the vent hole;

FIG. 15A is a perspective view schematically showing the construction of the aggregate of a plurality of small rooms, and FIG. 15B is a view showing a state of collision of the particles introduced into each small room and a wall surface of the small room;

FIG. 22A is a sectional view of the same exhaust system, and FIG. 22B is a sectional view of a variant of the same exhaust system;

FIG. 27A is a vertical sectional view of the TMP, and FIG. 27B is a sectional view taken along the line I to I in FIG. 27A.

DETAILED DESCRIPTION OF THE PREFERRED EMBODIMENTS

The present invention will now be described in detail with reference to the drawings showing preferred embodiments thereof.

First, a substrate processing apparatus to which a reflecting device according to a first embodiment of the present invention is applied will be described.

Figure 1:
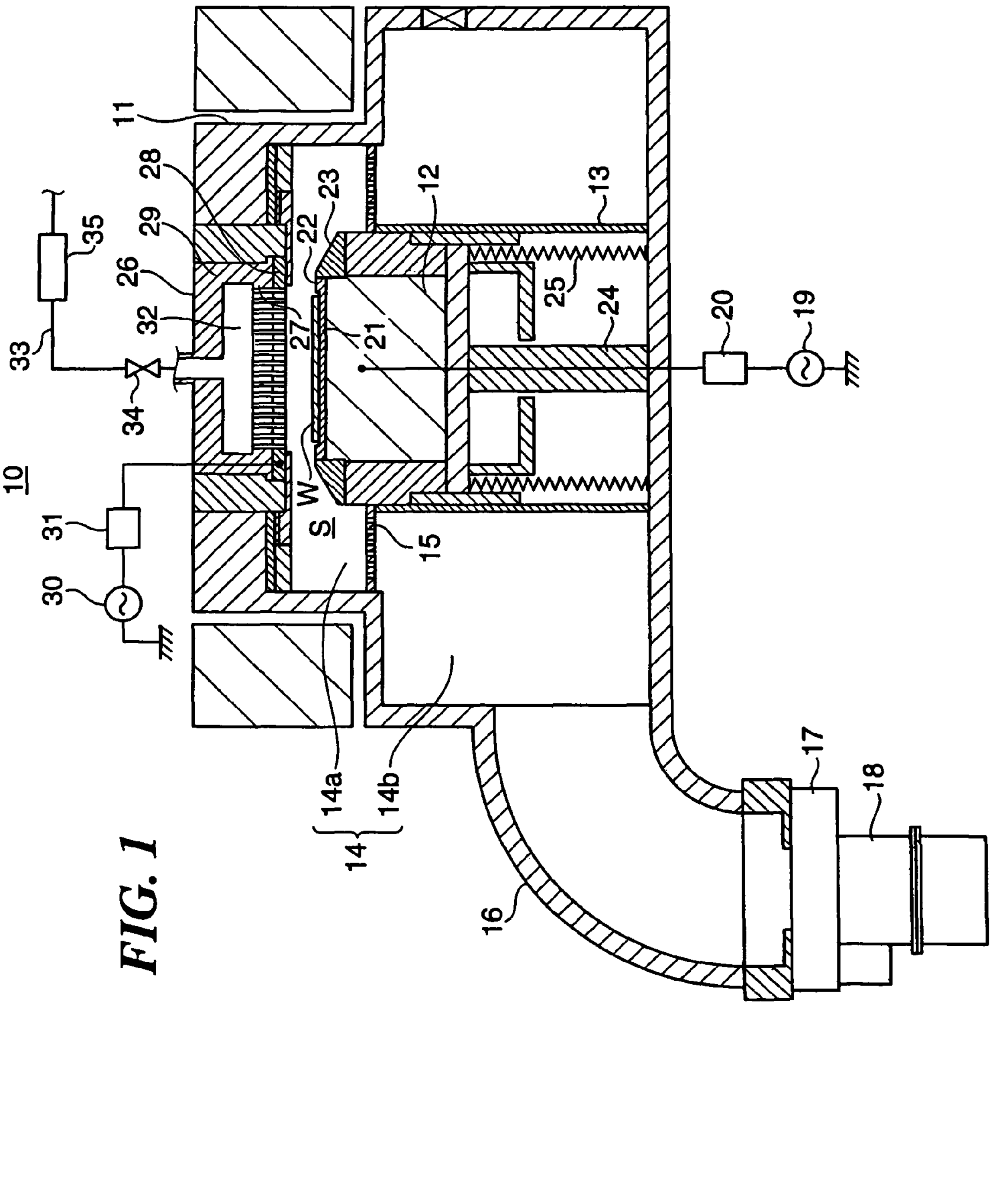
FIG. 1 is a sectional view schematically showing the construction of a substrate processing apparatus to which a reflecting device according to a first embodiment of the present invention is applied.

FIG. 1 is a sectional view schematically showing the construction of the substrate processing apparatus to which the reflecting device according to the first embodiment of the present invention is applied.

In FIG. 1, a substrate processing apparatus 10 that is constructed as an etching processing apparatus which subjects semiconductor wafers W (hereinafter referred to merely as "wafers W") to reactive ion etching (Reactive Ion Etching)

(hereinafter, referred to as "RIE") is provided with a chamber 11 which is made of metal, for example, aluminum or stainless steel and has the shape with a larger and a smaller cylinders stacked on each other.

In the chamber 11, a lower electrode 12 ascending and descending in the chamber 11 with the mounted wafer W as a wafer stage on which the wafer W having a diameter of, for example, 200 mm is mounted, and a cylindrical cover 13 which covers a side part of the lower electrode 12 that ascends and descends are disposed, and an exhaust path 14 which acts as a flow path through which a gas inside the chamber 11 is discharged to the outside of the chamber 11 and which is formed by a side wall of the chamber 11 and the side part of the lower electrode 12 or the cover 13.

An annular baffle plate 15 that divides the exhaust path 14 into an upstream part 14*a* and a downstream part 14*b* is disposed halfway along the exhaust path 14, and the downstream part 14*b* communicates with a TMP 18 which is an exhausting pump for evacuation via an exhaust manifold 16 (communicating pipe) and an automatic pressure control (Automatic Pressure Control) (hereinafter referred to as the "APC") valve 17 which is a variable slide valve. The APC valve 17 may be a butterfly valve. The TMP 18 reduces the pressure in the chamber 11 down to a substantially vacuum state, and the APC valve 17 controls the pressure in the chamber 11 in pressure reduction of the chamber 11. In this case, the baffle plate 15 has a plurality of vent holes each in the shape of a circular hole, which allow the upstream part 14*a* and the downstream part 14*b* of the exhaust path 14 to communicate with each other.

The above described exhaust path 14, baffle plate 15, exhaust manifold 16, APC valve 17 and TMP 18 make up an exhaust system.

A lower high-frequency power source 19 is connected to the lower electrode 12 via a lower matching box 20, and the lower high-frequency power source 19 applies predetermined high-frequency electrical power to the lower electrode 12. The lower matching box 20 reduces reflection of the high-frequency electrical power from the lower electrode 12 so as to maximize the efficiency of the incidence of the high-frequency electrical power into the lower electrode 12.

An ESC 21 for attracting the wafer W with an electrostatic attracting force is disposed at an upper part of the lower electrode 12. A DC power source (not shown) is electrically connected to the ESC 21. The ESC 21 attracts and holds the wafer W on its upper surface through a Coulomb force or a Johnsen-Rahbek force generated by a DC voltage applied to the ESC 21 from the DC power source. Moreover, an annular focus ring 22 made of silicon (Si) or the like is disposed at a peripheral edge of the ESC 21, and the focus ring 22 focuses ions and radicals produced over the lower electrode 12 on the wafer W. The periphery of the focus ring 22 is covered with an annular cover ring 23.

A support 24 extending downward from the lower part of the lower electrode 12 is disposed under the lower electrode 12. The support 24 supports the lower electrode 12, and moves the lower electrode 12 up and down by turning a ball screw not shown. The support 24 is covered with a bellows cover 25 in its periphery to be shut off from the atmosphere in the chamber 11.

In the substrate processing apparatus 10, the lower electrode 12 moves down to a carrying in/out position of the wafer W when the wafer W is carried in and out of the chamber 11, and the lower electrode 12 moves up to a processing position of the wafer W when the wafer W is subjected to RIE processing.

A shower head 26 which supplies a processing gas that will be described later into the chamber 11 is disposed at a ceiling part of the chamber 11. The shower head 26 has a disk-shaped upper electrode (CEL) 28 having a large number of gas-passing holes 27 which face a processing space S that is a space above the lower electrode 12, and an electrode support 29 which is disposed above the upper electrode 28 and detachably supports the upper electrode 28.

An upper high-frequency power source 30 is connected to the upper electrode 28 via an upper matching box 31, and the upper high-frequency power source 30 applies predetermined high-frequency electrical power to the upper electrode 28. The upper matching box 31 reduces reflection of the high-frequency electrical power from the upper electrode 28 so as to maximize the efficiency of the incidence of the high-frequency electrical power to the upper electrode 28.

A buffer chamber 32 is provided inside the electrode support 29, and a processing gas introducing pipe 33 is connected to the buffer chamber 32. A valve 34 is disposed halfway along the processing gas introducing pipe 33, and a filter 35 is further disposed upstream of the valve 34. A processing gas comprised of any one or the combination of silicon tetrafluoride ($SiF_4$), an oxygen gas ($O_2$), an argon gas (Ar) and carbon tetrafluoride ($CF_4$) is introduced into the buffer chamber 32 through, for example, the processing gas introducing pipe 33, and the introduced processing gas is supplied to the processing space S via the gas-passing holes 27.

In the chamber 11 of the substrate processing apparatus 10, the high-frequency electrical power is applied to the lower electrode 12 and the upper electrode 28 as described above, a high-density plasma is produced from the processing gas in the processing space S by the applied high-frequency electrical power, and ions and radicals are produced. These produced radicals and ions are focused on the surface of the wafer W by the focus ring 22, and physically or chemically etch the surface of the wafer W.

Figure 2A:
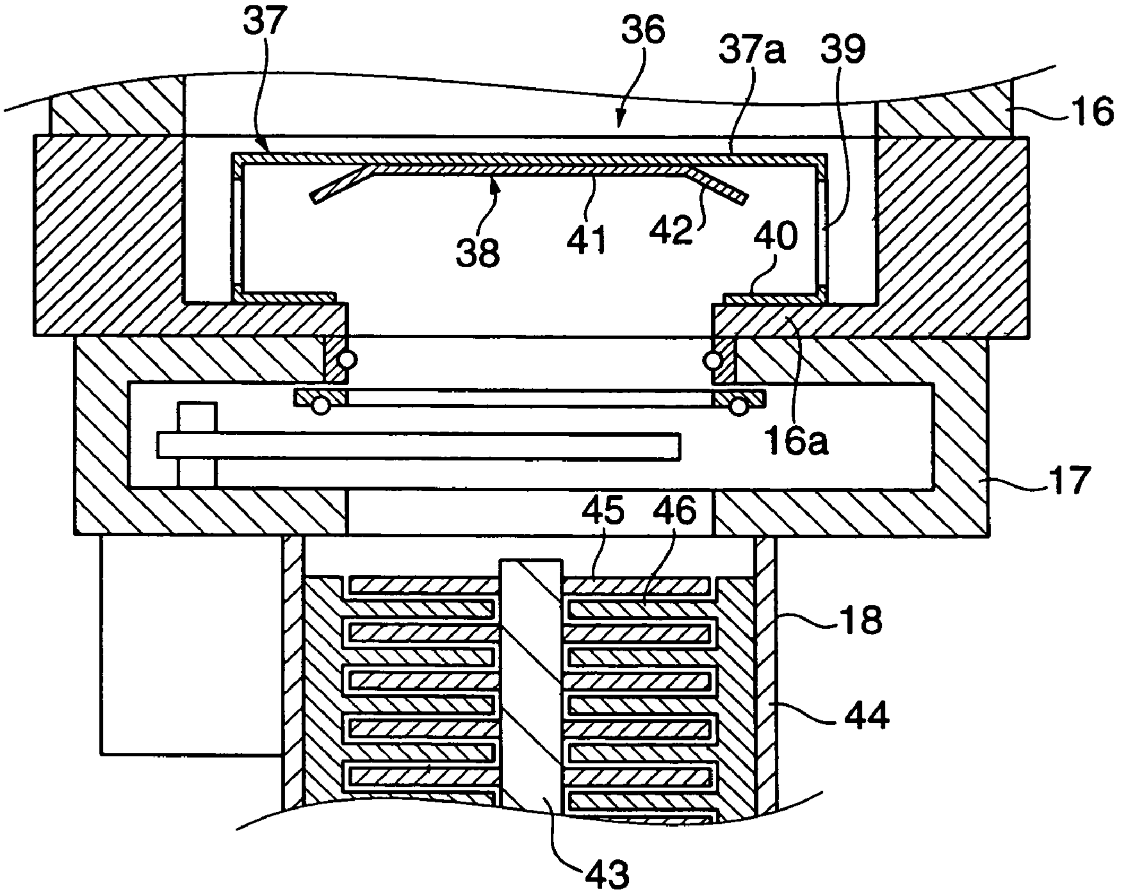
FIGS. 2A and 2B are sectional views schematically showing the construction of the reflecting device according to the present embodiment.
Figure 2B:
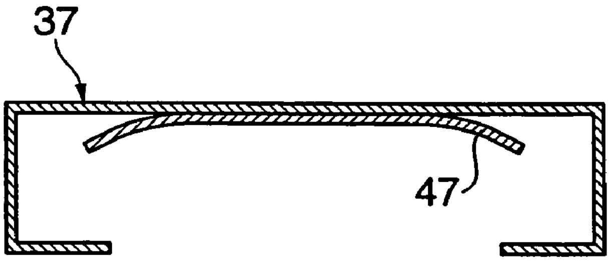

FIGS. 2A and 2B are sectional views schematically showing the construction of the reflecting device according to the present embodiment; FIG. 2A is a sectional view showing the positional relationships of the reflecting device, and the exhaust manifold, the APC and the TMP in FIG. 1, and FIG. 2B is a sectional view showing a variant of the reflecting device in FIG. 2A. In FIG. 2A, the upper part in the drawing is referred to as "the upper side", and the lower part in the drawing is referred to as "the lower side".

In FIG. 2A, the reflecting device 36 is disposed inside the exhaust manifold 16 to be opposed to the TMP 18 via the APC valve 17. Specifically, the reflecting device 36 is disposed inside a flange part 16*a* connecting to the APC valve 17, in the exhaust manifold 16.

The reflecting device 36 is provided with a reflector plate support 37 comprised of a cylinder disposed vertically, and a reflector plate 38 disposed on an upper surface of the reflector plate support 37.

The reflector plate support 37 has an upper plate 37*a* (opposing surface) which blocks the upper side end part, an opening 39 which is open in a side surface, and a flange-shaped joint part 40 which is bent toward an inside of the above described cylinder at a lower side end part. The joint part 40 joins the reflecting device 36 to the inside of the exhaust manifold 16 by being joined to the flange part 16*a*. The aperture area of the opening 39 is set at such a size that does not reduce conductance of the exhaust to the APC valve 17 from the exhaust manifold 16.

The reflector plate 38 is comprised of a disk-shaped first reflecting surface member 41 which is joined to an undersurface of the upper plate 37*a* of the reflector plate support 37 to be opposed to the TMP 18, and an annular second reflecting surface member 42 which is disposed at a peripheral edge of the first reflecting surface member 41 and of which plane angle is set to be oriented to the TMP 18, especially to a rotary shaft 43 in the TMP 18.

The TMP 18 is provided with the rotary shaft 43 which is disposed along the vertical direction in FIG. 2A, namely, the direction of the exhaust stream, a cylindrical body 44 which is disposed parallel with the rotary shaft 43 to house the rotary shaft 43, a plurality of blade-shaped rotary blades 45 which are projected orthogonally from the rotary shaft 43, and a plurality of blade-shaped stator blades 46 which are projected toward the rotary shaft 43 from the inner peripheral surface of the body 44.

The plurality of rotary blades 45 are radially projected from the rotary shaft 43 to form a rotary blade group, and the plurality of stator blades 46 are equidistantly disposed in the same circumference of the inner peripheral surface of the body 44, and are projected toward the rotary shaft 43 to form a stator blade group. In the TMP 18, a plurality of rotary blade groups and stator blade groups are present, and each rotary blade group is equidistantly disposed along the rotary shaft 43, and each stator blade group is disposed between the adjacent two rotary blade groups.

Generally, the uppermost rotary blade group is disposed over the uppermost stator blade group in the TMP 18. Namely, the uppermost rotary blade group is disposed closer to the chamber 11 than the uppermost stator blade group. The TMP 18 exhausts the gas upstream of the rotary blades 45 to toward downstream of the TMP 18 at a high speed by rotating the rotary blades 45 at a high speed with the rotary shaft 43 as a center, but the uppermost rotary blade group is disposed closer to the chamber 11 than the uppermost stator blade group as described above, and therefore, when some of the particles discharged from the chamber 11 reach the TMP 18, they collide against the rotary blades 45 rotating at a high speed and rebound upstream, namely, the exhaust manifold 16.

The rebounded particles infiltrate the exhaust manifold 16, and contact the reflector plate 38 of the reflecting device 36. Since the first reflecting surface member 41 of the reflector plate 38 is opposed to the TMP 18, and the second reflecting surface member 42 is oriented to the rotary shaft 43 of the TMP 18, the particles which contact and are reflected by the reflector plate 38 drop toward the TMP 18. Namely, the reflecting device 36 reflects the particles which are rebounded by the rotary blades 45 toward the TMP 18.

According to the reflecting device of the present embodiment, the reflecting device 36 is disposed in the exhaust manifold 16, and is provided with the reflector plate 38 comprised of the first reflecting surface member 41 which is opposed to the TMP 18 and the second reflecting surface member 42 which is oriented to the rotary shaft 43 of the TMP 18, and therefore, it can reflect the particles which are rebounded by the rotary blades 45 toward the TMP 18, whereby the infiltration of the rebounded particles into the chamber 11 can be prevented. As a result, adherence of particles to the wafer W which is subjected to RIE processing by the substrate processing apparatus 10 is prevented, and yields of the wafers W can be increased. The reflecting device 36 can reflect not only the rebounded particles but also the adherents which peel off from the rotary blades 45 of the TMP 18 toward the TMP 18 in the same way as the rebounded particles. Moreover, by reducing the speed at which the particles adhering to the inner wall in the exhaust manifold 16 through reflection of the rebounded particles, the frequency of cleaning the exhaust manifold 16 can be also reduced.

In the reflecting device according to the above described present embodiment, the reflector plate 38 is constructed by the disk-shaped first reflecting surface member 41 and the annular second reflecting surface member 42, but the shape of the reflector plate is not limited to this, and the reflector plate may be constructed by, for example, a spherical surface member 47 as shown in FIG. 2B. Especially, the spherical surface member is preferably formed by the spherical surface oriented to the TMP 18. In this case, it is confirmed by the inventors of the present invention and others that the particles performs mirror reflection against the reflecting surface. Therefore, when the reflector plate is constructed by the spherical surface member 47 which is formed by the spherical surface oriented to the TMP 18, the rebounded particles can be efficiently reflected toward the rotary blades 45, and thereby, the infiltration of the rebounded particles into the chamber 11 can be prevented without fail.

Next, a reflecting device according to a second embodiment of the present invention will be described.

The present embodiment is basically the same as the above described first embodiment in its construction and operation, and differs from the above described first embodiment in that the present embodiment does not have a reflector plate. Therefore, the explanation of the redundant construction and operation is omitted, and the explanation of the different construction and operation will be made hereinafter.

Figure 3A:
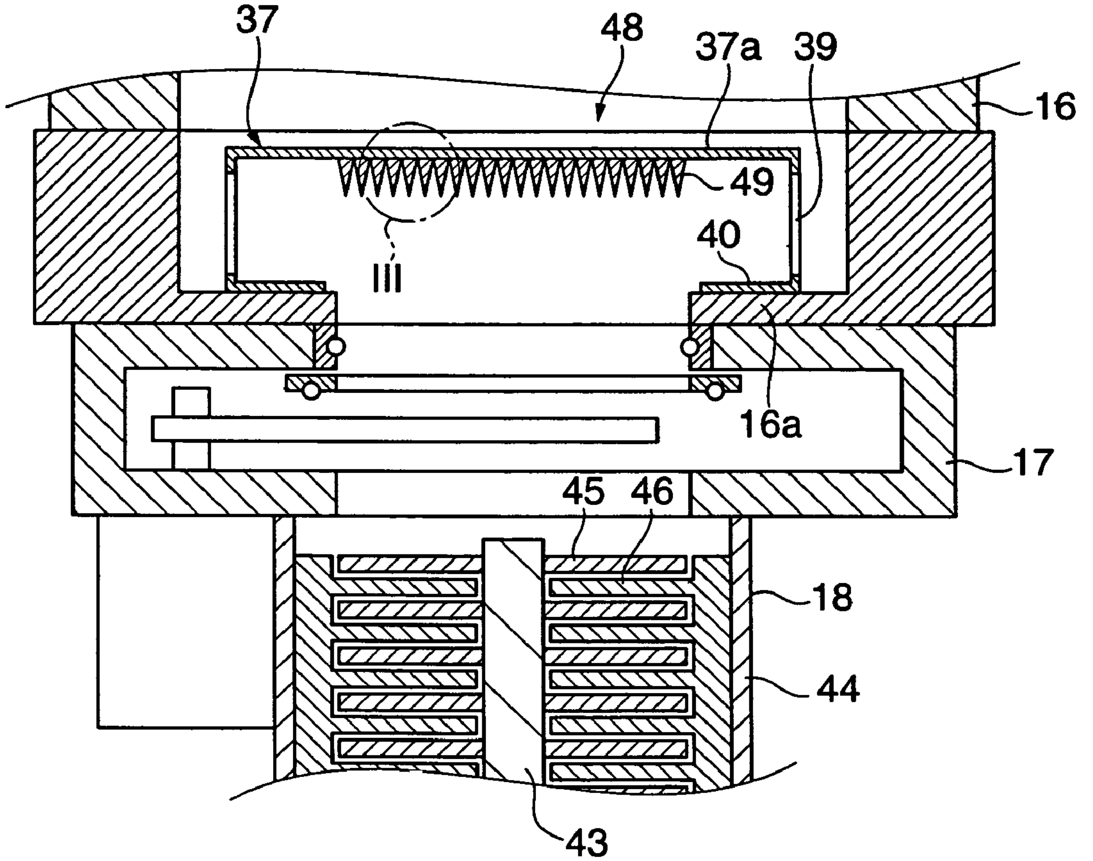
FIGS. 3A and 3B are sectional views schematically showing the construction of a reflecting device according to a second embodiment of the present invention.
Figure 3B:
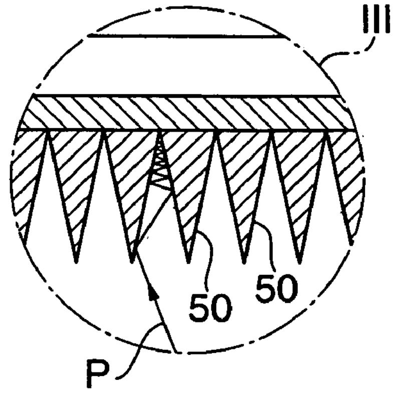

FIGS. 3A and 3B are sectional views schematically showing the construction of the reflecting device according to the present embodiment, FIG. 3A is a sectional view showing the positional relationships of the reflecting device, and the exhaust manifold, the APC and the TMP in FIG. 1, and FIG. 3B is an enlarged sectional view of part III in FIG. 3A. In FIG. 3A, the upper part in the drawing is referred to as "the upper side" and the lower part in the drawing is referred to as "the lower side".

In FIG. 3A, a reflecting device 48 is disposed inside the flange part 16*a* in the exhaust manifold 16 similarly to the reflecting device 36 in FIG. 2A, and is provided with the reflector plate support 37, and a projected member group 49 (kinetic energy reducing mechanism) which is disposed on the upper plate 37*a* of the reflector plate support 37.

The projected member group 49 is comprised of a plurality of conical members 50 which are disposed to project toward the TMP 18, and each conical member 50 is disposed so that a plane part present between the adjacent conical members 50 becomes minimum. The conical member 50 may be made of any one of a metal (for example, stainless steel and aluminum), resin, rubber and the like.

In the reflecting device 48, a particle P which rebounds toward the exhaust manifold 16 infiltrates a space between the adjacent two conical members 50 and repeats collisions against the side surface of each conical member 50 a plurality of times between the two conical members 50. The particle P consumes kinetic energy while repeating collisions against the side surface a plurality of times, and eventually drops toward the TMP 18. Namely, the reflecting device 48 reduces the kinetic energy of the rebounded particle P.

According to the reflecting device of the present embodiment, the reflecting device 48 is disposed inside the exhaust manifold 16, and is provided with the projected member group 49 comprised of the plurality of conical members 50 which are disposed to project toward the TMP 18. Therefore, the reflecting device 48 reliably reduces the kinetic energy of the particle P rebounded by the rotary blade 45 by causing the particle P to collide against the conical members 50 in the projected member group 49 a plurality of times, and can cause the rebounded particle P to drop toward the TMP 18, whereby the infiltration of the rebounded particles into the chamber 11 can be prevented.

In the reflecting device according to the above described present embodiment, the projected member group 49 is constructed by the plurality of conical members 50, but the projected member group 49 may be constructed by projected members in other projected shapes, the projected members having the shape of any one of, for example, a pyramid, a cylinder, a prism and a hemisphere. Thereby, the projected member can be easily molded, and the manufacturing cost of the reflecting device can be reduced.

The reflecting device of the above described present embodiment may have a recessed member group comprised of a plurality of recessed members instead of the projected member group 49. In this case, the particle P rebounded by the rotary blade 45 is caused to infiltrate the recessed shape of the recessed member, and the kinetic energy of the particle P that infiltrates it can be reduced without fail by causing the particle P to collide against the recessed member a plurality of times. The recessed shape of the recessed member may be comprised of any one of a cone, a pyramid, a cylinder, a prism and a hemisphere, and in this case, the recessed member can be easily molded, and the manufacturing cost of the reflecting device can be reduced.

Further, the reflecting device according to the above described present embodiment may have an impact absorbing material which is disposed to be opposed to the TMP 18, for example, an impact absorbing part (not shown)(kinetic energy reducing mechanism) made of soft rubber at the upper plate 37*a* of the reflector plate support 37. In this case, the impact absorbing part absorbs the kinetic energy of the rebounded particles, and thereby, the infiltration of the rebounded particles into the chamber 11 can be prevented without fail.

Next, a communicating pipe of a third embodiment of the present invention will be described.

Figure 4:
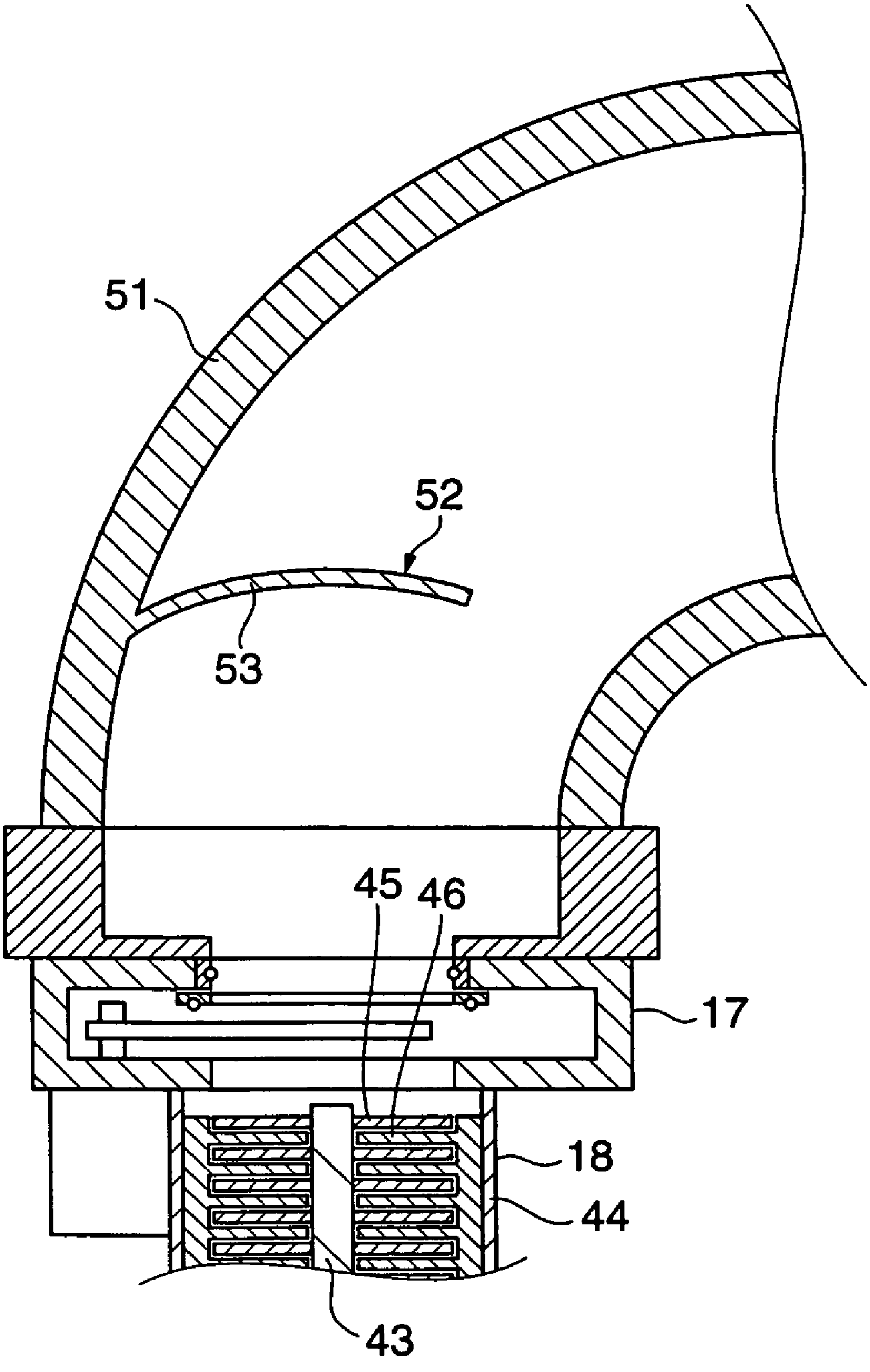
FIG. 4 is a sectional view schematically showing the construction of the exhaust manifold as a communicating pipe according to a third embodiment of the present invention.

FIG. 4 is a sectional view schematically showing the construction of an exhaust manifold as a communicating pipe according to the present embodiment. The communicating pipe according to the present embodiment is basically the same as the exhaust manifold 16 in FIG. 1 in construction, and differs from it in that it is provided with therein a reflector plate 52 which will be described later. Therefore, the explanation of the redundant construction and operation will be omitted, and the explanation of the different construction and operation will be made hereinafter. In FIG. 4, the upper part in the drawing is referred to as "the upper side", and the lower part in the drawing is referred to as "the lower side".

In FIG. 4, an exhaust manifold 51 is provided with a reflector plate 52 (at least a part of an inner wall) in an inside thereof, and the reflector plate 52 is comprised of a spherical surface member 53 which is projected from the inner wall in the exhaust manifold 51 so as to cover the upper side of the TMP 18 and is formed by a spherical surface oriented to the TMP 18. The size of the reflector plate 52 is set at such a size that does not reduce conductance of the exhaust from the chamber 11 to the APC valve 17.

When some of the particles discharged from the chamber 11 reach the TMP 18, they collide against the rotary blades 45 which rotate at a high speed and are rebounded toward the exhaust manifold 51. The rebounded particles infiltrate the exhaust manifold 51 and contact the reflector plate 52 in the exhaust manifold 51. The reflector plate 52 is comprised of the spherical surface member 53 which is formed by the spherical surface oriented to the TMP 18, and therefore, the particles which contact the reflector plate 52 and are reflected drop toward the TMP 18. Namely, the reflector plate 52 reflects the particles, which are rebounded by the rotary blades 45, toward the TMP 18.

According to the communicating pipe of the present embodiment, the exhaust manifold 51 is provided with the reflector plate 52 therein, and the reflector plate 52 is comprised of the spherical surface member 53 formed by the spherical surface oriented to the TMP 18, and therefore, can reflect the particles rebounded by the rotary blades 45 toward the TMP 18, whereby the infiltration of the rebounded particles into the chamber 11 can be prevented.

Next, a communicating pipe according to a fourth embodiment of the present invention will be described.

The present embodiment is basically the same as the above described third embodiment in its construction and operation, and differs from the above described third embodiment in that it does not have a reflector plate. Therefore, the explanation of the redundant construction and operation will be omitted, and an explanation of the different construction and operation will be made hereinafter.

Figure 5:
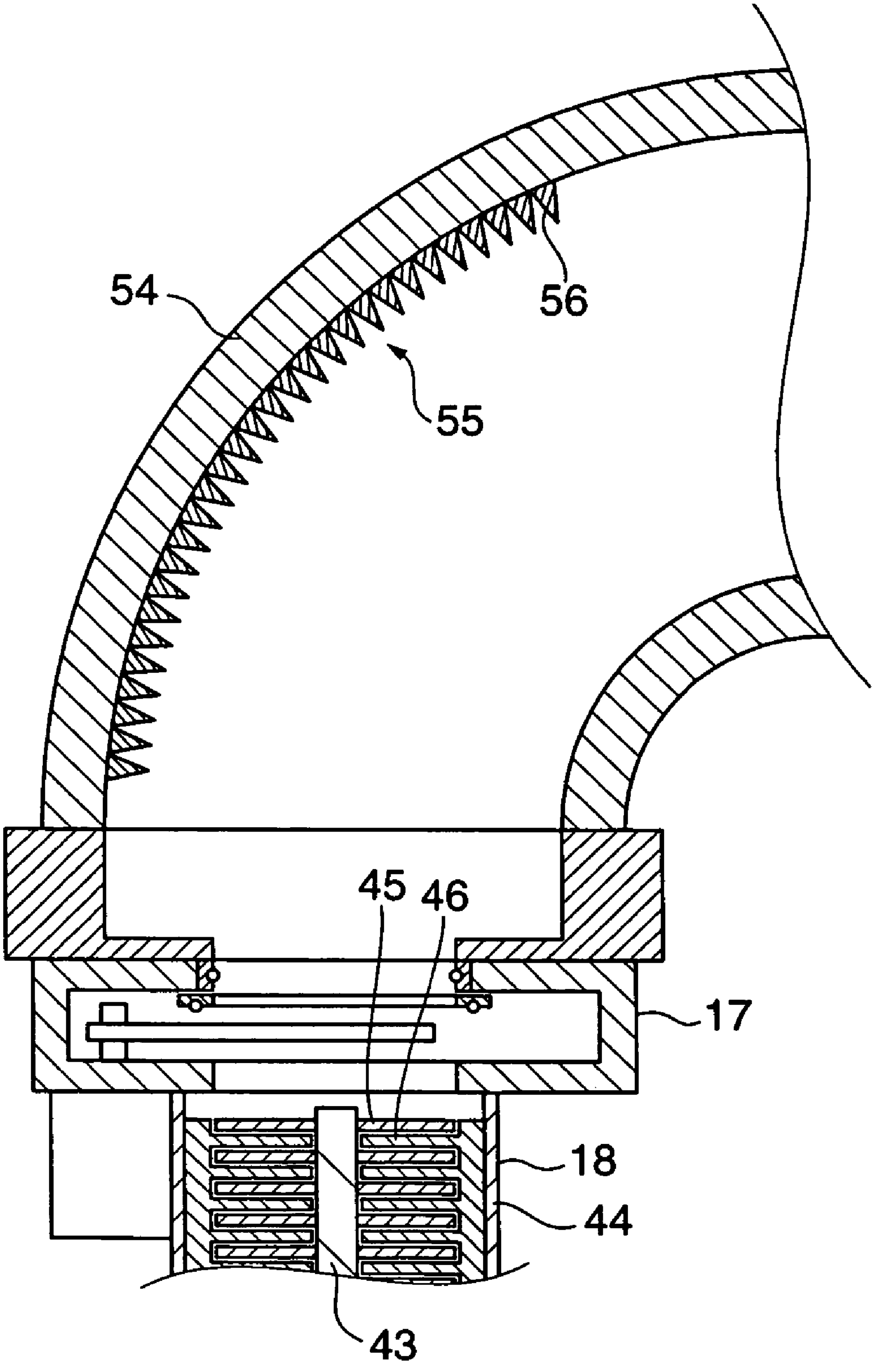
FIG. 5 is a sectional view schematically showing the construction of the exhaust manifold as a communicating pipe according to a fourth embodiment of the present invention.

FIG. 5 is a sectional view schematically showing the construction of an exhaust manifold as the communicating pipe according to the present embodiment.

In FIG. 5, an exhaust manifold 54 is provided with a projected member group 55 (kinetic energy reducing mechanism) which is disposed on an opposed surface, which is opposed to the TMP 18, in the inner wall.

The projected member group 55 is comprised of a plurality of conical members 56 which are disposed to project toward the TMP 18 from the inner wall in the exhaust manifold 54, and each conical member 56 is disposed so that a surface present between each conical member 56 and the adjacent conical member 56 becomes minimum. The conical member 56 may be made of any one of a metal (for example, stainless steel and aluminum), resin, rubber and the like.

In this exhaust manifold 54, the particles which are rebounded toward the exhaust manifold 54 infiltrate a space between the adjacent two conical members 56 and repeat collision against the side surface of each of the conical members 56 a plurality of times between the adjacent two conical members 56. The particles consume kinetic energy while repeating collision against the side surfaces a plurality of times, and eventually drop toward the TMP 18. Namely, the exhaust manifold 54 reduces the kinetic energy of the rebounded particles.

According to the communicating pipe of the present embodiment, the exhaust manifold 54 is provided with the projected member group 55 comprised of a plurality of conical members 56 which are disposed to project toward the TMP 18 from the inner wall thereof. Therefore, the kinetic energy of the particles rebounded by the rotary blades 45 is reduced without fail by causing the particles to collide against the conical members 56 in the projected member group 55 a plurality of times, and the rebounded particles can be dropped toward the TMP 18, whereby the infiltration of the rebounded particles into the chamber 11 can be prevented.

In the communicating pipe according to the above described present embodiment, the projected member group 55 is constructed by a plurality of conical members 56, but the projected member group 55 may be constructed by the projected members in other projected shapes, the projected members each having the shape of any one of, for example, a pyramid, a column, a prism and a hemisphere. Thereby, the projected member can be easily molded, and the manufacturing cost of the communicating pipe can be reduced.

In the communicating pipe according to the above described embodiment, the projected member group 55 is disposed on the opposed surface, which is opposed to the TMP 18, in the inner wall, but the projected member group may be disposed on a surface, which is not opposed to the TMP 18, in the inner wall. Many of the particles rebounded by the rotary blades 45 collide against the opposed surface, which is opposed to the TMP 18, in the inner wall of the communicating pipe, but the particles which collide against it perform mirror reflection and also collide against the surface which is not opposed to the TMP 18. Thereby, the kinetic energy of the particles can be also reduced by the projected member group which is disposed on the surface which is not opposed to the TMP 18.

The communicating pipe according to the above described embodiment may have a recessed member group comprised of a plurality of recessed members instead of the projected member group 55. In this case, the particles rebounded by the rotary blades 45 are caused to infiltrate the recessed shapes of the recessed members, and the kinetic energy of the particles that infiltrate them can be reduced without fail by causing the particles to collide against the recessed members a plurality of times. The recessed shape of the recessed member may be comprised of any one of a cone, a pyramid, a column, a prism and a hemisphere. In this case, the recessed member can be easily molded, and the manufacturing cost of the communicating pipe can be reduced.

Further, the communicating pipe according to the above described embodiment may have an impact absorbing material which is disposed on the opposed surface, which is opposed to the TMP 18, in the inner wall of the communicating pipe, for example, an impact absorbing part made of soft rubber (not shown) (kinetic energy reducing mechanism), instead of the projected member group comprised of a plurality of projected members. In this case, the impact absorbing part absorbs the kinetic energy of the rebounded particles, and thereby, the infiltration of the rebounded particles into the chamber 11 can be prevented without fail.

The impact absorbing part may be disposed on the surface, which is not opposed to the TMP 18, in the inner wall. As described above, the particles which are rebounded by the rotary blades 45 also collide against the surface which is not opposed to the TMP 18. Thereby, the kinetic energy of the particles can be also absorbed by the impact absorbing part which is disposed on the surface which is not opposed to the TMP 18.

Next, a communicating pipe according to a fifth embodiment of the present invention will be described.

The present embodiment is basically the same as the above described fourth embodiment in its construction and operation, and differs from the above described fourth embodiment in that it is provided with a fin-shaped member group instead of the projected member group. Therefore, the explanation of the redundant construction and operation will be omitted, and an explanation of the different construction and operation will be made hereinafter.

Figure 6:
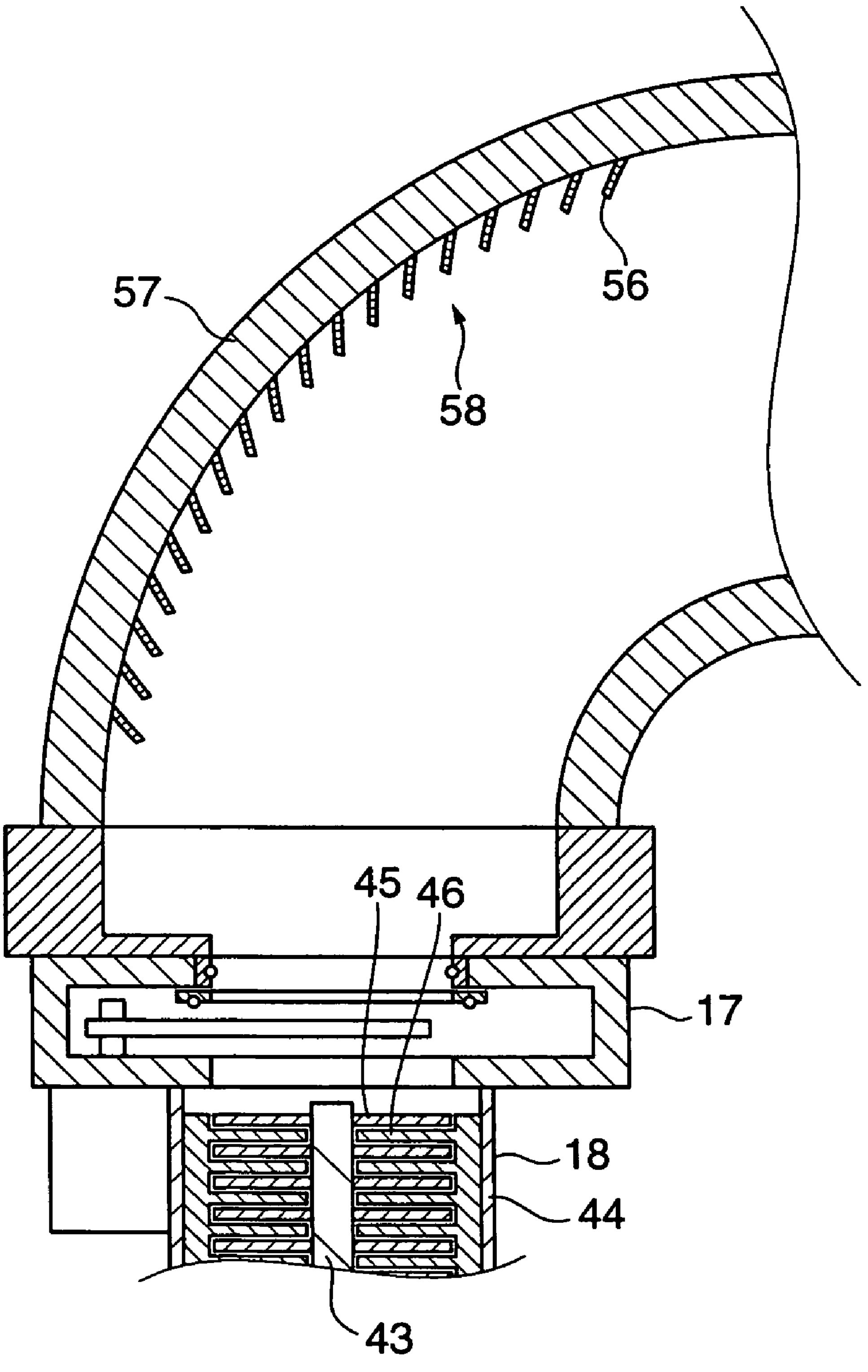
FIG. 6 is a sectional view schematically showing the construction of the exhaust manifold as a communicating pipe according to a fifth embodiment of the present invention.

FIG. 6 is a sectional view schematically showing the construction of an exhaust manifold as a communicating pipe according to the present embodiment.

In FIG. 6, an exhaust manifold 57 is provided with a fin-shaped member group 58 (kinetic energy reducing mechanism) which is disposed on the opposed surface, which is opposed to the TMP 18, in the inner wall.

The fin-shaped member group 58 is comprised of a plurality of fin-shaped members 59 which are disposed to project toward the TMP 18 from the inner wall in the exhaust manifold 57. The fin-shaped member 59 may be made of any one of a metal (for example, stainless steel and aluminum), resin, rubber and the like.

In this exhaust manifold 57, the particles which are rebounded toward the exhaust manifold 57 infiltrate a space between the adjacent two fin-shaped members 59 and repeat collision against the side surface of each of the fin-shaped members 59 a plurality of times between the two fin-shaped members 59. The particles consume kinetic energy while repeating collision against the side surfaces a plurality of times, and eventually drop toward the TMP 18. Namely, the exhaust manifold 57 reduces the kinetic energy of the rebounded particles.

According to the communicating pipe of the present embodiment, the exhaust manifold 57 is provided with the fin-shaped member group 58 comprised of a plurality of fin-shaped members 59 which are disposed to project toward the TMP 18 from the inner wall thereof, and therefore, it reliably reduces the kinetic energy of the particles rebounded by the rotary blades 45 by causing the particles to collide against the fin-shaped members 59 in the fin-shaped member group 58 a plurality of times, and can drop the rebounded particles toward the TMP 18, whereby the infiltration of the rebounded particles into the chamber 11 can be prevented.

The fin-shaped member group may be disposed on a surface, which is not opposed to the TMP 18, in the inner wall. As described above, the particles rebounded by the rotary blades 45 also collide against the surface which is not opposed to the TMP 18. Thereby, the kinetic energy of the particles can be also reduced by the fin-shaped member group which is disposed on the surface which is not opposed to the TMP 18.

Next, a communicating pipe according to a sixth embodiment of the present invention will be described.

The present embodiment is basically the same as the above described fourth embodiment in its construction and operation, and differs from the above described fourth embodiment in that it is provided with a flocculent body instead of the projected member group. Therefore, the explanation of the redundant construction and operation will be omitted, and an explanation of the different construction and operation will be made hereinafter.

Figure 7:
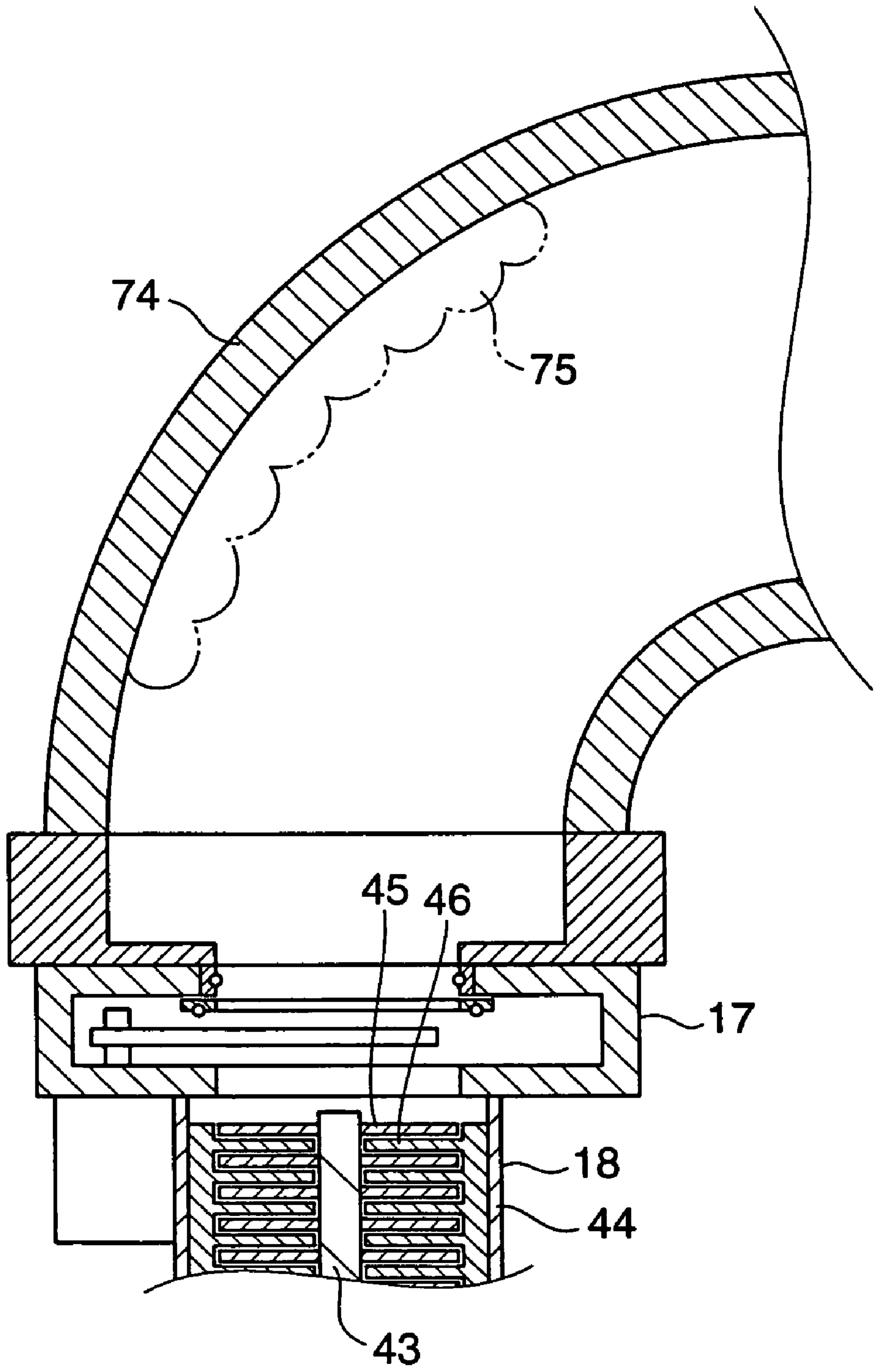
FIG. 7 is a sectional view schematically showing the construction of the exhaust manifold as a communicating pipe according to a sixth embodiment of the present invention.

FIG. 7 is a sectional view schematically showing the construction of an exhaust manifold as a communicating pipe according to the present embodiment.

In FIG. 7, an exhaust manifold 74 is provided with a flocculent body 75 (particle capturing mechanism) which is disposed on the opposed surface, which is opposed to the TMP 18, in the inner wall.

The flocculent body 75 is an aggregate of a flocculent metal (for example, stainless felt and steel wool), chemical fiber (for example, fluororesin felt (specifically, Teflon (registered trademark) felt), and polyurethane fiber) and the like, and is joined to an inner wall surface of the exhaust manifold 74 by an adhesive and a hook (not shown) which is projected from the exhaust manifold 74. As the fluororesin, polytetrafluoroehylene (PTFE), a tetrafluoroethylene-perfluoroalkylvinylether copolymer (PFA), a tetrafluoroethylene-hexafluoropropylene copolymer (FEP), a tetrafluoroethylene-ethylene copolymer (ETFE), polyvinylidene fluoride (PVDF), polychlorotrifluoroethylene (PCTFE) or the like is applicable.

In this exhaust manifold 74, the particles rebounded toward the exhaust manifold 74 infiltrate the flocculent body 75, and are captured by a flocculent structure of the flocculent body 75.

Figure 13:
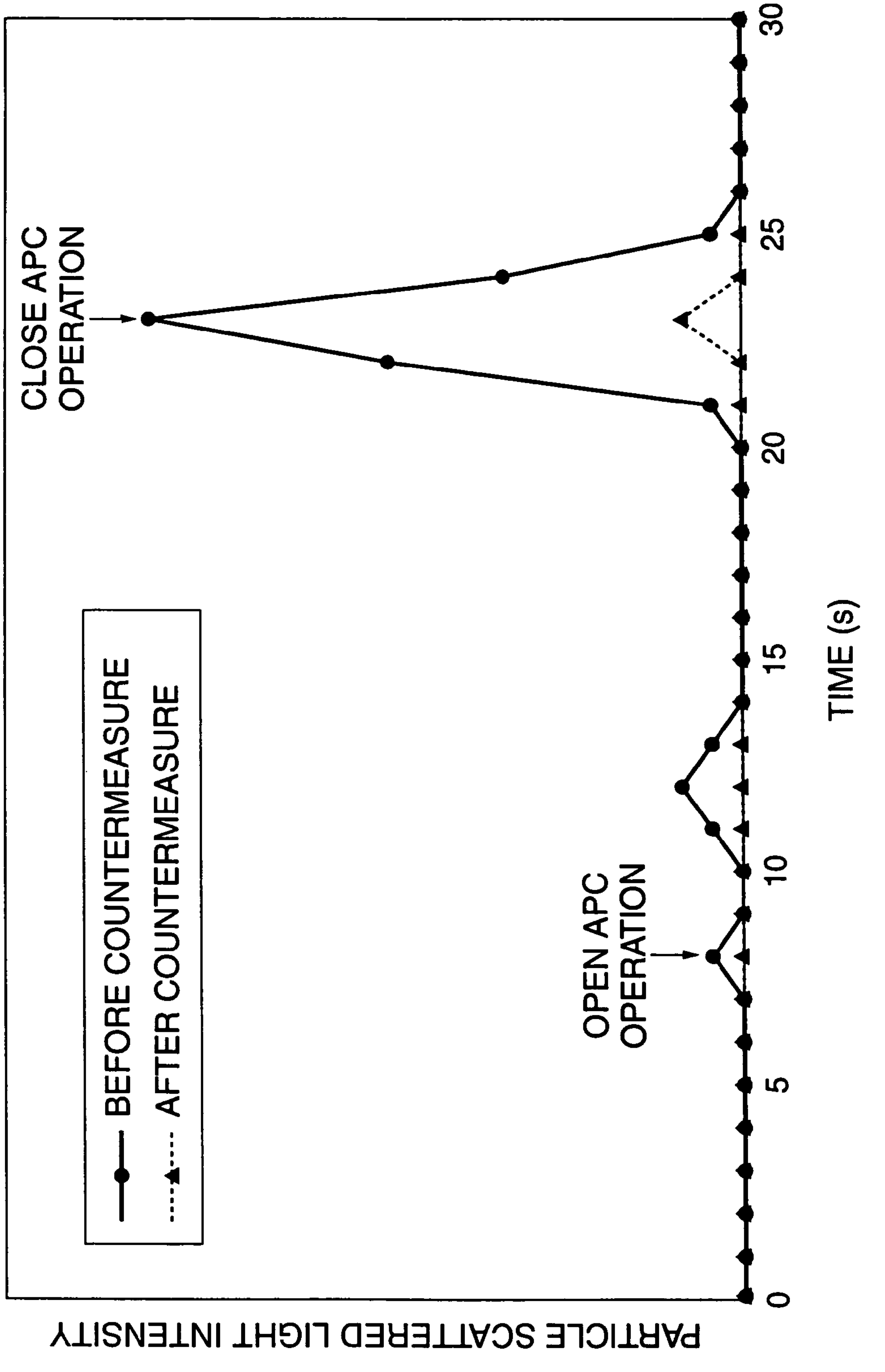
FIG. 13 is a graph showing the result of confirming the occurrence situation of the particles in the chamber of the substrate processing apparatus to which the communicating pipe according to the sixth embodiment of the present invention is applied.

FIG. 13 is a graph showing the result of confirming the state of occurrence of the particles in the chamber of the substrate processing apparatus to which the communicating pipe according to this embodiment is applied.

In the graph in FIG. 13, the vertical axis represents particle scattered light intensity in the chamber, and the horizontal axis represents time. The particle scattered light intensity is the intensity of light emission caused by the particles observed in the chamber 11, and therefore, the intensity is proportional to the number of particles rebounded by the rotary blades 45 and infiltrating the chamber 11. In the graph, the scattered light intensity before the measure is taken is the scattered light intensity which is observed in the chamber 11 of the substrate processing apparatus 10 to which the conventional exhaust manifold is applied, and the scattered light intensity after the measure is taken is the scattered light intensity which is observed in the chamber 11 of the substrate processing apparatus 10 to which the above described exhaust manifold 74 is applied. The scattered light intensity is measured by an ICPM (In-chamber particle monitor) system in FIG. 22 that will be described later.

As shown in the graph in FIG. 13, the strong scattered light intensities are observed at a time of an OPEN operation and at a time of a CLOSE operation of the APC valve 17 before the measure is taken. This is because the deposit adhering to the valve peels off with the opening and closing operations of the slide valve of the APC valve 17, drops to the TMP 18, further is rebounded by the rotary blade 45 in the TMP 18, and flows back in the exhaust manifold to infiltrate the chamber as a particle. On the other hand, after the measure is taken, the scattered light intensity hardly changes at the time of the OPEN operation and at the time of the CLOSE operation of the APC valve 17, and remains low. This is because the particles rebounded by the rotary blades 45 and flowing back in the exhaust manifold are captured by the flocculent structure of the flocculent body 75, and therefore, do not infiltrate the chamber.

According to the communicating pipe of the present embodiment, the exhaust manifold 74 is provided with the flocculent body 75 disposed on the opposed surface, which is opposed to the TMP 18, in the inner wall, and therefore, it can capture the kinetic energy of the particles rebounded by the rotary blades 45 by the flocculent structure of the flocculent body 75, whereby the infiltration of the rebounded particles into the chamber 11 can be prevented. Since the exhaust manifold 74 captures the particles by the flocculent body 75, it can decrease the particles which drop to the TMP 18, and can reduce adhering speed of the particles to the rotary blades 45 and the like of the TMP 18. Thereby, the exhaust manifold 74 can reduce the replacement frequency and overhauling frequency of the TMP 18.

The flocculent body may be disposed on a surface, which is not opposed to the TMP 18, in the inner wall. As described above, the particles rebounded by the rotary blades 45 collide against the surface which is not opposed to the TMP 18. Thereby, the particles can be also captured by the flocculent body that is disposed on the surface which is not opposed to the TMP 18.

In the communicating pipe according to the above described present embodiment, the flocculent body is disposed on the inner surface as the particle capturing mechanism, but the particle capturing mechanism is not limited to this, and it may be, for example, a stacked structure of meshed bodies, and a porous body such as a sponge.

Next, an exhausting pump according to a seventh embodiment of the present invention will be described.

Figure 8:
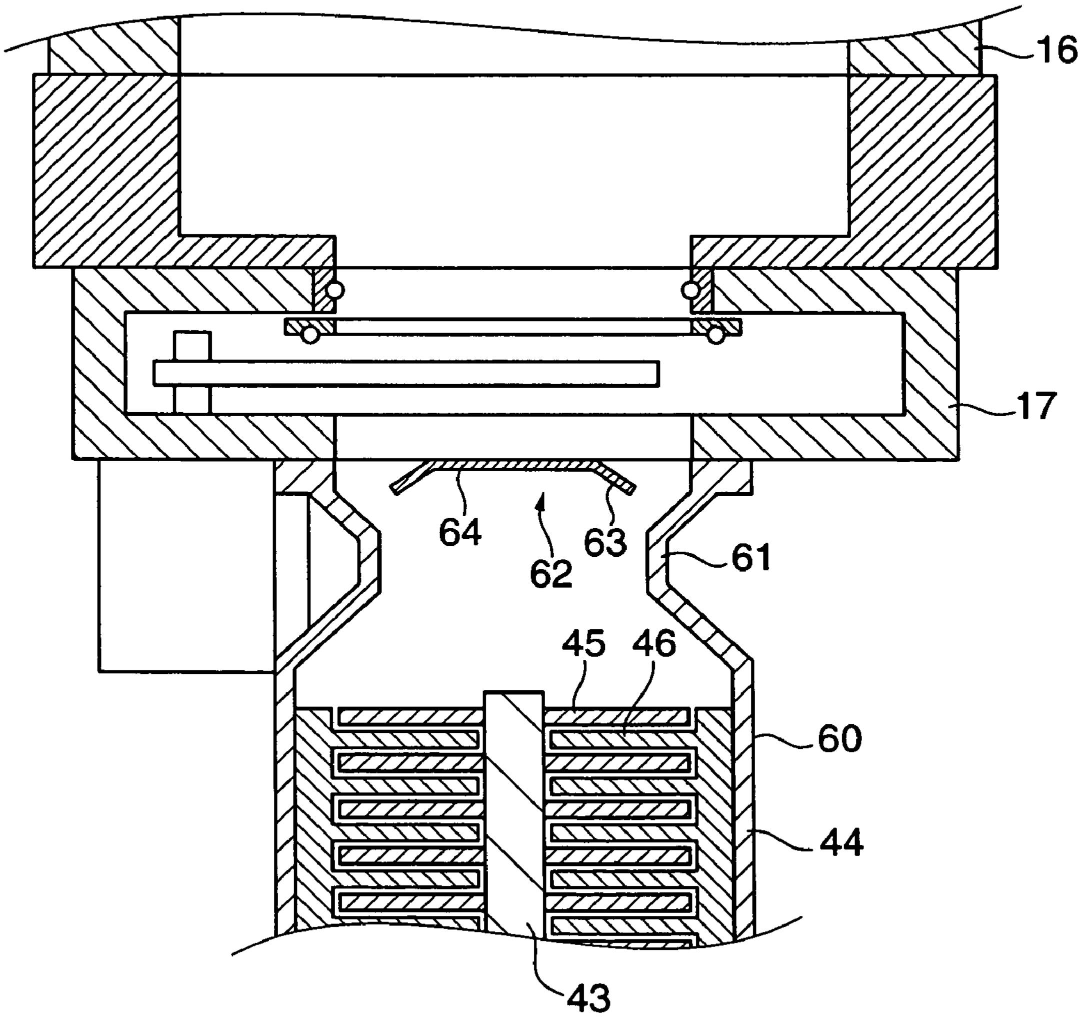
FIG. 8 is a sectional view schematically showing the construction of the TMP as an exhausting pump according to a seventh embodiment of the present invention.

FIG. 8 is a sectional view schematically showing the construction of a TMP as an exhausting pump according to the present embodiment. The exhausting pump according to the present embodiment is basically the same as the TMP 18 in FIG. 1 in construction, and differs from the TMP 18 in that it is provided with a reflector plate 62 in an intake part 61 which will be described later. Therefore, the explanation of the redundant construction and operation will be omitted, and an explanation of the different construction and operation will be made hereinafter. In FIG. 8, the upper part in the drawing is referred to as "upper side", and the lower part in the drawing is referred to as "lower side".

In FIG. 8, a TMP 60 is provided with a cylindrical intake part 61 which is disposed at an upper side in a cylindrical body 44, namely toward the chamber 11 above the uppermost rotary blade group, and a reflector plate 62 (reflecting device) which is disposed in the intake part 61. The diameter of the intake part 61 is set to be smaller than the diameter of the body 44, and therefore, the intake part 61 controls the exhaust amount by the TMP 60. The reflector plate 62 is comprised of a disk-shaped first reflecting surface member 64 which is disposed at an upper side in the intake part 61 to be opposed to the uppermost rotary blade group of the TMP 60, and an annular second reflecting surface member 63 which is disposed at the peripheral edge of the first reflecting surface member 64 and has its surface angle set to be oriented to the rotary blades 45 of the TMP 60, especially to the rotary shaft 43.

In the TMP 60, the particles which are rebounded to the intake part 61 by the rotary blades 45 contact the reflector plate 62. Since the first reflecting surface member 64 of the reflector plate 62 is opposed to the rotary blade group of the TMP 60, and the second reflecting surface member 63 is oriented to the rotary shaft 43 of the TMP 60, the particles which contact the reflector plate 62 are reflected and drop toward the rotary blades 45. Namely, toward the rotary blades 45 the reflector plate 62 reflects the particles which are rebounded by the rotary blades 45.

According to the exhausting pump of the present embodiment, the reflector plate 62 is disposed inside the intake part 61 of the TMP 60, and is comprised of the first reflecting surface member 64 which is opposed to the rotary blade group of the TMP 60, and the second reflecting surface member 63 which is oriented to the rotary shaft 43 of the TMP 60. Therefore, toward the rotary blades 45 the reflector plate 62 can reflect the particles which are rebounded by the rotary blades 45 and thereby, can prevent the infiltration of the rebounded particles into the chamber 11.

In the exhausting pump according to the above described present embodiment, the reflector plate 62 is constructed by the disk-shaped first reflecting surface member 64 and the annular second reflecting surface member 63, but the shape of the reflector plate is not limited to this, and may be constructed by an annular member with an arc-shaped section.

Figure 9A:
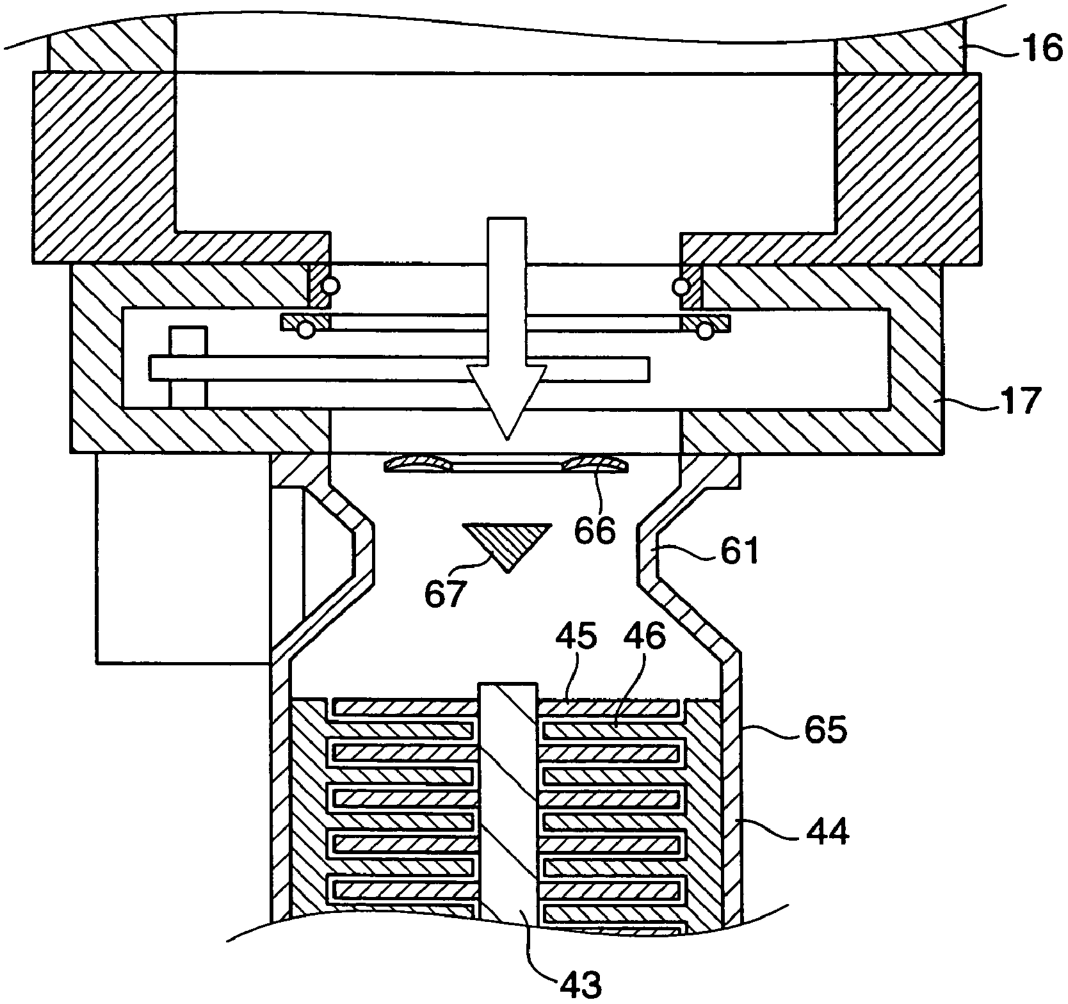
FIGS. 9A and 9B are views showing a variant of the exhausting pump according to the present embodiment.
Figure 9B:
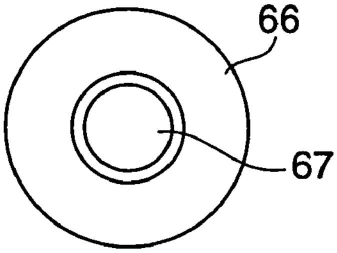

FIGS. 9A and 9B are views showing a variant of the exhausting pump according to the present embodiment; FIG. 9A is a sectional view showing the exhausting pump, and FIG. 9B is a plane view of he reflector plate in the arrow direction in FIG. 9A.

In FIG. 9A, a TMP 65 as an exhausting pump is provided with a reflector plate 66 comprised of an annular member with an arc-shaped section which is disposed at the upper side in the intake part 61, and a reflecting member 67 which is disposed to correspond to a center hole position of the reflector plate 66 in the plane view with respect to the arrow direction in FIG. 9A. The reflecting member 67 is a conical member, and is disposed so that its tip end is oriented to the lower side and is disposed at a lower side at a predetermined distance from the reflector plate 66.

To the rotary blades 45 the reflector plate 66 and the reflecting member 67 reflect the particles rebounded by the rotary blades 45, but the reflector plate 66 and the reflecting member 67 are spaced from each other by a predetermined distance, and therefore, conductance of the exhaust in the TMP 60 is not reduced. Therefore, not only the infiltration of the rebounded particles into the chamber 11 can be prevented, but also reduction in the discharge efficiency of the particles can be prevented.

Next, an exhausting pump according to an eighth embodiment of the present invention will be described.

The present embodiment is basically the same as the above described seventh embodiment in its construction and operation, and differs from the above described seventh embodiment in that the present embodiment does not have a reflector plate. Therefore, the explanation of the redundant construction and operation will be omitted, and an explanation of the different construction and operation will be made hereinafter.

Figure 10:
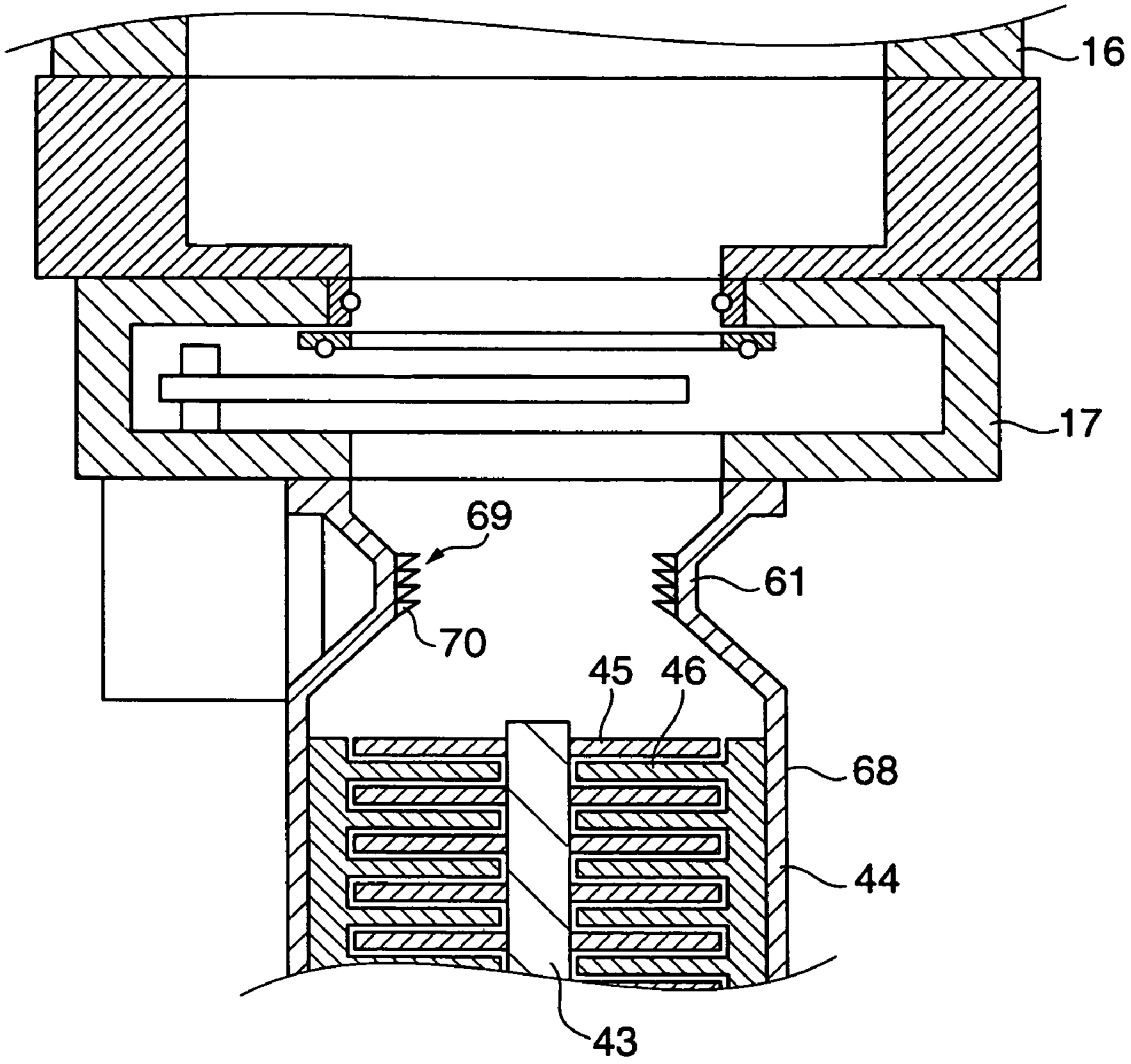
FIG. 10 is a sectional view schematically showing the construction of the TMP as an exhausting pump according to an eighth embodiment of the present invention.

FIG. 10 is a sectional view schematically showing the construction of the TMP as the exhausting pump according to the present embodiment.

In FIG. 10, a TMP 68 is provided with a projected member group 69 (kinetic energy reducing mechanism) which is disposed on the inner wall of the intake part 61.

The projected member group 69 is comprised of a plurality of wedge-shaped members 70 which are disposed to project toward the center axis of the intake part 61 from the inner wall of the intake part 61, and each of the wedge-shaped members 70 has a reflecting surface which is oriented to the rotary shaft 43 of the TMP 68, and is disposed so that a plane present in a space between each wedge-shaped member 70 and the adjacent wedge-shaped member 70 becomes minimum. The wedge-shaped member 70 may be made of any one of a metal (for example, stainless steel and aluminum), resin, rubber and the like.

In the TMP 68, among the particles, which are rebounded to the intake part 61 by the rotary blades 45, some particles, which contact the reflecting surfaces of the wedge-shaped members 70 of the projected member group 69, are reflected toward the rotary shaft 43. The particles which infiltrate a space between the adjacent two wedge-shaped members 70 in the projected member group 69 consume kinetic energy by repeating collision against the side surface of each wedge-shaped member 70 a plurality of times between the two wedge-shaped members 70, and eventually drop toward the TMP 68. Namely, toward the rotary shaft 43 the projected member group 69 reflects the particles rebounded by the rotary blades 45 and reduces the kinetic energy of the rebounded particles.

According to the exhausting pump of the present embodiment, the TMP 68 is comprised of a plurality of wedge-shaped members 70 which are disposed to project toward the center axis of the intake part 61 from the inner wall of the intake part 61, and each of the wedge-shaped member 70 has the reflecting surface which is oriented to the rotary shaft 43 of the TMP 68, and therefore, reliably reduces the kinetic energy of the particles which are rebounded by the rotary blades 45 by causing the particles to collide against the wedge-shaped members 70 in the projected member group 69 a plurality of times, can drop the rebounded particles toward the TMP 68, and can reflect the rebounded particles toward the rotary shaft 43. Thereby, the infiltration of the rebounded particles into the chamber 11 can be prevented.

In the exhausting pump according to the above described present embodiment, the projected member group 69 is constructed by a plurality of wedge-shaped members 70, but the projected member group 69 may be constructed by projected members in other projected shapes, the projected members having the shape of any one of, for example, a cone, a pyramid, a column, a prism and a hemisphere. Thereby, the projected member can be easily molded, and the manufacturing cost of the exhausting pump can be reduced.

The exhausting pump according to the above described present embodiment may have a recessed member group comprised of a plurality of recessed members instead of the projected member group 69. In this case, the particles rebounded by the rotary blades 45 are caused to infiltrate the recessed shape of the recessed member, and the kinetic energy of the particles that infiltrate it can be reduced without fail by causing the particles to collide against the recessed member a plurality of times. The recessed shape of the recessed member may be comprised of any one of a cone, a pyramid, a column, a prism and a hemisphere. In this case, the recessed member can be easily molded, and the manufacturing cost of the exhausting pump can be reduced.

Further, the exhausting pump according to the above described present embodiment may have an impact absorbing material which is disposed on the inner wall of the intake part 61, for example, an impact absorbing part made of soft rubber (not shown)(kinetic energy reducing mechanism), instead of the projected member group comprised of the plurality of wedge-shaped members. In this case, the impact absorbing part absorbs the kinetic energy of the rebounded particles, and thereby, the infiltration of the rebounded particles into the chamber 11 can be prevented without fail.

Next, an exhausting pump according to a ninth embodiment of the present invention will be described.

The present embodiment is basically the same as the above described seventh embodiment in its construction and operation, and differs from the above described seventh embodiment in that the present embodiment does not have a reflector plate and the disposition of the rotary blade group and the stator blade group is changed. Therefore, the explanation of the redundant construction and operation will be omitted, and an explanation of the different construction and operation will be made hereinafter.

Figure 11:
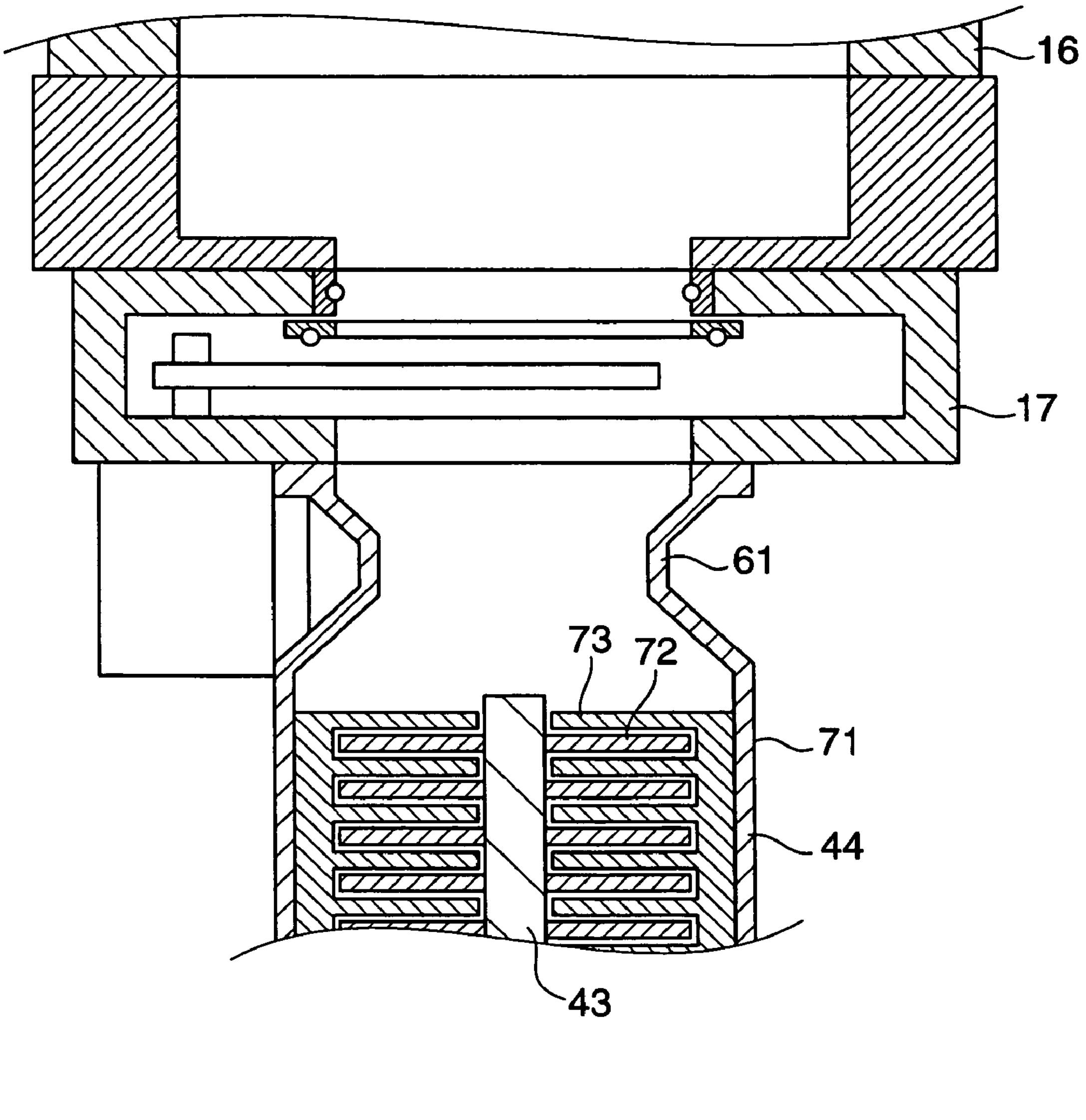
FIG. 11 is a sectional view schematically showing the construction of the TMP as an exhausting pump according to a ninth embodiment of the present invention.
Figure 12A:
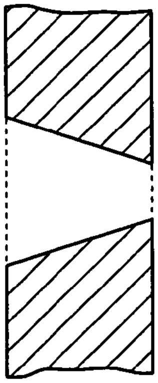
FIGS. 12A to 12H are sectional views showing the variants of a vent hole of a baffle plate in FIG. 1.
Figure 12B:
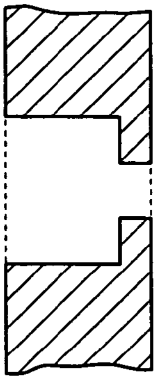
Figure 12C:
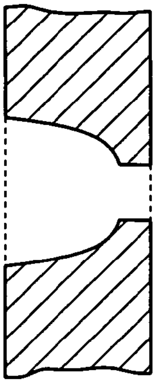
Figure 12D:
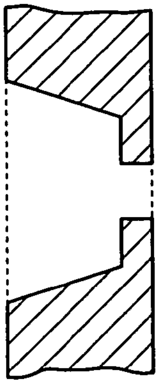
Figure 12E:
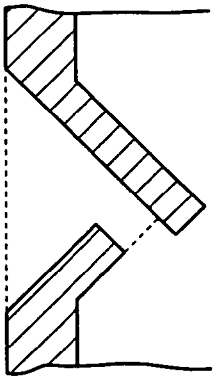
Figure 12F:
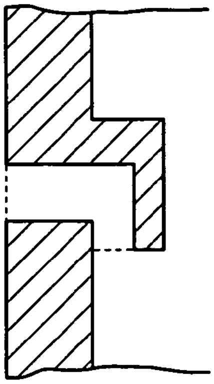
Figure 12G:
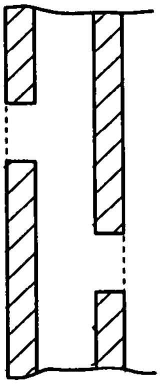
Figure 12H:
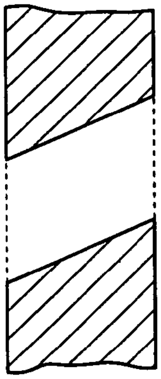

FIG. 11 is a sectional view schematically showing the construction of a TMP as an exhausting pump according to the present embodiment. In FIG. 11, the upper part in the drawing is referred to as "the upper side", and the lower part in the drawing is referred to as "the lower side".

A TMP 71 is provided with the rotary shaft 43, the body 44, the intake part 61, a plurality of blade-shaped rotary blades 72 which are projected orthogonally from the rotary shaft 43, and a plurality of blade-shaped stator blades 73 which are projected toward the rotary shaft 43 from the inner peripheral surface of the body 44.

The plurality of rotary blades 72 are radially projected from the rotary shaft 43 to form a rotary blade group, and the plurality of stator blades 73 are equidistantly disposed in the same circumference of the inner peripheral surface of the body 44, and are projected toward the rotary shaft 43 to form a stator blade group. The TMP 71 has the plurality of rotary blade groups and stator blade groups. Each of the stator blade groups is equidistantly disposed along the rotary shaft 43, and each of the rotary blade groups is disposed between the adjacent two stator blade groups. In the TMP 71, the uppermost stator blade group is disposed at the upper side above the uppermost rotary blade group. Namely, the uppermost stator blade group is disposed closer to the chamber 11 than the uppermost rotary blade group.

In this case, when some particles discharged from the chamber 11 reach the TMP 71, they collide against the rotary blades 72 rotating at a high speed, but the uppermost stator blade group is disposed at the upper side above the uppermost rotary blade group in the TMP 71, and therefore, the rebounded particles collide against the stator blades 73 and are reflected toward the rotary blades 72.

According to the exhausting pump of the present embodiment, the TMP 71 has a plurality of rotary blade groups and stator blade groups, and the uppermost stator blade group is disposed closer to the chamber 11 above the uppermost rotor blade group. Therefore, the particles rebounded by the rotary blades 72 can be reflected toward the rotary blades 72 by the stator blades 73, and thereby, the infiltration of the rebounded particles into the chamber 11 can be prevented without fail.

The above described TMP 71 is not only used solely but also can be easily used in combination with the reflector plate 62 in FIG. 8, the reflector plate 66 in FIGS. 9A and 9B, or the projected member group 69 in FIG. 10, and therefore, the TMP 71 is preferably used in combination with the reflector plate 62, the reflector plate 66 or, the projected member group 69 in the viewpoint of prevention of the infiltration of the rebounded particles into the chamber 11.

Next, a reflecting device according to a tenth embodiment of the present invention will be described. A substrate processing apparatus to which the reflecting device according to the present embodiment is applied is basically the same as the substrate processing apparatus to which the reflecting device according to the above described first embodiment is applied in its construction and operation, and therefore, the explanation will be omitted.

Figure 14:
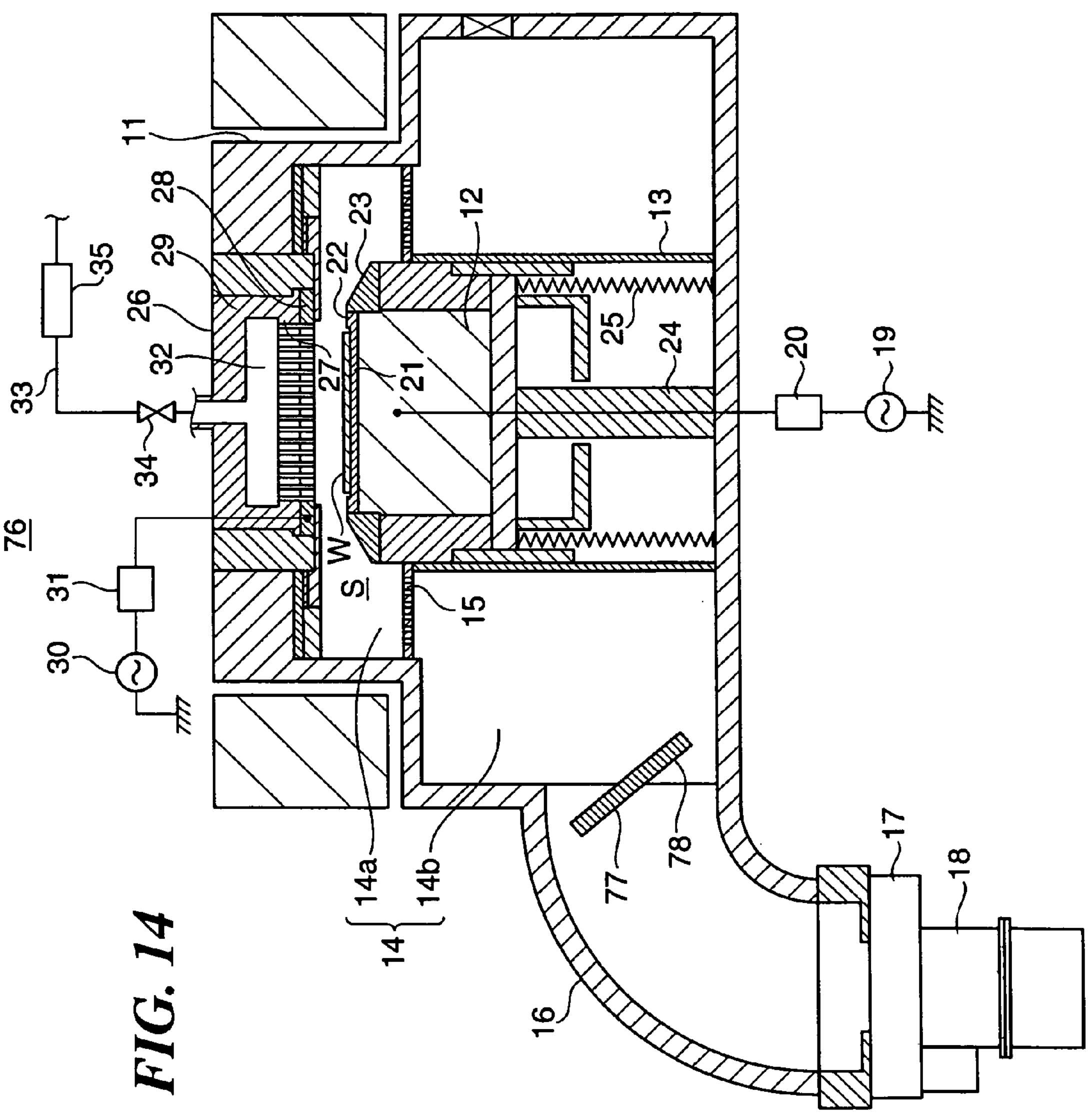
FIG. 14 is a sectional view schematically showing the construction of a substrate processing apparatus to which a reflecting device according to a tenth embodiment of the present invention is applied.

FIG. 14 is a sectional view schematically showing the construction of the substrate processing apparatus to which the reflecting device according to the tenth embodiment of the present invention is applied.

In FIG. 14, a substrate processing apparatus 76 has a rebounded particles preventing plate 77 (reflecting device) which is disposed inside the exhaust manifold 16.

The rebounded particles preventing plate 77 is a planar body made of resin, and has a reflecting surface 78 formed by a plane. The reflecting surface 78 has an acute angle with a rotation surface of the rotary blade 45 in the TMP 18, namely, the reflecting surface 78 is oriented to the TMP 18. The size of the rebounded particles preventing plate 77 is set at a size that dose not reduce conductance of the exhaust to the APC valve 17 from the chamber 11.

When some of the particles discharged from the chamber 11 reach the TMP 18, they collide against the rotary blades 45 rotating at a high speed and are rebounded toward the exhaust manifold 16. The rebounded particles infiltrate the exhaust manifold 16, and contact the rebounded particles preventing plate 77 inside the exhaust manifold 16. The rebounded particle preventing plate 77 has the reflecting surface 78 which is oriented to the TMP 18, and therefore, the particles which contact the rebounded particles preventing plate 77 are reflected toward the TMP 18.

According to the reflecting device of the present embodiment, the rebounded particles preventing plate 77 disposed in the exhaust manifold 16 has the reflecting surface 78 which has an acute angle with the rotation surface of the rotary blade 45 and is oriented to the TMP 18, and therefore, it can, without fail, reflect the particles rebounded by the rotary blades 45 toward the TMP 18, whereby the infiltration of the rebounded particles into the chamber 11 can be prevented. Since the reflecting surface 78 is formed by the plane, the reflecting direction of the rebounded particles can be easily controlled, and the rebounded particles preventing plate 77 can be easily produced, whereby the manufacturing cost of the rebounded particles preventing plate 77 can be reduced.

In the exhaust system of the substrate processing apparatus 10 to which the reflecting device, the communicating pipe or the exhausting pump according to each of the above described embodiments is applied, the shape of the vent hole of the baffle plate 15 is a circular hole, but the shape of the vent hole of the baffle plate 15 is not limited to this, and the shape is preferably a shape that can prevent backflow of the particles to the upstream part 14*a* from the downstream part 14*b* of the exhaust path 14.

Specifically, as shown in FIGS. 12A to 12D, the shape of the vent hole may be the shapes in which the sectional areas are reduced to the downstream part 14*b* from the upstream part 14*a* of the exhaust path 14, namely, toward the exhaust manifold 16 (51, 54, 57) from the chamber 11. Thereby, the backflow of the particles to the chamber 11 can be prevented without reducing conductance of the exhaust from the chamber 11.

Specifically, as shown in FIGS. 12E to 12H, the shape of the vent hole may be the shapes which open diagonally to the direction of the exhaust stream with the center axis of the vent hole being not parallel with the exhaust stream flowing from up to down in the drawing. Thereby, the rebounded particles easily contact the inner surface of the vent hole, the particles are reflected to the downstream part 14*b* of the exhaust path 14 by the inner surface of the vent hole, and the backflow of the particles to the chamber 11 can be prevented.

The reflecting device, the communicating pipe and the exhausting pump according to each of the above described embodiments are individually applied to the substrate processing apparatus 10, but the above described reflecting device, communicating pipe and exhausting pump can be freely combined, and, for example, the reflecting device 36 in FIG. 2A, the exhaust manifold 54 in FIG. 5 and the TMP 68 in FIG. 10 may be applied to the substrate processing apparatus 10.

In each of the above described embodiments, the exhaust manifold or the TMP has the particle reflecting device, the kinetic energy reducing mechanism, or the particle capturing mechanism, but the downstream part 14*b* of the exhaust path 14 may have the reflecting device, the kinetic energy reducing mechanism or the particle capturing mechanism in each of the above described embodiments.

When the inventors of the present invention generated a large amount of particles inside the chamber 11 and intentionally rebounded the particles by rotating the rotary blades 45 of the TMP at a high speed in the substrate processing apparatus 10 in FIG. 1, the inventors have confirmed that the particles have adhered to the entire surface of the inner wall in the exhaust manifold. It is considered that this is because the movement of the rebounded particles is random. Therefore, it is preferable to dispose the above described kinetic energy reducing mechanism or particle capturing mechanism on the entire surface of the inner wall in the exhaust manifold, and it is further preferable to dispose the above described kinetic energy reducing mechanism or particle capturing mechanism on the entire surface of the inner wall of not only the exhaust manifold but also the TMP and the downstream part of the exhaust path. In the case of the exhaust system having the reflecting device, it is preferable to dispose the above described kinetic energy reducing mechanism or particle capturing mechanism on the entire surface of the reflecting device.

The kinetic energy reducing mechanism and the particle capturing mechanism which are disposed on the entire surface of the inner wall in the exhaust manifold, the TMP and the downstream part of the exhaust path are not limited to those described above, and may be comprised of those listed as follows.

1) A material with fibrous substances intertwined with one another at random, a material with a fibrous substance woven in a specific pattern, or a material having a large number of small spaces (hereinafter referred to as “a particle capturing material”)

2) A material having flexibility capable of absorbing impacts by collisions of particles (hereinafter referred to as “an impact absorbing material”)

3) A material to which particles can adhere (hereinafter referred to as “an adhesive material”.)

4) An aggregate of a plurality of small rooms open toward a space to which particles are rebounded (refer to FIG. 15A), and an aggregate of a plurality of grooves (hereinafter referred to as “a particle introducing structure”).

In the particle capturing material, the particles infiltrating the particle capturing material repeat collisions against the fibrous substance and the border surfaces of the small spaces. The flight paths of the particles extend by repetition of collisions, and therefore, frictions of the particles and gas molecules increase. Thereby, the momentum of the particles can be reduced, and as a result, the particles can be captured.

In the impact absorbing material, the momentum of the particles can be reduced by absorbing the impact by the collisions of the particles, and as a result, the particles can be captured. By constructing the structure in which the fabulous substances are intertwined with one another at random or the structure having a large number of small spaces by using the impact absorbing material, the number of collisions of the particles and the impact absorbing material can be increased in the structure, and thereby, the momentum of the particles can be reduced without fail.

In the adhesive material, the particles can be directly captured by the particles adhering to the adhesive material.

Figure 15A:
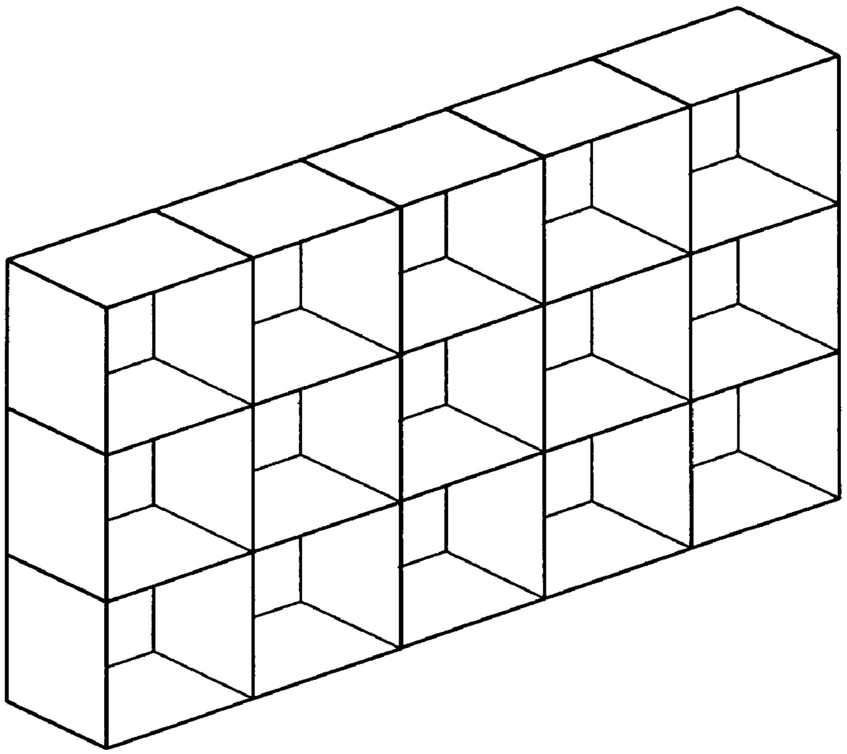
FIGS. 15A and 15B are views showing an aggregate of a plurality of small rooms as a kinetic energy reducing mechanism.
Figure 15B:
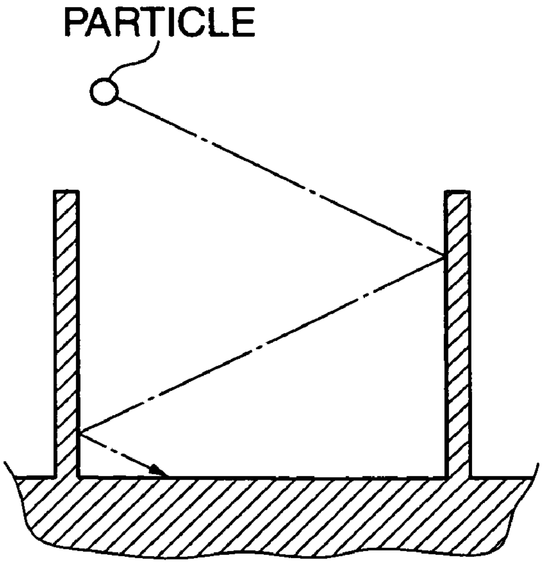
Figure 16:
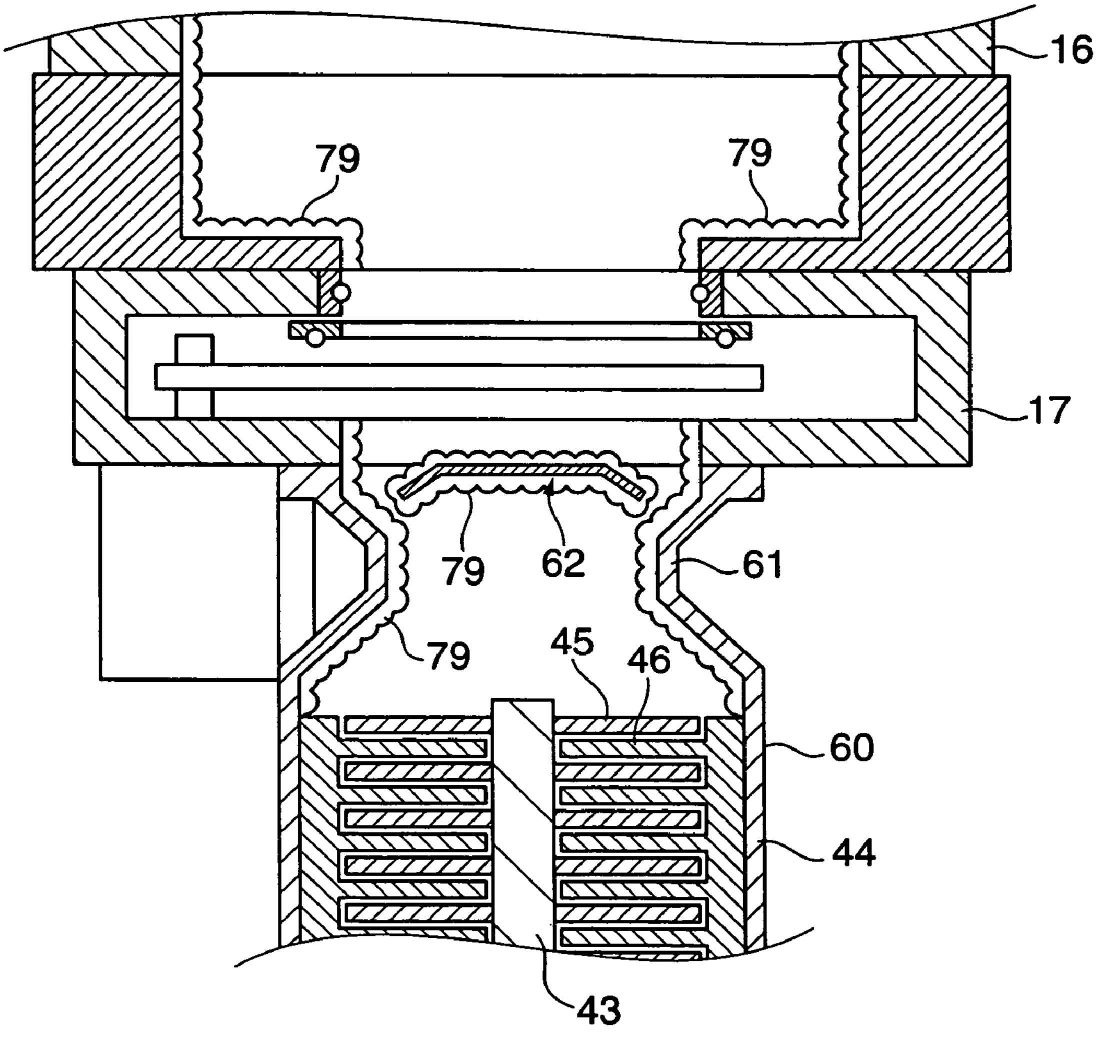
FIG. 16 is a sectional view showing a particle capturing mechanism made of stainless felt, which is disposed in an intake part of the TMP and on the reflector plate.
Figure 17:
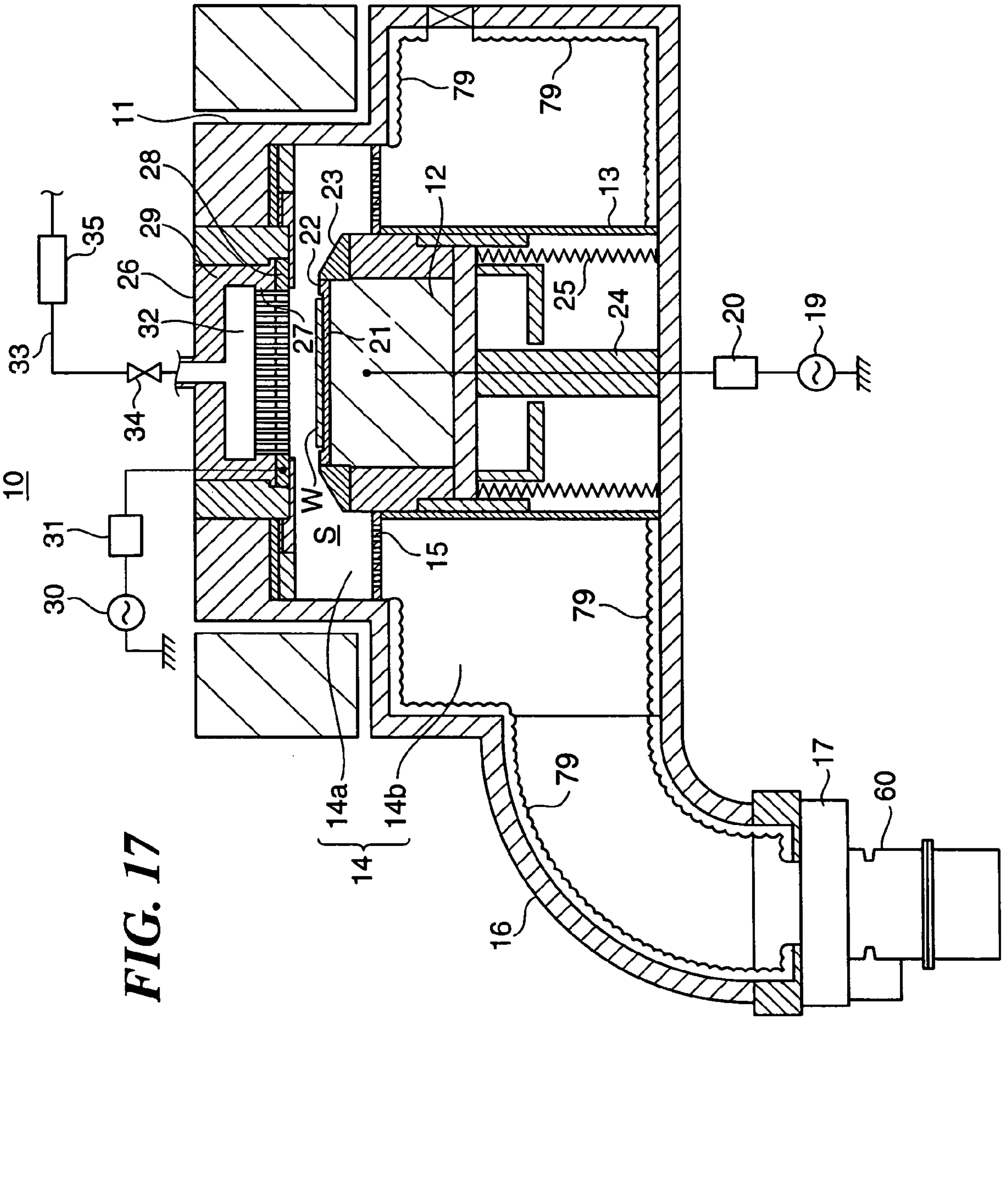
FIG. 17 is a sectional view showing the particle capturing mechanism made of the stainless felt, which is disposed on the entire surface of the inner wall in the exhaust manifold and the downstream part of the exhaust path.

In the particle introducing structure, the momentum of the particles can be reduced by repeating collisions of the particles introduced into the small rooms and insides of grooves and the wall surfaces of the small rooms and the grooves (refer to FIG. 15B). Especially when the particle introducing structure is provided on the surface of the particle capturing material, the impact absorbing material or the adhesive material, the momentum of the particles can be reduced before the particles reach the particle capturing material, the impact absorbing material or the adhesive material, whereby the particle capturing material, the impact absorbing material or the adhesive material can easily capture the particles. Further, the particle capturing material, the impact absorbing material or the adhesive material may be provided on the surfaces of the small rooms and the grooves.

As the shape of the small room of the particle introducing structure, the shape may be any shape if only it has a wall surface and an opening, without being limited to the one with the opening in a square shape as shown in FIG. 15A, and for example, the shapes with the openings in a triangular shape and a hexagonal shape may be adopted. If the opening is hexagonal, the particle introducing structure has a honeycomb structure.

The composing materials of the above described particle capturing material, impact absorbing material, adhesive material and particle introducing structure preferably have heat resistance, plasma corrosion resistance (radical corrosion resistance, ion corrosion resistance), acid resistance and sufficient rigidity against the exhaust stream flowing inside the exhaust system. Specific examples of the composing material have metals (stainless steel, aluminum, and silicon), ceramics (alumina ($Al_2O_3$), yttrium ($Y_2O_3$)), quartz, and organic compounds (PI, PBI, PTFE, PTCFE, PEI, CF rubber or silicon rubber). The materials which are made by applying surface treatment of oxidation, thermal spraying or the like to a predetermined core material (an yttrium sprayed product, an alumina sprayed product, an anodized product) may be used.

Among the above described particle capturing materials, impact absorbing material, adhesive material and particle introducing structure, the particle capturing material comprised of the material with the fibrous substances intertwined into one another at random has the highest efficiency of capturing particles. Therefore, from the viewpoint of prevention of the infiltration of particles into the chamber 11, it is preferable to provide the particle capturing mechanism 79, which is comprised of, for example, stainless felt or fluororesin felt, on the entire surface of the inner wall of the intake part 61 of the TMP 60, the reflector plate 62, the exhaust manifold 16, and the downstream part 14*b* of the exhaust path 14.

Since the rebounding particles are generated from the rotary blades of the TMP, the particle capturing mechanism is preferably provided in the intake part of the TMP, and especially when the stainless felt or fluororesin felt is used as the particle capturing material, the particle capturing mechanism made of the stainless felt or the fluororesin felt may be provided not only in the intake part of the TMP, but also on the inner side surface of the body of the TMP by separating the inner side surface of the body of the TMP and the rotary blades.

In order to confirm the effect in the case of providing the above described particle capturing mechanism, the inventors of the present invention placed the wafer W on the lower electrode 12 and introduced a large number of false particles ($SiO_2$ fine particles of the particle size of 1 μm) with the rotary blades 45 of the TMP rotated at a high speed in the substrate processing apparatus 10 without providing the particle capturing mechanism, and thereafter, when the inventors have measured the number of particles adhering to the surface of the wafer W, the number of particles adhering to the surface of the wafer W is 202. On the other hand, the inventors placed the wafer W on the lower electrode 12 after providing the particle capturing mechanism comprised of stainless felt on the entire surface of the inner wall in the exhaust manifold, and introduced a large number of false particles into the exhaust manifold with the rotary blades 45 of the TMP rotated at a high speed, and thereafter, when the inventors have measured the number of particles adhering to the surface of the wafer W, the number of particles adhering to the surface of the wafer W is 6. Thereby, it has been found out that by only providing the particle capturing mechanism made of the stainless felt on the entire surface of the inner wall in the exhaust manifold, the infiltration of particles into the chamber 11 can be completely prevented.

Next, a method for cleaning the exhaust system according to the embodiment of the present invention will be described.

When the inventors of the present invention confirmed the cause of generation of the particles flowing into the TMP by using the substrate processing apparatus 10 prior to the present invention, they have found out that atmosphere release which will be described as follows is the main cause.

Specifically, when an $N_2$ gas is introduced from a shower head 26 into the chamber 11 to subject the chamber 11 to atmosphere release before a lid (not shown) of the chamber 11 is opened and the inside of the chamber 11 is cleaned, the particles (deposit or the like peeling off from the inner wall) in the chamber 11 which are raised by viscous flow of the $N_2$ gas reach the APC valve via the exhaust path 14 and the exhaust manifold 16. Since the APC valve 17 blocks (closes) an exhaust passage from the exhaust manifold 16 to the TMP 18 at this time, the particles reaching the APC valve 17 are deposited on or adhere to the APC valve 17 (on the surface at the chamber 11 side). After cleaning of the inside of the chamber 11 is finished and the lid of the chamber 11 is closed, the inside of the chamber 11 is roughly evacuated by an RP (Rotary Pump) (not shown) via the exhaust path 14 and the exhaust manifold 16, and after the pressure of the inside of the chamber 11 is reduced to a predetermined pressure, the APC valve 17 is opened and the exhaust manifold 16 and the TMP 18 communicate with each other. At this time, the particles which have deposited/adhered onto the APC valve 17 separate from the APC valve 17 and flow into the TMP 18.

The present invention is made based on the above described finding. The cause of generation of the particles which are deposited on or adhere to the APC valve 17 is not limited to the above described atmosphere release, but, for example, separation of the particles adhering to the inner surface of the exhaust manifold 16 also falls under the category of the cause of generation of the particles. In the above described finding, the particles are deposited on or adhere to the APC valve 17, but it was considered that the valve which the particles are deposited on or adhere to is not limited to the APC valve 17, and the particles are deposited on or adhere to the valve which is nearest to the chamber 11 and shuts off the exhaust passage from the chamber 11 to the TMP 18 when the $N_2$ gas is introduced into the chamber 11. Namely, it was considered that there is the possibility of the particles being deposited on or adhering to a butterfly valve (not shown) which limits the flow rate of the gas flowing in the above described exhaust passage, an isolation valve which will be described later, and the like.

First, a method for cleaning an exhaust system according to an eleventh embodiment of the present invention will be described. The method for cleaning an exhaust system according to the present embodiment is applied to the substrate processing apparatus 10.

Figure 18:
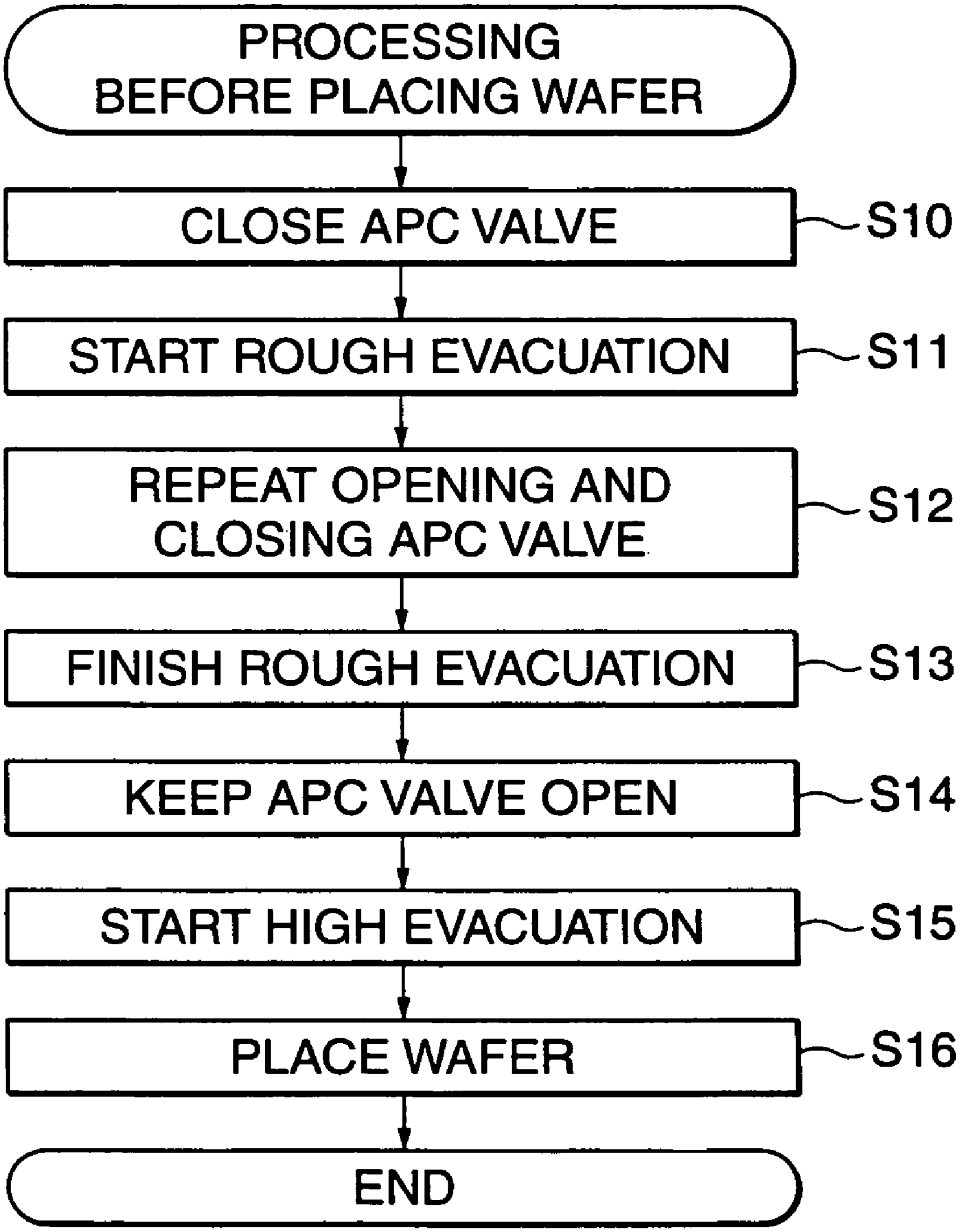
FIG. 18 is a flow chart of the processing before placing the wafer as a method for cleaning an exhaust system according to an eleventh embodiment of the present invention.

FIG. 18 is a flow chart of processing before placing the wafer as the method for cleaning the exhaust system according to the present embodiment. The present processing is carried out in the case where a deposit adheres to the inner wall and the like of the chamber 11 of the substrate processing apparatus 10 and the inside of the chamber 11 needs to be cleaned, between a certain production lot in which a predetermined number of wafers W are subjected to etching processing and the subsequent production lot, in the case where the idling state of the substrate processing apparatus 10 continues for a long time, or the like.

In FIG. 18, first, the APC valve 17 is closed to close the exhaust passage from the chamber 11 to the TMP 18 to shut off the communication between the chamber 11 and the TMP 18 (step S10). At this time, particles are deposited on or adhere to the APC valve 17. After the APC valve 17 is closed, (rotation of the rotary blades 45 of) the TMP 18 stops at a predetermined timing.

Next, the RP starts rough evacuation of the inside of the chamber 11 and the exhaust system (step S11). Here, the RP is disposed downstream of the TMP 18.

Next, the APC valve 17 repeats opening and closing at least one time or more, preferably 20 times or more (step S12). At this time, the particles which are deposited on or adhere to the APC valve 17 are separated by vibrations or the like occurring due to repetition of opening and closing of the APC valve 17. Since the TMP 18 does not rotate at this time, the particles separated from the APC valve 17 are not given kinetic energy even if they collide against the rotary blades 45 of the TMP 18, and the particles do not rebound. Then, the particles ride on the exhaust stream of rough evacuation caused by the RP and pass through the TMP 18.

Next, after the pressure of the inside of the chamber 11 is reduced to the predetermined pressure and rough evacuation is finished (step S13), the APC valve 17 keeps open (step S14), and subsequently, the TMP 18 starts high-speed rotation to start high evacuation of the inside of the chamber 11 and the exhaust system (step S15).

Next, after the pressure inside the chamber 11 is reduced to a predetermined low pressure, the wafer W is carried into the chamber 11 (step S16), and the present processing is finished.

Through the processing before placing the wafer as the method for cleaning the exhaust system according to the present embodiment, the APC valve 17 shuts off the communication between the chamber 11 and the TMP 18, and the RP roughly evacuates the inside of the chamber 11 and the exhaust system, and thereafter, the APC valve 17 repeats opening and closing. The particles which are deposited on or adhere to the APC valve 17 which shut off the communication between the chamber 11 and the TMP 18 are separated from the APC valve 17 by vibrations or the like caused by repetition of opening and closing of the APC valve 17, and are removed by the exhaust stream of the rough evacuation. Thereby, the particles which flow into the TMP 18 from the APC valve 17 when the TMP 18 starts high-speed rotation after rough evacuation are eliminated, and therefore, the occurrence of rebounding particles is prevented, and the infiltration of the particles into the chamber 11 can be prevented.

In step S12 of the above described processing before placing the wafer, it is preferable to adopt the separation promoting methods which are listed below in order to promote separation of the particles from the APC valve 17.

1) Providing a radiation heater or the like, and heating the APC valve 17 by the radiation heater 2) Providing a brush capable of advancing to and retreating from the exhaust passage, and cleaning the APC valve by the brush.

3) Providing a vibrating mechanism which applies vibration to the APC valve 17 and the peripheral part, and vibrating the APC valve 17 by the vibrating mechanism 4) Providing a power source capable of applying voltage to the APC valve 17 and the peripheral part, and causing the APC valve 17 to generate electromagnetic stress by the power source 5) Providing a bypass exhaust line which opens to an area in the vicinity of the APC valve 17 and communicates with the RP, generating an impact wave due to $N_2$ gas introduction and a viscous flow by the $N_2$ gas in the exhaust passage from the chamber 11 to the APC valve 17, separating the particles which are deposited on or adhere to the APC valve 17 by the impact wave, and discharging the separated particles by the viscous flow via the bypass exhaust line.

By adopting at least one of the above described separation promoting methods, the particles which flow into the TMP 18 from the APC valve 17 when the TMP 18 starts high-speed rotation after rough evacuation can be eliminated without fail.

The TMP 18 may be rotated at a low rotational frequency while the APC valve 17 repeats opening and closing. At this time, the particles which are separated from the APC valve 17 are hardly given kinetic energy even if the particles collide against the rotary blades 45 of the TMP 18, and the particles pass through the TMP 18. The particles which are separated from the APC valve 17 can be completely drawn into the TMP 18 by the negative pressure generated by the low-speed rotation of the TMP 18, and as a result, the particles can be prevented from remaining in the APC valve 17.

It is possible that while the APC valve 17 repeats opening and closing, some of the particles separated from the APC valve 17 flow back in the exhaust passage between the chamber 11 and the APC valve 17, drift in the exhaust passage even after the pressure inside the chamber 11 is reduced to a predetermined low pressure, and further are deposited on the inner wall in the exhaust manifold 16 and the like. Corresponding to this, an impact wave and a viscous flow are preferably generated in the exhaust passage by introducing a large amount of $N_2$ gas into the chamber 11 while keeping the rough evacuation by the RP, after step S11 and before step S15. The impact wave separates the particles which are deposited on the inner wall in the exhaust manifold 16 and the like, the viscous flow catches up the separated particles therein, and the particles are removed from the exhaust passage by the exhaust stream of the rough evacuation. Thereby, the particles and the like which drift in the exhaust passage due to repetition of opening and closing the APC valve 17 can be removed without fail. In order to generate the impact wave without fail, an $N_2$ gas needs to be introduced at a pressure about twice as high as the pressure inside the chamber 11 at a time of introducing the $N_2$ gas, and in order to generate the viscous flow reliably, the pressure inside the chamber 11 after introduction of the $N_2$ gas needs to be kept at about 50 Pa or higher.

Further, it is possible that some of the particles separated from the APC valve 17 flow back to the processing space S in the chamber 11 while the APC valve 17 repeats opening and closing, and therefore, the processing space S is preferably segregated from the exhaust passage comprised of the downstream part 14*b* of the exhaust path 14, the exhaust manifold 16 and the APC valve 17 in step S12. As the method for segregating the processing space S from the exhaust passage, the vent holes of the baffle plate 15 may be constructed to be openable and closable, and the vent holes may be closed in step S12. An on-off valve which is openable and closable and interposed between the APC valve 17 and the processing space S in the exhaust passage may be provided, and the on-off valve may be closed in step S12. Thereby, some of the particles separated from the APC valve 17 can be prevented without fail from flowing back to the processing space S.

In the exhaust system to which the above described method for cleaning the exhaust system is applied, the APC valve 17 is disposed above the TMP 18, and the particles separated from the APC valve 17 flow into the TMP 18 by the exhaust stream of rough evacuation and the gravity, and thereafter, is discharged from the exhaust system, but the APC valve 17 and the TMP 18 may be disposed in a column along the horizontal direction. In this case, when the APC valve 17 is closed, the pressure at the downstream side of the APC valve 17 reduces to be lower than the pressure at the upstream side of the same by rough evacuation of the RP, and when the APC valve 17 is opened, the particles separated from the APC valve 17 are transported to the TMP 18 by the pressure difference between the downstream side and the upstream side of the APC valve, in step S12. The transported particles are discharged from the exhaust system by the exhaust stream of the rough evacuation by the RP. In addition, separation of the particles from the APC valve 17 is promoted by the pressure difference occurring at this time.

In the method for cleaning the exhaust system according to the above described present embodiment, the valve which repeats opening and closing is the APC valve 17, but if the valve which shuts off the exhaust passage from the chamber 11 to the TMP 18 on introduction of the $N_2$ gas and is the nearest to the chamber 11 is a valve other than the APC valve 17, for example, an isolation valve or a butterfly valve, it goes without saying that opening and closing of the isolation valve or the butterfly value is repeated.

Next, a method for cleaning an exhaust system according to a twelfth embodiment of the present invention will be described. An exhaust system to which the method for cleaning an exhaust system according to the present embodiment is applied only differs from the exhaust system of the substrate processing apparatus 10 in that an $N_2$ introducing line and a bypass exhaust line are opened in the vicinity of the APC valve, and an exhaust system to which the method for cleaning an exhaust system according to the present embodiment only differs from the method for cleaning an exhaust system according to the eleventh embodiment in that it does not repeat opening and closing of the APC valve. Therefore, the explanation of the redundant construction and operation between the present embodiment and the eleventh embodiment will be omitted, and an explanation of the different construction and operation will be made hereinafter.

Figure 19:
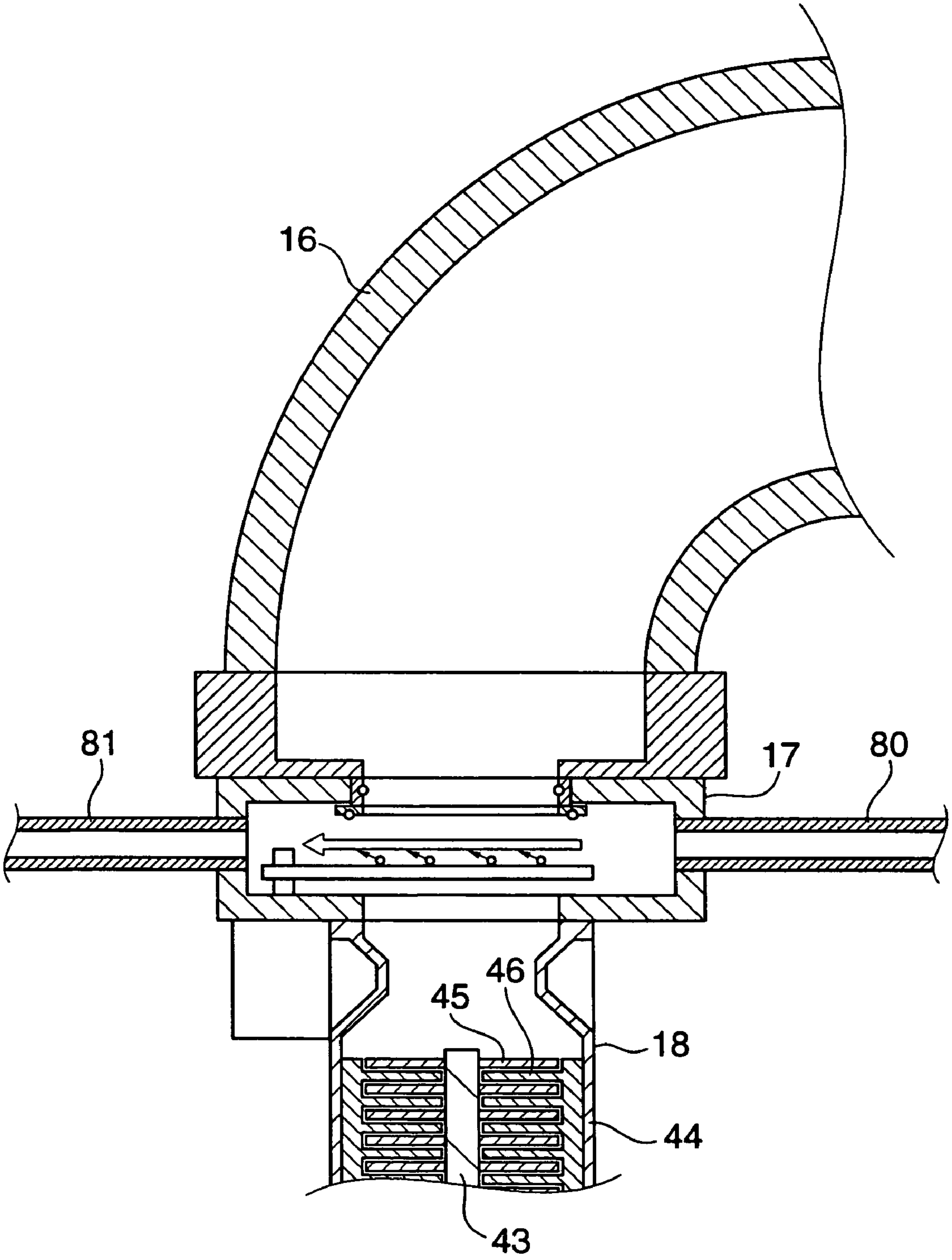
FIG. 19 is a sectional view schematically showing the construction of an exhaust system to which a method for cleaning the exhaust system according to a twelfth embodiment of the present invention is applied.

FIG. 19 is a sectional view schematically showing the construction of an exhaust system to which the method for cleaning an exhaust system according to the present embodiment is applied.

In FIG. 19, the exhaust system is provided with an $N_2$ introducing line 80 which is opened in the vicinity and to the side of a slide valve of the APC valve 17, and a bypass exhaust line 81 which is opened in the vicinity and to the side of the slide valve of the APC valve 17 to be opposed to an opening of the $N_2$ introducing line 80, in addition to the exhaust path 14, the baffle plate 15, the exhaust manifold 16, the APC valve 17 and the TMP 18. Specifically, the $N_2$ introducing line 80 and the bypass exhaust line 81 both open toward the surface at the upstream side (chamber 11 side) of the slide valve of the APC valve 17.

The $N_2$ introducing line 80 is connected to an $N_2$ gas supply part (not shown), and introduces an $N_2$ gas toward the upstream side surface of the slide valve of the APC valve 17 at a predetermined pressure. Further, the bypass exhaust line 81 is connected to the RP, and especially discharges the gas which is present on the upstream side surface of the slide valve of the APC valve 17 from the exhaust system.

In the processing before placing the wafer as the method for cleaning an exhaust system according to the present embodiment, the $N_2$ introducing line 80 introduces an $N_2$ gas toward the upstream side surface of the slide valve of the APC valve 17 at a predetermined pressure, and the bypass exhaust line 81 discharges the gas present on the upstream side surface of the slide valve of the APC valve 17 from the exhaust system, instead of step S12 in the processing in the above described FIG. 18. At this time, a viscous flow (shown by the hollow arrow in the drawing) occurs to the upstream side surface of the slide valve of the APC valve 17 by the $N_2$ gas introduced from the $N_2$ introducing line 80, and the viscous flow separates the particles which have deposited/adhered onto the APC valve 17, and further catches up the separated particles therein. The particles which are caught up into the viscous flow are discharged from the exhaust system via the bypass exhaust line 81 by the exhaust stream of the rough evacuation of the RP.

According to the processing before placing the wafer as the method for cleaning the exhaust system according to the present embodiment, the APC valve 17 shuts off the communication between the chamber 11 and the TMP 18, the RP roughly evacuates the inside of the chamber 11 and the exhaust system, thereafter, the $N_2$ introducing line 80 generates the viscous flow on the upstream side surface of the slide valve, and the bypass exhaust line 81 discharges the gas on the upstream side surface of the slide valve from the exhaust system. The particles which are deposited on or adhere to the upstream side surface of the slide valve of the APC valve 17 which shut off the communication between the chamber 11 and the TMP 18 are separated from the APC valve 17 by the viscous flow, and are removed by the exhaust stream of the rough evacuation. Thereby, the particles which flow into the TMP 18 from the APC valve 17 when the TMP 18 starts high-speed rotation can be eliminated. Therefore, the occurrence of the rebounding particles is prevented, and the infiltration of the particles into the chamber 11 can be prevented.

Next, a method for cleaning an exhaust system according to a thirteenth embodiment of the present invention will be described. An exhaust system to which the method for cleaning an exhaust system according to the present embodiment is applied only differs from the exhaust system of the substrate processing apparatus 10 in that the exhaust system of the present embodiment is provided with a valve, which is capable of advancing to and retreating from the exhaust passage and captures and holds particles, upstream of the APC valve, and the method for cleaning an exhaust system according to the present embodiment only differs from the method for cleaning an exhaust system according to the eleventh embodiment in that it does not repeat opening and closing of the APC valve. Therefore, the explanation of the redundant construction and operation between the present embodiment and the eleventh embodiment will be omitted, and an explanation of the different construction and operation will be made hereinafter.

Figure 20:
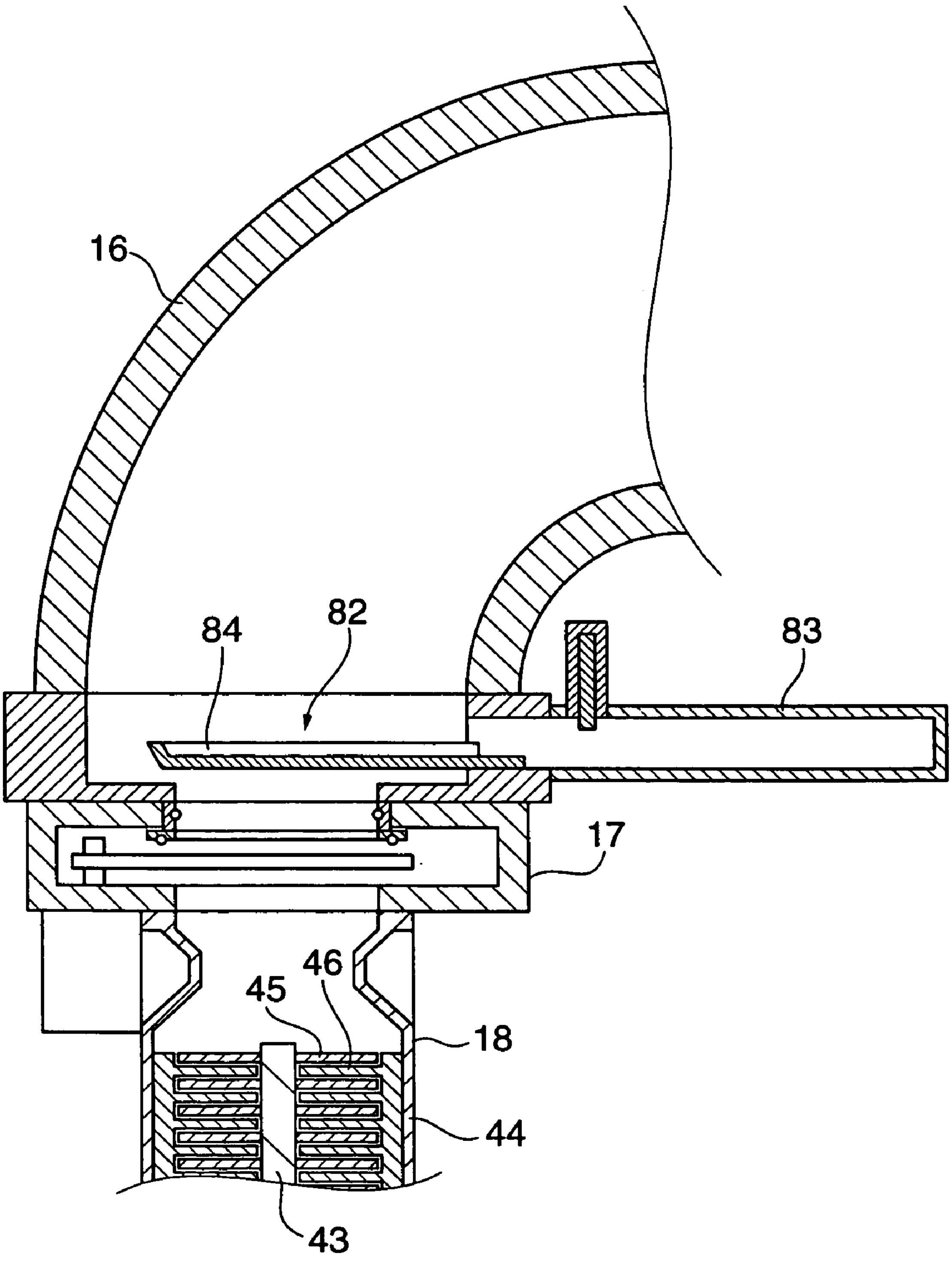
FIG. 20 is a sectional view schematically showing the construction of an exhaust system to which a method for cleaning the exhaust system according to a thirteenth embodiment of the present invention is applied.

FIG. 20 is a sectional view schematically showing the construction of an exhaust system to which the method for cleaning an exhaust system according to the present embodiment is applied.

In FIG. 20, upstream of the APC valve 17, the exhaust system is provided with a particle capturing valve 82 capable of advancing to and retreating from the exhaust passage from the chamber 11 to the APC valve 17, and a cleaning chamber 83 capable of housing the particle capturing valve 82, in addition to the exhaust path 14, the baffle plate 15, the exhaust manifold 16, the APC valve 17 and the TMP 18. When the particle capturing valve 82 advances to the exhaust passage, it substantially covers the upstream side surface of the slide valve of the APC valve 17, while when the particle capturing valve 82 retreats from the exhaust passage, it is housed in the cleaning chamber 83. The particle capturing valve 82 is provided with a wall part 84 which projects to the upstream side in its peripheral edge part as a particle holding mechanism.

In the processing before placing the wafer as the method for cleaning an exhaust system according to the present embodiment, the particle capturing valve 82 advances into the exhaust passage and shuts off the communication between the chamber 11 and the TMP 18 before the APC valve 17 shuts off the communication between the chamber 11 and the TMP 18. In this case, the particle capturing valve 82 is provided with the wall part 84 which projects to the upstream side in its peripheral edge part, and therefore, it captures and holds the particles which flow toward the TMP 18 from the chamber 11 in the exhaust passage. After step S12 and before step S15 in the processing in FIG. 18, the particle capturing valve 82 retreats from the exhaust passage. At this time, the particles held by the particle capturing valve 82 are retreated from the exhaust passage by being carried in the cleaning chamber 83 with the particle capturing valve 82, and further discharged outside the exhaust system by a cleaning mechanism (not shown) which the cleaning chamber 83 is provided with.

According to the processing before placing the wafer as the method for cleaning the exhaust system according to the present embodiment, the particle capturing valve 82 shuts off the communication between the chamber 11 and the TMP 18, the particle capturing valve 82 captures and holds the particles flowing toward the TMP 18 from the chamber 11, and further, the particle capturing valve 82 retreats from the exhaust passage while holding the particles. Thereby, the particles which flow into the TMP 18 from the APC valve 17 when the TMP 18 starts high-speed rotation can be eliminated. Therefore, the occurrence of the rebounding particles is prevented, and the infiltration of the particles into the chamber 11 can be prevented.

In the above described present embodiment, the particle capturing valve 82 is provided with the wall part 84 which projects to the upstream side at the peripheral edge part as the particle holding mechanism, but the particle holding mechanism is not limited to this, and, for example, the aggregation of a plurality of small rooms as shown in FIG. 15A, which is disposed on the upstream side surface of the particle capturing valve 82, and a member with a high friction coefficient which covers the upstream side surface of the particle capturing valve 82 fall under the category. The particle capturing valve 82 itself may be constructed by a member with a high friction coefficient.

Next, a method for cleaning an exhaust system according to a fourteenth embodiment of the present invention will be described. An exhaust system to which the method for cleaning an exhaust system according to the present embodiment is applied only differs from the exhaust system of the substrate processing apparatus 10 in that the exhaust system of the present embodiment is provided with an isolate valve between the APC valve and the TMP. Therefore, the explanation of the redundant construction and operation between the present embodiment and the eleventh embodiment will be omitted, and an explanation of the different construction and operation will be made hereinafter.

Figure 21:
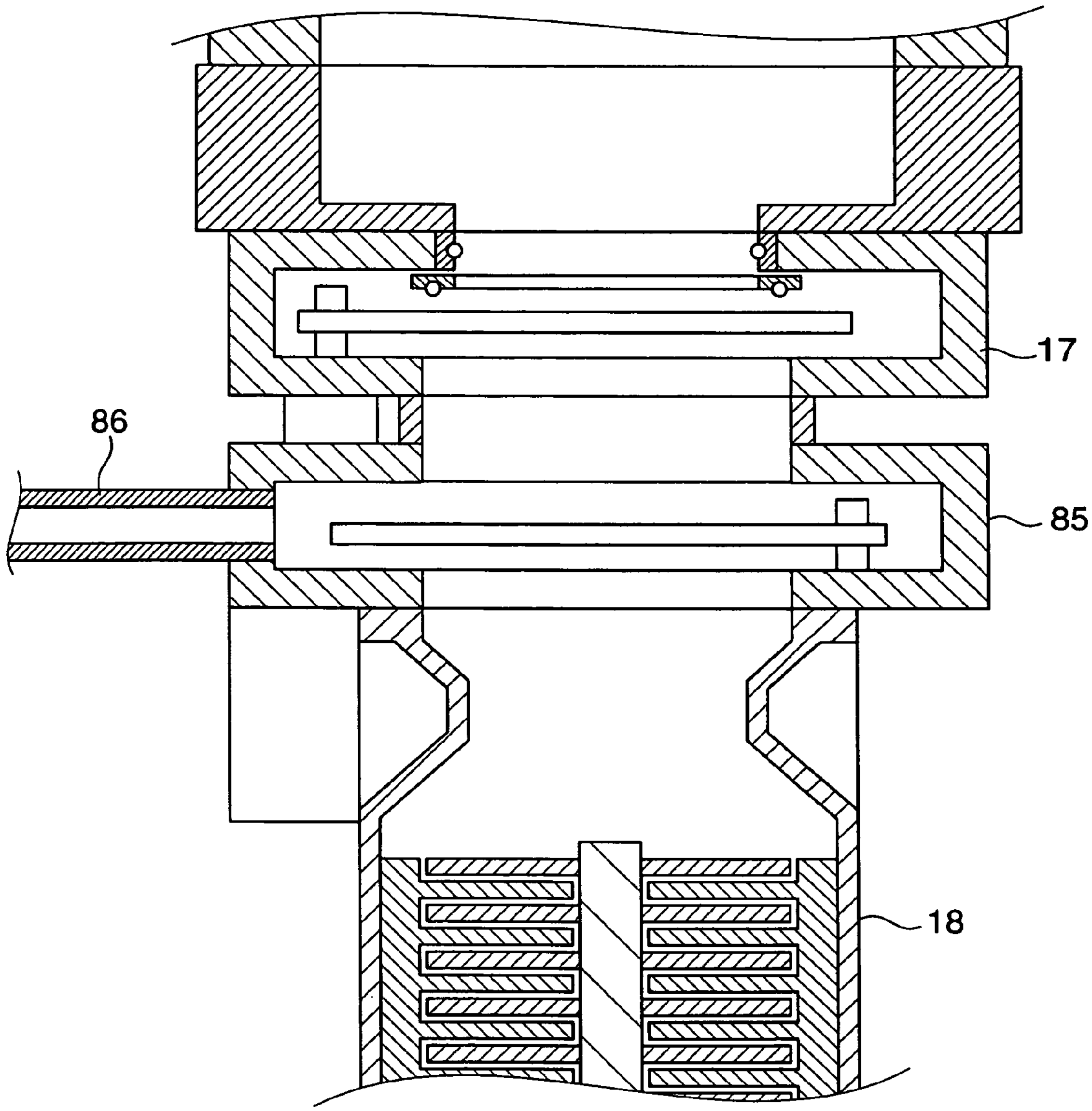
FIG. 21 is a sectional view schematically showing the construction of an exhaust system to which a method for cleaning the exhaust system according to a fourteenth embodiment of the present invention is applied.

FIG. 21 is a sectional view schematically showing the construction of an exhaust system to which the method for cleaning an exhaust system according to the present embodiment is applied.

In FIG. 21, the exhaust system is provided with an isolate valve 85 (an on-off valve disposed at the exhausting pump side) which is disposed between the APC valve 17 and the TMP 18, in addition to the exhaust path 14, the baffle plate 15, the exhaust manifold 16, the APC valve 17 (the on-off valve disposed at the processing chamber side) and the TMP 18. The isolate valve 85 has a slide valve capable of shutting off the communication between the APC valve 17 and the TMP 18. The exhaust system is also provided with a bypass exhaust line 86 which is opened in the vicinity and to the side of the slide valve of the isolate valve 85. The bypass exhaust line 86 is connected to the RP, and discharges the gas present on the upstream side surface of the slide valve of the isolate valve 85 from the exhaust system.

In the processing before placing the wafer as the method for cleaning an exhaust system according to the present embodiment, the isolate valve 85 shuts off the communication between the APC valve 17 and the TMP 18 before step S12 in the above described processing in FIG. 18, and the bypass exhaust line 86 starts rough evacuation of the exhaust passage from the APC valve 17 to the isolate valve 85. At this time, the particles which separated from the APC valve 17 which repeats opening and closing flow toward the TMP 18 by the gravity and the exhaust stream of the rough evacuation, but the isolate valve 85 shuts off the communication between the APC valve 17 and the TMP 18, and therefore, the slide valve of the isolate valve 85 inhibits the particles from flowing into the TMP 18. The particles which are inhibited from flowing into the TMP 18 are discharged from the exhaust system through the bypass exhaust line 86 by the exhaust stream of the rough evacuation. Next, after step S13 and before step S15, the isolate valve 85 restores the communication between the APC valve 17 and the TMP 18.

According to the processing before placing the wafer as the method for cleaning the exhaust system according to the present embodiment, the APC valve 17 shuts off the communication between the chamber 11 and the TMP 18, the isolate valve 85 shuts off the communication between the APC valve 17 and the TMP 18, the bypass exhaust line 86 roughly evacuates the exhaust passage from the APC valve 17 to the isolate valve 85, and thereafter, the APC valve 17 repeats opening and closing. The particles which are deposited on or adhere to the APC valve 17 which shut off the communication between the chamber 11 and the TMP 18 are separated from the APC valve 17 by the APC valve 17 repeating opening and closing. The separated particles are discharged from the exhaust system through the bypass exhaust line 86 by the exhaust stream of the rough evacuation. Thereby, the particles which flow into the TMP 18 from the APC valve 17 when the TMP 18 starts high-speed rotation can be eliminated.

The particles separated from the APC valve 17 flows toward the TMP 18 by the exhaust stream of the rough evacuation, but the isolate valve 85 shuts off the communication between the APC valve 17 and the TMP 18, and therefore, the slide valve of the isolate valve 85 inhibits the particles from flowing into the TMP 18. Thereby, the inflow of the particles into the TMP 18 is prevented without fail, and the infiltration of the particles into the chamber 11 can be prevented.

In the above described present embodiment, the isolate valve 85 is disposed between the APC valve 17 and the TMP 18 in the exhaust system, but the APC valve 17 may be disposed between the isolate valve 85 and the TMP 18. In this case, the particles are deposited on or adhere to the isolate valve 85, and the isolate valve 85 repeats opening and closing. The APC valve 17 shuts off the communication between the isolate valve 85 and the TMP 18 while the isolate valve 85 repeats opening and closing.

Next, a method for cleaning an exhaust system according to a fifteenth embodiment of the present invention will be described. An exhaust system to which the method for cleaning an exhaust system according to the present embodiment is applied only differs from the exhaust system in the fourteenth embodiment in that the exhaust system of the present embodiment is provided with an $N_2$ introducing line, and the method for cleaning an exhaust system according to the present embodiment only differs from the method for cleaning an exhaust system according to the fourteenth embodiment in that it does not repeat opening and closing of the APC valve. Therefore, the explanation of the redundant construction and operation between the present embodiment and the fourteenth embodiment will be omitted, and an explanation of the different construction and operation will be made hereinafter.

Figure 22A:
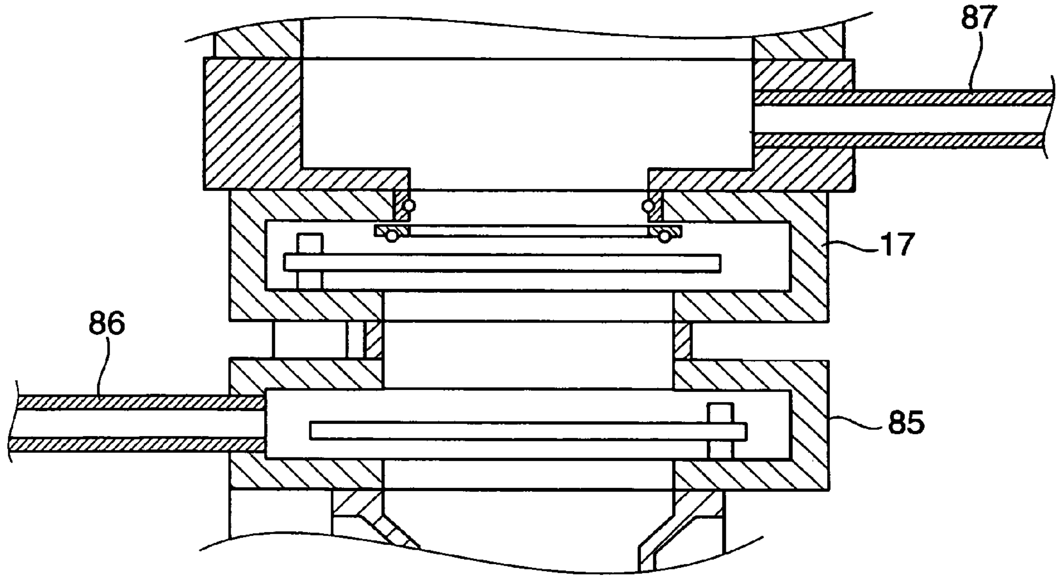
FIGS. 22A and 22B are views schematically showing the construction of an exhaust system to which a method for cleaning the exhaust system according to a fifteenth embodiment of the present invention is applied.
Figure 22B:
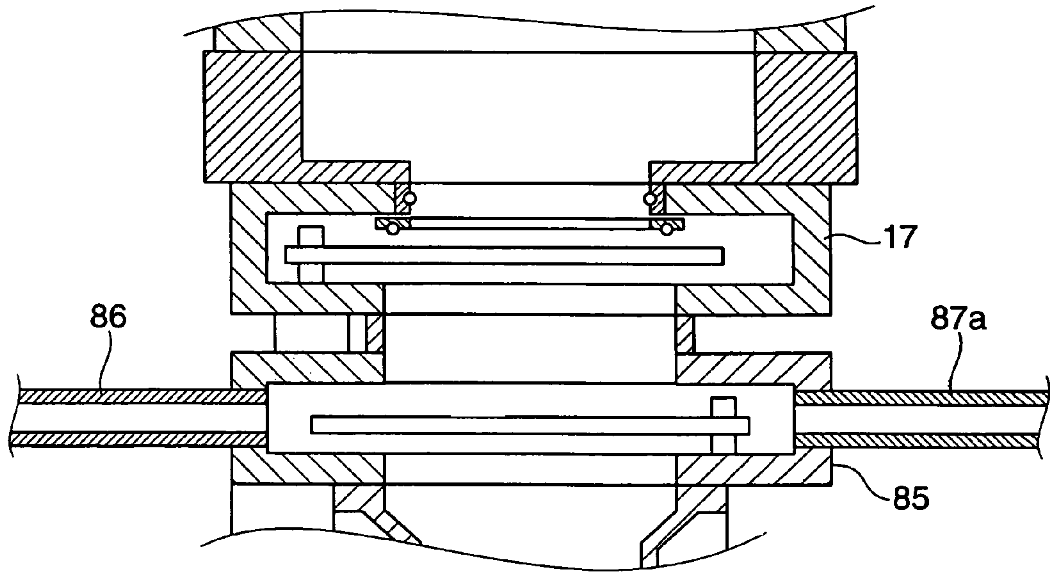

FIGS. 22A and 22B are views schematically showing the construction of an exhaust system to which the method for cleaning an exhaust system according to the present embodiment is applied, FIG. 22A is a sectional view of the same exhaust system, and FIG. 22B is a sectional view of a variant of the exhaust system.

In FIG. 22A, the exhaust system is provided with an $N_2$ introducing line 87 which is opened in the vicinity of the slide valve of the APC valve 17, in addition to the exhaust path 14, the baffle plate 15, the exhaust manifold 16, the APC valve 17, the isolate valve 85, the TMP 18 and the bypass exhaust line 86.

The $N_2$ introducing line 87 is opened to the upstream side (chamber 11 side) surface of the slide valve of the APC valve 17. The $N_2$ introducing line 87 is connected to an $N_2$ gas supply part (not shown), and introduces an $N_2$ gas toward the upstream side surface of the slide valve of the APC valve 17 at a predetermined pressure.

In the processing before placing the wafer as the method for cleaning an exhaust system according to the present embodiment, the isolate valve 85 shuts off the communication between the APC valve 17 and the TMP 18 before step S12 in the above described processing in FIG. 18. Instead of step S12 in the processing in FIG. 18, the APC valve 17 opens and restores the communication of the chamber 11 and the isolate valve 85, the $N_2$ introducing line 87 introduces the $N_2$ gas toward the slide valve of the APC valve 17 at a predetermined pressure, and the bypass exhaust line 86 discharges the gas present on the upstream side surface of the slide valve of the isolate valve 85 from the exhaust system. When the APC valve 17 opens, the particles, which are deposited on or adhere to the APC valve 17, separate and flow toward the isolate valve 85 by the exhaust stream of the rough evacuation. At this time, a viscous flow which passes through the APC valve 17 and flows on the upstream side surface of the slide valve of the isolate valve 85 is generated by the $N_2$ gas which is introduced from the $N_2$ introducing line 87, and the viscous flow catches up the particles separated from the APC valve 17 therein. The particles which are caught up into the viscous flow are discharged from the exhaust system through the bypass exhaust line 86 by the exhaust stream of the rough evacuation. Next, after step S13 and before step S15, the isolate valve 85 restores the communication between the APC valve 17 and the TMP 18.

According to the processing before placing the wafer as the method for cleaning the exhaust system according to the present embodiment, the APC valve 17 shuts off the communication between the chamber 11 and the TMP 18, the isolate valve 85 shuts off the communication between the APC valve 17 and the TMP 18, and the PR roughly evacuates the inside the chamber 11 and the exhaust system. Thereafter, the APC valve 17 opens and restores the communication of the chamber 11 and the isolate valve 85, the $N_2$ introducing line 87 generates the viscous flow which passes through the APC valve 17 and flows on the upstream side surface of the slide valve of the isolate valve 85, and the bypass exhaust line 86 roughly evacuates the exhaust passage from the APC valve 17 to the isolate valve 85. When the APC valve 17 which shuts off the communication between the chamber 11 and the TMP 18 opens, the particles separated from the APC valve 17 are caught up into the viscous flow, and are removed by the exhaust stream of the rough evacuation. Thereby, the particles which flow into the TMP 18 from the APC valve 17 when the TMP 18 starts high-speed rotation can be eliminated. Therefore, the occurrence of the rebounding particles is prevented, and the infiltration of the particles into the chamber 11 can be prevented.

Further, an exhaust system which is a variant of the exhaust system shown in FIG. 22A is provided with an $N_2$ introducing line 87*a* which is opened in the vicinity and to the side of the slide valve of the isolate valve 85. The $N_2$ introducing line 87*a* is opened toward the upstream side surface of the slide valve of the isolate valve 85, and introduces an $N_2$ gas toward the upstream side surface of the slide valve of the isolate valve 85 at a predetermined pressure. Therefore, the $N_2$ introducing line 87*a* generates the viscous flow which flows on the upstream side surface of the slide valve of the isolate valve 85.

The method for cleaning an exhaust system according to the above described present embodiment also falls under the category of the exhaust system shown in FIG. 22B. Thereby, the particles which flow into the TMP 18 from the APC valve 17 when the TMP 18 starts high-speed rotation can be eliminated. Therefore, the occurrence of the rebounding particles is prevented, and the infiltration of the particles into the chamber 11 can be prevented.

In the above described present embodiment, the isolate valve 85 is disposed between the APC valve 17 and the TMP 18 in the exhaust system, but the APC valve 17 may be disposed between the isolate valve 85 and the TMP 18. In this case, the bypass exhaust line 86 and the $N_2$ introducing line 87 are opened in the vicinity of the slide valve of the APC valve 17. The particles are deposited on or adhere to the isolate valve 85, and when the isolate valve 85 opens, the particles are separated. The separated particles are caught up into the viscous flow flowing on the upstream side surface of the slide valve of the APC valve 17, and are discharged from the exhaust system through the bypass exhaust line 86 by the exhaust stream of the rough evacuation.

Next, a method for cleaning an exhaust system according to a sixteenth embodiment of the present invention will be described. An exhaust system to which the method for cleaning an exhaust system according to the present embodiment is applied only differs from the exhaust system in the fourteenth embodiment in that the isolate valve is constructed similarly to the particle capturing valve 82 in FIG. 20, and the method for cleaning an exhaust system according to the present embodiment only differs from the method for cleaning an exhaust system according to the fourteenth embodiment in that it does not repeat opening and closing of the APC valve. Therefore, the explanation of the redundant construction and operation between the present embodiment and the fourteenth embodiment will be omitted, and an explanation of the different construction and operation will be made hereinafter.

In the processing before placing the wafer as the method for cleaning an exhaust system according to the present embodiment, step 10 in the processing in the above described FIG. 18 is skipped, and the isolate valve advances to the exhaust passage and shuts off the communication between the chamber 11 and the TMP 18. Here, the isolate valve is provided with the wall part which projects to the upstream side in is peripheral edge part, and therefore, captures and holds the particles which flow toward the TMP 18 from the chamber 11 in the exhaust passage. After step S12 and before step S15 in the processing in FIG. 18, the isolate valve retreats from the exhaust passage. At this time, the particles held by the isolate valve retreats from the exhaust passage with the particle capturing valve 82, and are further discharged to the outside of the exhaust system by the cleaning mechanism which the cleaning chamber is provided with.

According to the processing before placing the wafer as the method for cleaning an exhaust system according to the present embodiment, the isolate valve shuts off the communication between the chamber 11 and the TMP 18, the isolate valve captures and holds the particles which flow toward the TMP 18 from the chamber 11, and further, the isolate valve retreats from the exhaust passage while holding the particles. Thereby, the particles which flow into the TMP 18 from the APC valve 17 when the TMP 18 starts high-speed rotation can be eliminated. Therefore, the occurrence of the rebounding particles is prevented, and the infiltration of the particles into the chamber 11 can be prevented.

In the above described present embodiment, the isolate valve is provided with the wall part 84 which projects to the upstream side at the peripheral edge part, but it goes without saying that the isolate valve may have the aggregation of a plurality of small rooms as shown in FIG. 15A, and a member with a high friction coefficient which covers the upstream side surface.

The methods for cleaning an exhaust system according to the above described eleventh embodiment to sixteenth embodiment are applicable to not only the APC valve and the isolate valve, but also all the valves present in the exhaust passage from the chamber 11 to the TMP 18. Further, the methods for cleaning an exhaust system according to the above described eleventh embodiment to sixteenth embodiment may be combined with the reflecting device, the communicating pipe and the exhausting pump according to each of the above described embodiments.

In order to confirm the effect in the case of carrying out the processing before placing the wafer in the above described FIG. 18, the inventors of the present invention carried out the processing in the substrate processing apparatus 10. At this time, before step S11, a large number of false particles ($SiO_2$ fine particles of the particle size of 1 μm) were scattered to the upstream side surface of the slide valve of the APC valve 17.

Thereafter, high-speed rotation of the TMP 18 was started, and each time opening and closing of the APC valve 17 were repeated, the number of particles which rebound to the processing space S of the chamber 11 was measured by an ICPM (IN-Chamber Particle Monitor) which will be described later. The measurement of the number of particles was performed twice.

Figure 23:
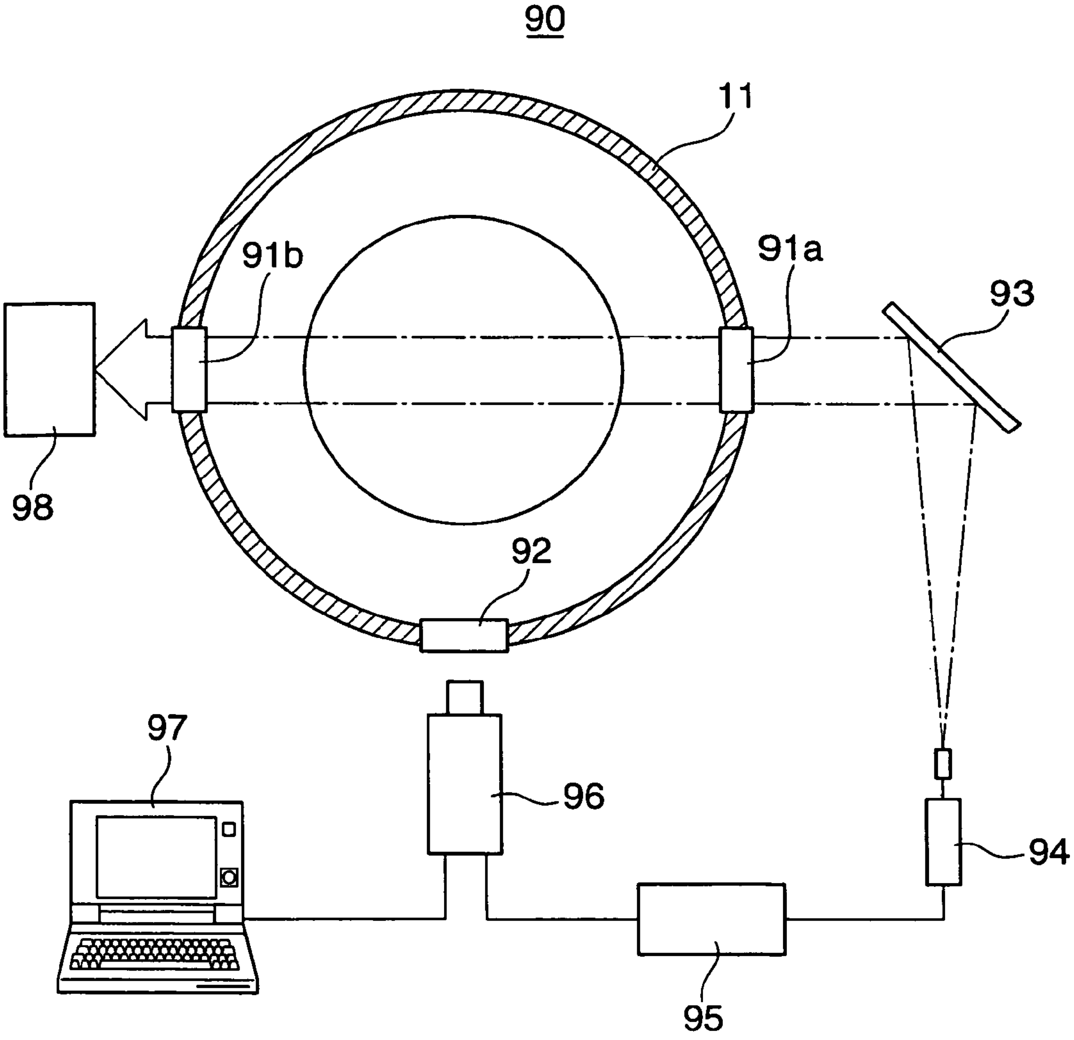
FIG. 23 is a view schematically showing the construction of an ICPM capable of observing the particles present in a processing space in the chamber.

FIG. 23 is a schematic block diagram of the ICPM capable of observing the particles present in the processing space in the chamber.

In FIG. 23, an ICPM 90 is provided with the chamber 11 provided with a pair of laser light transmitting windows 91*a* and 91*b* which are symmetrically disposed at a side wall of the chamber 11 with the lower electrode 12 therebetween, and an observation window 92 which makes it possible to observe laser light irradiated from the laser light transmitting window 91*a* to the laser light transmitting window 91*b* from a side direction and is disposed at the side wall of the chamber 11, a reflective mirror 93 which is disposed on the straight line with the laser light transmitting windows 91*a* and 91*b*, an SHG-YAG laser light oscillator 94 which irradiates laser light toward the reflective mirror 93, a pulse oscillator 95 which determines the pulse of the laser light irradiated by the SHG-YAG laser light oscillator 94, a CCD camera 96 which picks up the image of the laser light irradiated from the laser light transmitting window 91*a* to the laser light transmitting window 91*b* through the observation window 92, a PC 97 which controls the operation of each component of the ICPM, and a beam damper 98 which absorbs the laser light irradiated outside the chamber 11 through the laser light transmitting window 91*b*.

When the particles which have rebounded and infiltrated the processing space S pass through the laser light which is irradiated to the laser light transmitting window 91*b* from the laser light transmitting window 91*a* in the ICPM 90, scattered light occurs. The scattered light intensity at this time is proportional to the number of particles passing through the laser light.

Figure 24:
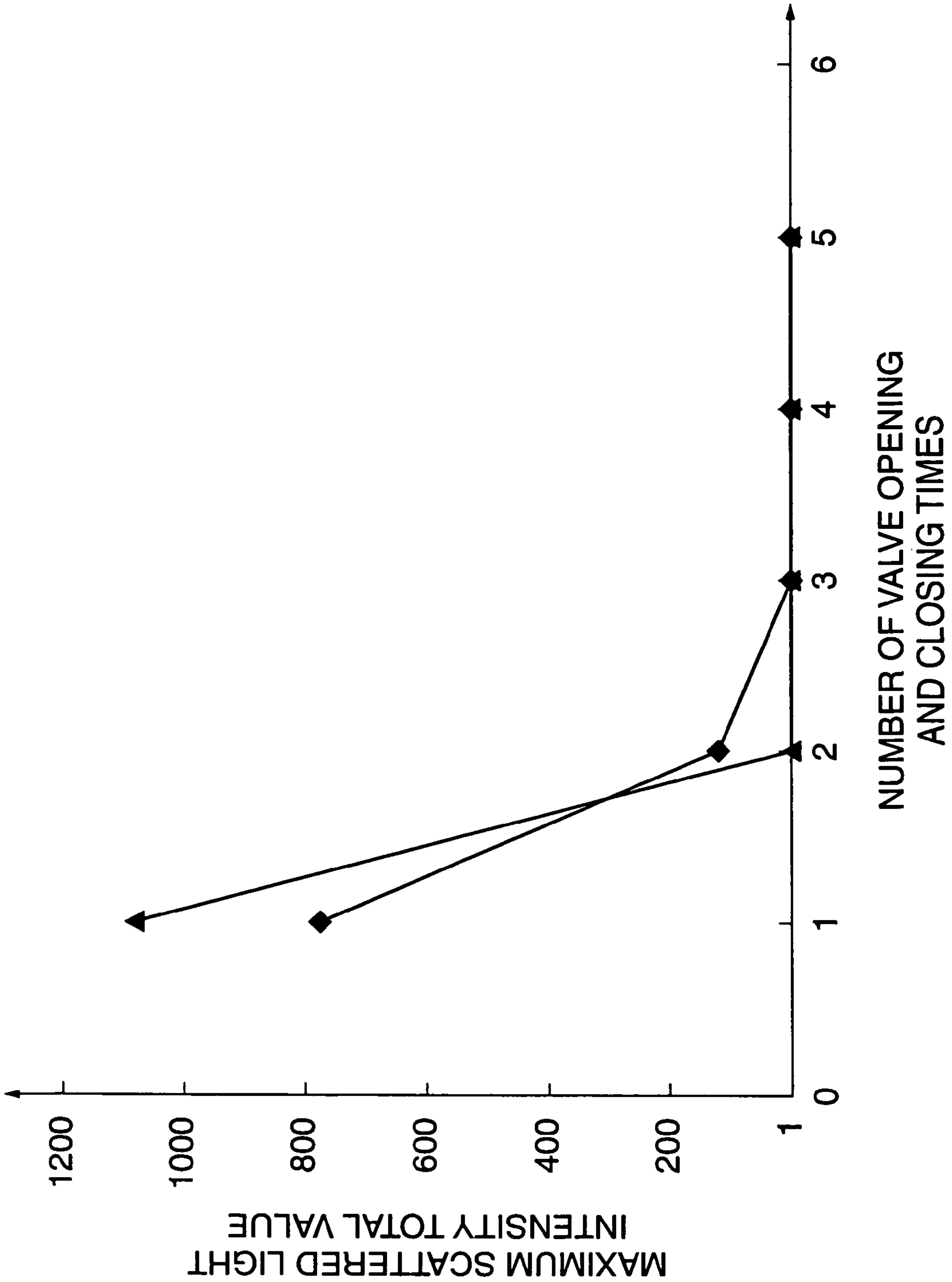
FIG. 24 is a graph showing the number of particles present in the processing space in the chamber, which was measured by the ICPM.

FIG. 24 is a graph showing the number of particles present in the processing space in the chamber which is measured by the ICPM.

In the graph in FIG. 24, the horizontal axis represents the number of opening and closing times of the APC valve 17, and the vertical axis represents the scattered light intensity. The measurement result of the first time is shown by "♦", and the measurement result of the second time is shown by "▲".

From this graph, it has been found out that when opening and closing of the APC valve 17 are repeated twice or more, the rebounding particles do not occur. Therefore, it has been found out that by repeating opening and closing of the APC valve 17 before carrying the wafer into the chamber 11, the particles which are deposited on or adhere to the APC valve

17 can be removed, whereby the infiltration of the particles into the processing space S of the chamber 11 can be prevented.

Next, a substrate processing apparatus according to a seventeenth embodiment of the present invention will be explained. The substrate processing apparatus according to the present embodiment only differs from the substrate processing apparatus to which the reflecting device according to the first embodiment is applied in that it is provided with a particle capturing component instead of the reflecting device. Therefore, the explanation of the redundant construction and operation between the present embodiment and the first embodiment will be omitted, and an explanation of the different construction and operation will be made hereinafter.

Figure 25:
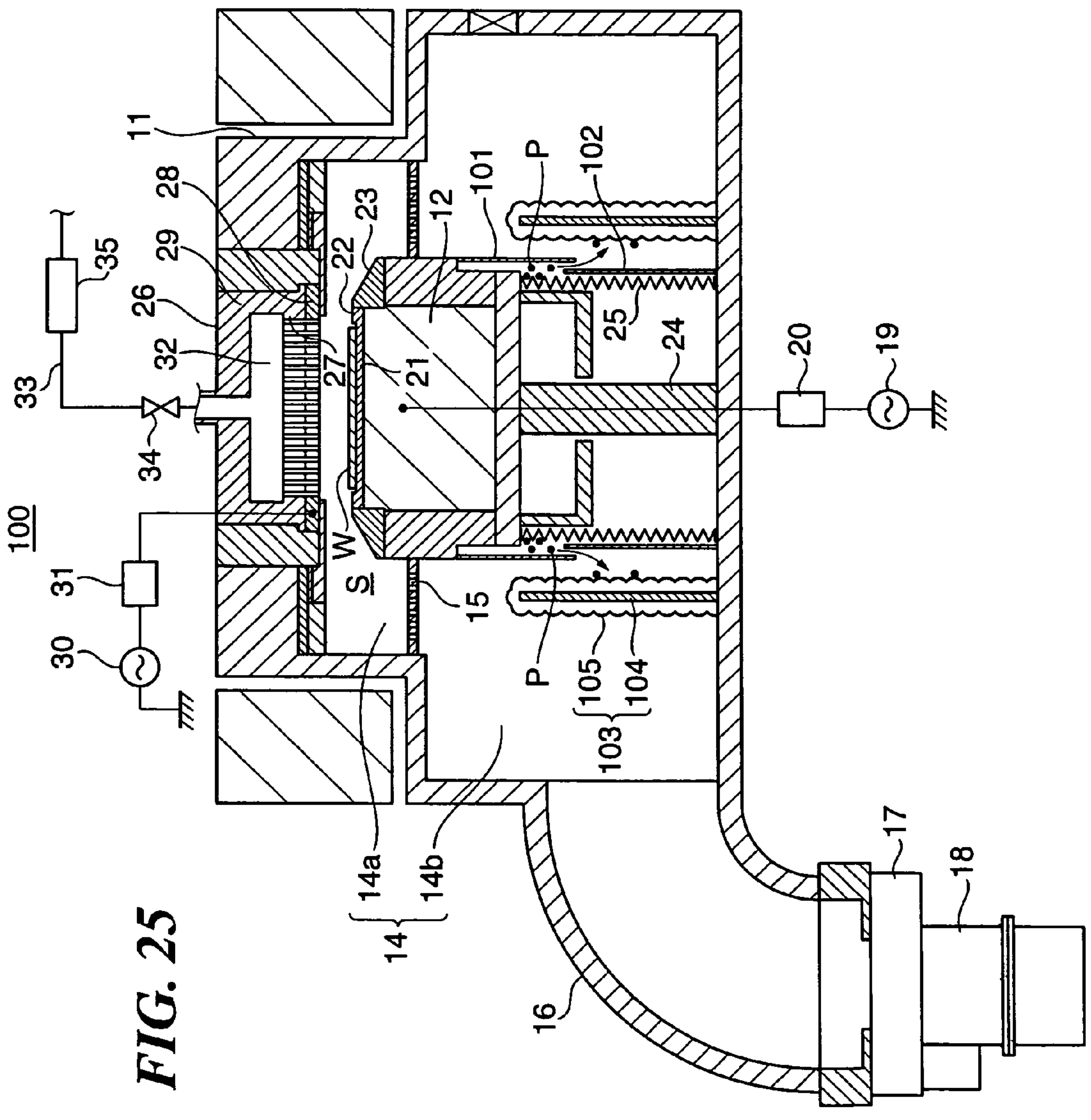
FIG. 25 is a sectional view schematically showing the construction of a substrate processing apparatus according to a seventeenth embodiment of the present invention.

FIG. 25 is a sectional view schematically showing the construction of the substrate processing apparatus according to the seventeenth embodiment of the present invention.

In FIG. 25, a substrate processing apparatus 100 is provided with a cylindrical upper cover 101 which covers a side part of the lower electrode 12 which moves up and down in the chamber 11, and a lower cover 102 which is vertically provided at a bottom surface of the downstream part 14*b* of the exhaust path 14 and covers a periphery of the bellows cover 25. The lower cover 102 is disposed concentrically with the upper cover 101. An outside diameter of the lower cover 102 is set to be smaller than an inside diameter of the upper cover 101 by a predetermined value, so that the upper cover 101 is prevented from interfering with the lower cover 102 when the lower electrode 12 moves downward.

Since the outside diameter of the lower cover 102 is set to be smaller than the inside diameter of the upper cover 101 by the predetermined value as described above, a predetermined gap occurs between the lower cover 102 and the upper cover 101, and the particle P which have occurred in the processing space S and have flowed into the downstream part 14*b* of the exhaust path 14 sometimes pass through the predetermined gap and adheres to the bellows cover 25 (particle generation source). The particle P having adhered to the bellows cover 25 separates from the bellows cover 25 with up and down movement of the lower electrode 12, and further pass through the predetermined gap again and scatters into the downstream part 14*b* (refer to the arrow in the drawing).

In the present embodiment, in view of the above, a particle capturing component 103 is disposed around the bellows cover 25, more specifically, around the lower cover 102. The particle capturing component 103 is comprised of a cylindrical core material 104 which is vertically provided at the bottom surface of the downstream part 14*b* of the exhaust path 14 to cover the periphery of the lower cover 102, and a stainless felt 105 (or fluororesin felt) which is disposed to cover the surface of the core material 104. The height of the core material 104 is set to be higher than the height of the lower cover 102, and therefore, the particle capturing component 103 is present on the scattering route of the particle P which passes through the predetermined gap and scatters to the downstream part 14*b*. Since the stainless felt is a material with fibrous substances intertwined with one another at random, it can physically capture the particles, and has the high capturing efficiency of the particles as described above. Therefore, the particle capturing component 103 can capture the scattered particle P with high efficiency irrespective of the particle P being electrically charged or not.

The composed material of the element which covers the core material 104 in the particle capturing component 103 is not limited to the stainless felt, but may be comprised of those listed as follows.

1) particle capturing material
2) impact absorbing material
3) adhesive material In the particle capturing material, the particle P which have infiltrated the particle capturing material repeats collision against the fibrous substances and the border surface of the small space. Since the flight path of the particle P extends by repetition of the collision, friction of the particle P and a gas molecule increases. Thereby, the momentum of the particle P can be reduced, and as a result, the particle P can be captured.

In the impact absorbing material, the momentum of the particle P can be reduced by absorbing the impact by collision of the particle P, and as a result, the particle P can be captured. By constructing the structure in which the fibrous substances are intertwined with one another at random or the structure having a large number of small spaces by using the impact absorbing material, the number of collisions of the particle P and the impact absorbing material can be increased in the structure, and thereby, the momentum of the particle P can be reduced without fail.

In the adhesive material, the particle P adheres to the adhesive material, and thereby, the particle P can be directly captured.

It is the same as in the above described kinetic energy reducing mechanism and particle capturing mechanism which are disposed on the entire surface of the inner wall in the exhaust manifold, the TMP and the downstream part of the exhaust path that the composing materials of the above described particle capturing material, impact absorbing material and adhesive material preferably have heat resistance, plasma corrosion resistance, acid resistance and sufficient rigidity against the exhaust stream flowing in the exhaust system, the examples of the composing material have metals (stainless steel, aluminum, silicon), ceramics (alumina ($Al_2O_3$), yttrium ($Y_2O_3$)), quartz, organic compounds (PI, PBI, PTFE, PTCFE, PEI, CF rubber or silicon rubber), the materials which are made by applying surface treatment of oxidation, thermal spraying or the like to a predetermined core material (an yttrium sprayed product, an alumina sprayed product, an anodized product) may be used.

According to the substrate processing apparatus of to the present embodiment, the particle capturing component 103 comprised of the core material 104 and the stainless felt 105 which covers the surface of the core material 104 is disposed on the scattering route of the particle P which scatters from the bellows cover 25, and therefore, not only the electrically charged particle P but also the particle P which is not electrically charged can be captured. Since the particle capturing component 103 is only disposed at the downstream part 14*b* of the exhaust path 14, the particle P in the chamber 11 can be efficiently captured without significantly changing the structure of the chamber 11. The particle capturing component 103 can also capture the particles which have rebounded from the TMP 18 and have infiltrated the downstream part 14*b* of the exhaust path 14, and therefore, it can prevent the infiltration of the particles into the processing space S.

The core material 104 of the above described particle capturing component 103 presents the cylindrical shape, but the shape of the core material 104 is not limited to this, and may be a bar shape. In this case, it is preferable that a plurality of bar-shaped particle capturing components are disposed on the circumference to surround the lower cover 102.

In the substrate processing apparatus according to the present embodiment, the particle generation source is the bellows cover 25 which is a movable component, but the movable component as the particle generation source is not limited to this, and may be movable components disposed in the processing space S and the exhaust path 14, and the particle capturing component may be disposed on the scattering route of the particles which scatter from them, for example, in the vicinity of these movable components.

Further, the particle generation source is not limited to the movable component, and may be a recess which faces the processing space S and the exhaust path 14, for example, a view port 106 which is sometimes provided to observe the inside of the processing space S from the outside. An adherent easily adheres to such a recess, and the adherent peels off by the vibration of the chamber 11, the viscous force of the gas flowing in the chamber 11, the electromagnetic force caused by the electric field in the chamber 11, or the like, and becomes particles to directly scatter. In this case, it is preferable to dispose the particle capturing component in the vicinity of the recess (the view port 106).

In order to confirm the effect in the case of providing the above described particle capturing component, the inventors of the present invention measured the number of particles adhering to the surface of the wafer W in the following procedure.

1) First, the inventors measured the number of particles adhering to the surface of the wafer W with a foreign body detector before carrying the wafer W into the chamber 11 of the substrate processing apparatus 100 which was not provided with the particle capturing component.

2) The inventors carried the wafer W into the chamber 11 and scattered the particles into the processing space S from the port (not shown) opened to the processing space S.

3) The inventors carried out the wafer W from the chamber 11, measured the number of particles adhering to the surface of the wafer W with the foreign body detector, and obtained the number of increased particles by subtracting the number of particles measured in the above described 1) from the measured number.

4) Next, the inventors placed the particle capturing component on the scattering route of the particles from the port in the processing space S. The inventors cleaned the surface of the wafer W, and measured the number of particles adhering to the surface of the wafer W after cleaning with the foreign body detector.

5) The inventors carried the wafer W into the chamber 11, and scattered the particles into the processing space S from the port opened to the processing space S.

6) The inventors carried out the wafer W from the chamber 11, measured the number of particles adhering to the surface of the wafer W with the foreign body detector, and obtained the number of increased particles by subtracting the number measured in the above described 4) from the measured number.

The diameters of the particles measured in the above described 1) to 6) were 0.1 μm or more.

As a result of carrying out the above procedure, the number of increased particles in the case where the particle capturing component was not provided was 202, while the number of increased particles in the case where the particle capturing component was provided was six. Thereby, it has been found out that the particles in the chamber 11 can be efficiently captured by only providing the particle capturing component on the scattering route of the particles from the port.

Next, a method for cleaning an exhaust system according to an eighteenth embodiment of the present invention will be described. The method for cleaning an exhaust system according to the present embodiment only differs from the method for cleaning an exhaust system according to the eleventh embodiment in that opening and closing of the APC valve are repeated while the rotary blades of the TMP are rotated. Therefore, the explanation of the redundant construction and operation between the present embodiment and the eleventh embodiment will be omitted, and an explanation of the different construction and operation will be made hereinafter.

Figure 26:
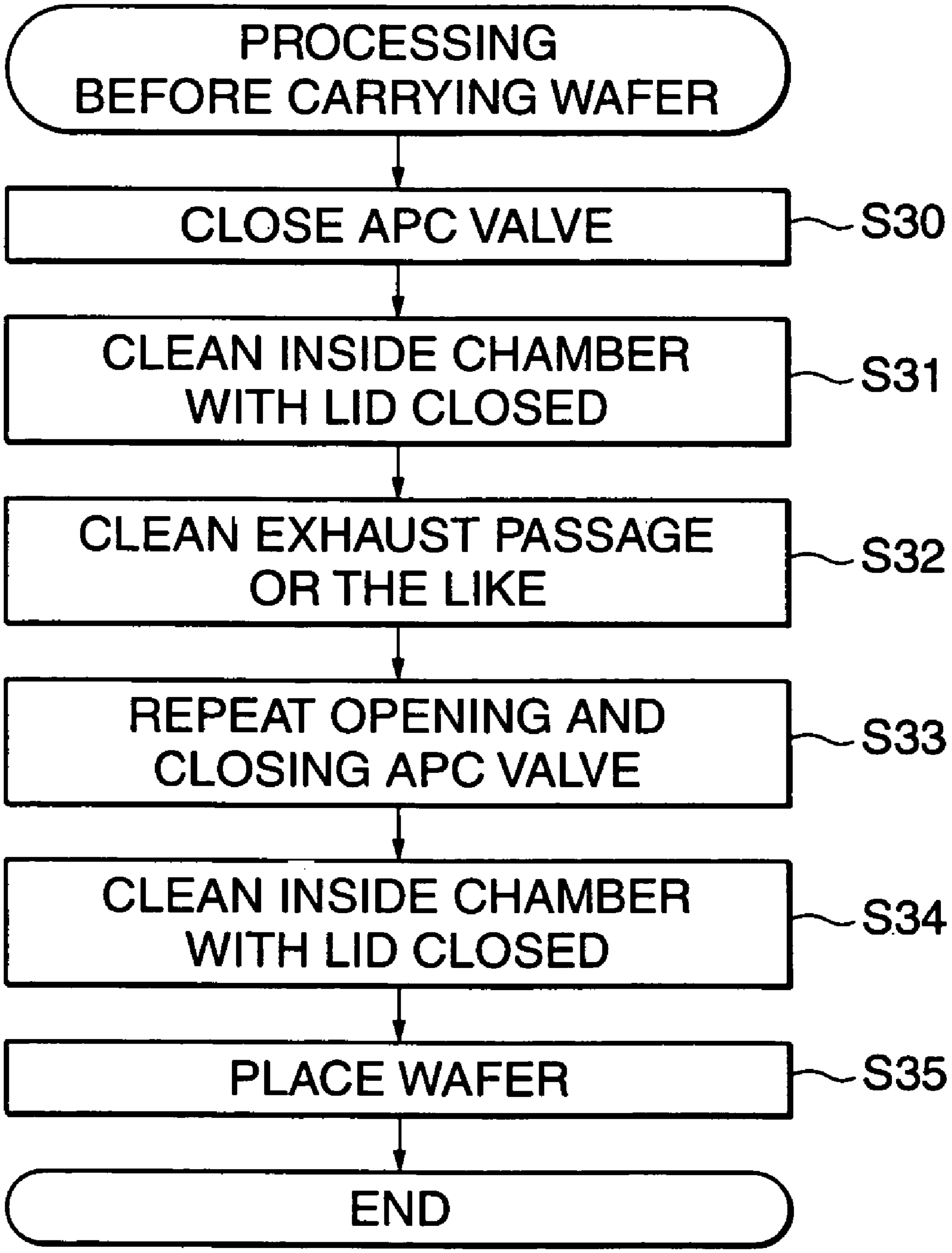
FIG. 26 is a flow chart of the processing before placing the wafer as a method for cleaning an exhaust system according to an eighteenth embodiment of the present invention.

FIG. 26 is a flow chart of processing before placing the wafer as the method for cleaning an exhaust system according to the present embodiment. The present processing is carried out in the same manner as the processing in FIG. 18, in the case where a deposit adheres to the inner wall and the like of the chamber 11 of the substrate processing apparatus 10 and the inside of the chamber 11 needs to be cleaned, between a certain production lot and the subsequent production lot, in the case where the idling state of the substrate processing apparatus 10 continues for a long time, or the like.

In FIG. 26, first, the APC valve 17 is closed to close the exhaust passage from the chamber 11 to the TMP 18 and to shut off the communication between the chamber 11 and the TMP 18 while the rotary blades 45 of the TMP 18 are rotated at a high speed (step S30). At this time, particles are deposited on or adhere to the APC valve 17. Unlike the above described processing in FIG. 18, the rotation of the rotary blades 45 of the TMP 18 is not stopped in this case.

Next, removal of the particles in the chamber 11 (cleaning in the chamber with the lid closed) is performed with the lid of the chamber 11 closed (step S31). As the method for cleaning the inside of the chamber, a method for causing an impact wave by abruptly introducing an $N_2$ gas into the chamber 11, separating particles from the inner wall of the chamber 11 by the impact wave, and discharging the separated particles by the viscous flow of the introduced $N_2$ gas, a method for separating the particles from the inner wall of the chamber 11 by electromagnetic stress by applying voltage to the inner wall of the chamber 11 and removing the particles, a method for separating the particles from the inner wall of the chamber 11 by thermal stress by spraying a high-temperature gas to the inner wall of the chamber 11 and removing the particles, or the like is applicable.

Next, removal of the particles in the exhaust path 14 and the exhaust manifold 16 (cleaning of the exhaust path and the like) is performed (step S32). As the method for cleaning of the exhaust path and the like, the same method as the above described method for the cleaning of the inside of the chamber is applicable.

Next, the APC valve 17 repeats opening and closing at least one time or more, preferably 20 times or more (step S33). At this time, the particles which are deposited on or adhere to the APC valve 17 are separated by vibration or the like occurring due to repetition of opening and closing of the APC valve 17. Since the rotary blades 45 of the TMP 18 rotate at a high speed at this time, the particles separated from the APC valve 17 collide with the rotary blades 45 of the TMP 18 and rebound, and infiltrate the chamber 11 and stay in the chamber 11.

Next, removal of the particles in the chamber 11 is performed with the same method as in step S31 (step S34), and thereafter, the wafer W is carried into the chamber 11 (step S35), and the present processing is finished.

According to the processing before placing the wafer as the method for cleaning an exhaust system according to the present embodiment, the APC valve 17 shuts off the communication between the chamber 11 and the TMP 18, and the APC valve 17 repeats opening and closing while the rotary blades 45 of the TMP 18 are rotated. Thereafter, the particles in the chamber 11 are removed, and the wafer W is carried into the chamber 11. The particles which are deposited on or adhere to the APC valve 17 which shut off the communication between the chamber 11 and the TMP 18 are separated from the APC valve 17 by the APC valve 17 repeating opening and closing. The separated particles infiltrate the inside of the TMP 18, and the particles having infiltrated it collide against the rotary blades 45 which are rotating and rebound to the chamber 11, but the particles having rebounded to the chamber 11 are removed by particle removal in the chamber 11 before the wafer W is carried into the chamber 11. Thereby, the particles which are deposited on or adhere to the APC valve 17 and the particles in the chamber 11 can be removed before the wafer W is carried into the chamber 11. As a result, the occurrence of the particles which rebound after the wafer W is carried into the chamber 11 can be prevented, and the infiltration of the particles into the chamber 11 can be prevented.

In the method for cleaning an exhaust system according to the present embodiment, it is not necessary to stop the rotation of the rotary blades 45 of the TMP 18, and therefore, it is not necessary to perform stop and start processing of the TMP 18 which requires time. Thus, return to the state in which the wafer W is capable of being carried in from maintenance of the chamber 11 can be performed quickly.

Next, an exhausting pump according to a nineteenth embodiment of the present invention will be described.

The present embodiment is basically the same as the above described seventh embodiment in its construction and operation, and differs from the above described seventh embodiment in that the present embodiment does not have a reflector plate and the shapes of some rotary blades differ from those of the other rotary blades. Therefore, the explanation of the redundant construction and operation will be omitted, and an explanation of the different construction and operation will be made hereinafter.

Figure 27A:
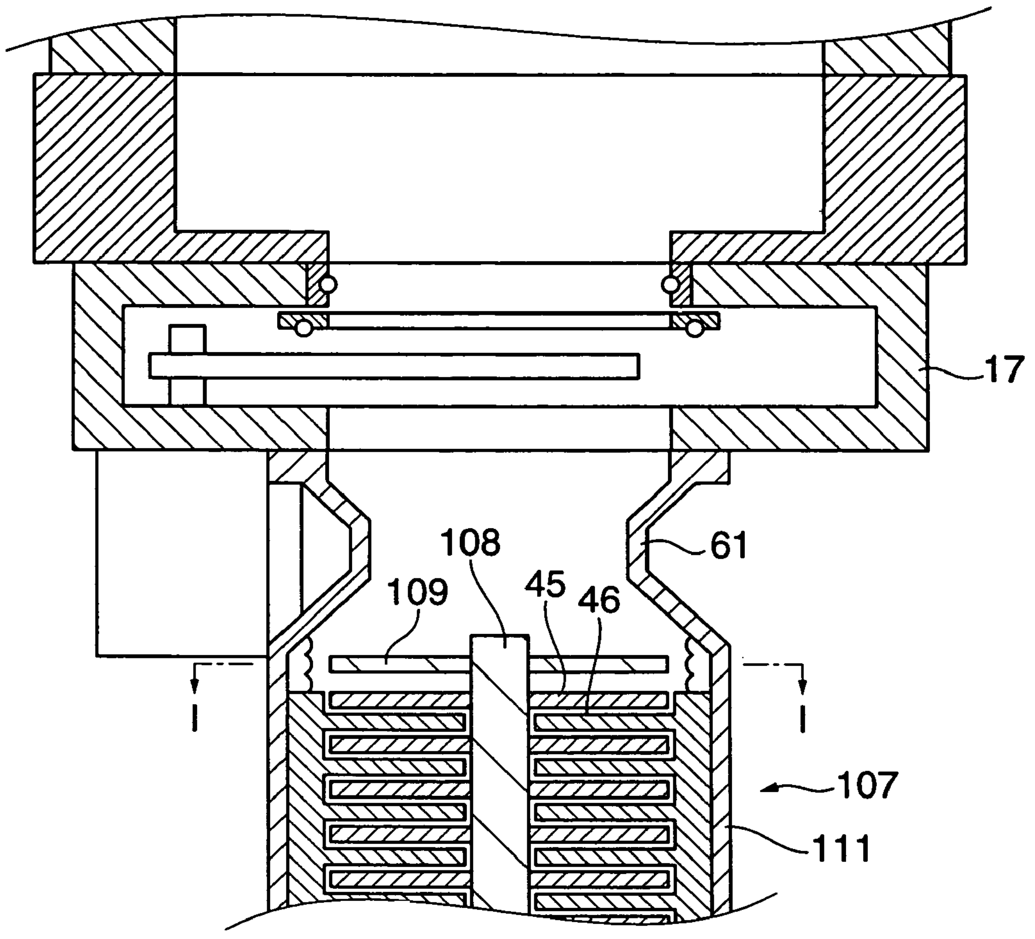
FIGS. 27A and 27B are sectional views schematically showing the construction of the TMP as an exhausting pump according to a nineteenth embodiment of the present invention.
Figure 27B:
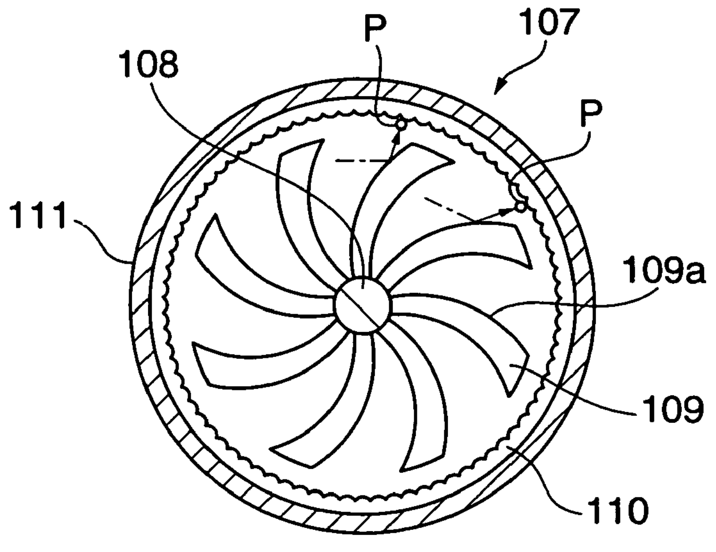

FIGS. 27A and 27B are views schematically showing the construction of a TMP as an exhausting pump according to the present embodiment. FIG. 27A is a vertical sectional view of the TMP, and FIG. 27B is a sectional view taken along the line I to I in FIG. 27A. In FIGS. 27A and 27B, the upper part in the drawing is referred to as "the upper side", and the lower part in the drawing is referred to as "the lower side".

In FIGS. 27A and 27B, a TMP 107 is provided with a cylindrical body 111 which is disposed along the vertical direction in the drawing, namely, the direction of an exhaust stream, a rotary shaft 108 which is disposed along a center axis of the body 111, a plurality of blade-shaped rotary blades 45 which are projected orthogonally from the rotary shaft 108, and a plurality of blade-shaped stator blades 46 which are projected toward the rotary shaft 108 from the inner peripheral surface of the body 111.

The rotary shaft 108 has a larger amount of projection to the APC valve 17 (chamber 11) side than the above described rotary shaft 43, and a plurality of rotary blades 109 are projected from the rotary shaft 108 in the vicinity of an end part at the chamber 11 side, of the rotary shaft 108. Namely, the rotary blades 109 are disposed nearer to the chamber 11 than the rotary blades 45.

A plurality of rotary blades 109 are radially projected from the rotary shaft 108 to form a rotary blade group, and rotate with the rotary shaft 108 as a center. A plurality of rotary blades 109 are equidistantly disposed along the circumferential direction in the plane where the rotary blades 109 rotate. A front end 109*a* with respect to the direction of rotation of each rotary blade 109 is curved to be oriented to the inner peripheral surface (inner wall) of the body 111.

A flocculent body 110 (particle capturing mechanism) is disposed on the inner peripheral surface of the body 111 which is opposed to the front ends 109*a* of the rotary blades 109. The flocculent body 110 is composed of the same material as the above described flocculent body 75, but is preferably composed of stainless felt, fluororesin felt or a polyimide foam.

In the TMP 107, the particle P which has infiltrated the body 110 collides against the front end 109*a* of the rotary blade 109, but the front end 109*a* is curved to be oriented to the inner peripheral surface of the body 111, and therefore, the particle P which has collided against it rebounds toward the flocculent body 110 as shown in FIG. 27B.

According to the exhausting pump of the present embodiment, the front end 109*a* with respect to the direction of rotation of the rotary blade 109 is curved to be oriented to the inner peripheral surface of the body 111. The particles which have infiltrated the body 111 from the chamber 11 and the like collide against the front ends 109*a* of the rotary blades 109, and as the front ends 109*a* are curved to be oriented to the inner peripheral surface of the body 111, the particles which have collided against the front ends 109*a* rebound toward only the inner peripheral surface of the body 111. As a result, the infiltration of the particles into the processing chamber can be prevented.

In the above described TMP 107, the flocculent body 110 is disposed on the inner peripheral surface of the body 111 which is opposed to the front ends 109*a* of the rotary blades 109, and therefore, the particles which have collided against the front ends 109*a* are captured by the flocculent body 110. As a result, the infiltration of the particles into the processing chamber can be prevented without fail.

In each of the above described embodiments, the case where the substrate processing apparatus is the etching processing apparatus as the semiconductor device manufacturing apparatus is explained, but the substrate processing apparatus to which the present invention is applicable is not limited to this, and it may be a semiconductor device manufacturing apparatus using the other plasma, for example, a film forming processing apparatus using CVD (Chemical Vapor Deposition), PVD (Physical Vapor Deposition) and the like. Furthermore, the present invention is applicable to any reduced-pressure processing apparatus using a TMP such as an etching processing apparatus and a film forming processing apparatus as an ion-implanting processing apparatus, a vacuum transfer apparatus, a thermal processing apparatus, an analyzer, an electron accelerator, an FPD (Flat Panel Display) manufacturing apparatus, a solar cell manufacturing apparatus, or a physical quantity analyzer.

Further, in the above described embodiments, the substrate which is subjected to the processing is the semiconductor wafer, but the substrate subjected to the processing is not limited to this, and it may be a glass substrate of an LCD (Liquid Crystal Display), an FPD or the like.

The object of the present invention may also be accomplished by supplying a system or an apparatus with a storage medium in which a program code of software, which realizes the functions of each of the above described embodiments is stored, and causing a computer (or CPU or MPU) of the system or apparatus to read out and execute the program code stored in the storage medium.

In this case, the program code itself read from the storage medium realizes the functions of each of the above described embodiments, and hence the program code and a storage medium on which the program code is stored constitute the present invention.

Examples of the storage medium for supplying the program code have optical disks such as a floppy (registered trademark) disk, a hard disk, a magnetic-optical disk, a CD-ROM, a CD-R, a CD-RW, a DVD-ROM, a DVD-RAM, a DVD-RW, and a DVD+RW, a magnetic tape, a nonvolatile memory card, a ROM and the like. Alternatively, the program code may be supplied by downloading via a network.

Further, it is to be understood that the functions of each of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of each of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on the instructions of the program code.

What is claimed is:

1. A device, comprising:

a particle capturing mechanism that is disposed inside a communicating pipe that is positioned between a processing chamber of a substrate processing apparatus and an exhaust system of the substrate processing apparatus so as to allow the processing chamber of the substrate processing apparatus and the exhaust system to communicate with each other, the exhaust system including at least one exhaust pump, wherein the particle capturing mechanism is positioned in the communicating pipe upstream of all exhaust pumps of the exhaust system that initiate exhausting from the processing chamber so that the particle capturing mechanism captures particles that rebound from the at least one exhaust pump of the exhaust system, wherein at least part of the communicating pipe is bent so as to form an inner wall thereof facing oppositely an intake opening of the exhaust pump from which the particles rebound, and wherein at least part of the particle capturing mechanism is disposed on the inner wall facing oppositely the intake opening such that the particle capturing mechanism follows a surface shape of the inner wall.

2. A device as claimed in claim 1, wherein said particle capturing mechanism is comprised of a flocculent body or a porous body.

3. A device as claimed in claim 2, wherein the flocculent body is made of stainless felt or a fluororesin felt.

4. A device as claimed in claim 1, wherein said particle capturing mechanism is made of an adhesive material.

5. A device as claimed in claim 1, wherein the exhaust pump from which the particles rebound includes a rotary shaft from which a plurality of rotary blades are projected orthogonally, and wherein the at least part of the particle capturing mechanism is disposed on an extended line of the rotary shaft.

6. A device as claimed in claim 1, wherein a surface of the inner wall facing oppositely the intake opening comprises a curved surface.

7. A communicating pipe, comprising:

a particle capturing mechanism, wherein the communicating pipe is positioned between a processing chamber of a substrate processing apparatus and an exhaust system of the substrate processing apparatus so as to allow the processing chamber of the substrate processing apparatus and the exhaust system to communicate with each other, the exhaust system including at least one exhaust pump, wherein said particle capturing mechanism is disposed on an inner wall of the communicating pipe to form a hollow space portion so that a portion of an exhaust stream which flows inside the communicating pipe can flow in the hollow space portion without passing through said particle capturing mechanism, and said particle capturing mechanism is positioned in the communicating pipe upstream of all exhaust pumps of the exhaust system that initiate exhausting from the processing chamber so that the particle capturing mechanism captures particles that rebound from the at least one exhaust pump of the exhaust system, wherein at least part of the communicating pipe is bent so as to form an inner wall thereof facing oppositely an intake opening of the exhaust pump from which the particles rebound, and wherein at least part of said particle capturing mechanism is disposed on the inner wall facing oppositely the intake opening such that the particle capturing mechanism follows a surface shape of the inner wall.

8. A communicating pipe as claimed in claim 7, wherein said particle capturing mechanism is comprised of a flocculent body or a porous body.

9. A communicating pipe as claimed in claim 8, wherein said flocculent body is made of stainless felt or fluororesin felt.

10. A communicating pipe as claimed in claim 7, wherein said particle capturing mechanism is made of an adhesive material.

11. A communicating pipe as claimed in claim 7, wherein the exhaust pump from which the particles rebound includes a rotary shaft from which a plurality of rotary blades are projected orthogonally, and wherein the at least part of the particle capturing mechanism is disposed on an extended line of the rotary shaft.

12. A communicating pipe as claimed in claim 7, wherein a surface of the inner wall facing oppositely the intake opening comprises a curved surface.

* * * * *